(12) United States Patent
Kamide et al.

(10) Patent No.: US 6,917,155 B1
(45) Date of Patent: Jul. 12, 2005

(54) CATHODE PANEL FOR A COLD CATHODE FIELD EMISSION DISPLAY AND COLD CATHODE FIELD EMISSION DISPLAY, AND METHOD OF PRODUCING CATHODE PANEL FOR A COLD CATHODE FIELD EMISSION DISPLAY

(75) Inventors: Yukihiro Kamide, Kanagawa (JP); Shinji Kubota, Kanagawa (JP); Hiroshi Sata, Kanagawa (JP); Kazuo Kikuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/572,921

(22) Filed: May 17, 2000

(30) Foreign Application Priority Data

May 18, 1999 (JP) .......................................... P11-137521
Jul. 14, 1999 (JP) .......................................... P11-200222

(51) Int. Cl.⁷ .............................................. H01J 1/62
(52) U.S. Cl. ....................................................... 313/495

(58) Field of Search ................................. 313/495–497, 313/309, 310, 311, 336, 351; 445/24, 25, 50, 51

(56) References Cited

U.S. PATENT DOCUMENTS 4,908,539 A  3/1990  Meyer
5,719,466 A * 2/1998  Tsai ............................ 313/495

FOREIGN PATENT DOCUMENTS

JP  61-221783  10/1986

* cited by examiner

Primary Examiner—Joseph Williams
(74) Attorney, Agent, or Firm—Rader, Fishman & Grauer PLLC; Ronald P. Kananen

(57) ABSTRACT

A cathode panel for a cold cathode field emission display, comprising; (a) a plurality of main wirings, (b) a plurality of branch wirings extending from each main wiring, and (c) cold cathode electron emitting portions connected to the branch wirings, wherein a branch wiring connecting a cold cathode electron emitting portion defective in operation and a main wiring is cut off.

8 Claims, 63 Drawing Sheets

[STEP-100]

[STEP-110]

[STEP-120]

[STEP-130]

[STEP-200]

[STEP-210]

[STEP-220]

[STEP-230]

[STEP-240]

[STEP-250]

[STEP-260]

[STEP-300]

[STEP-310]

[STEP-320]

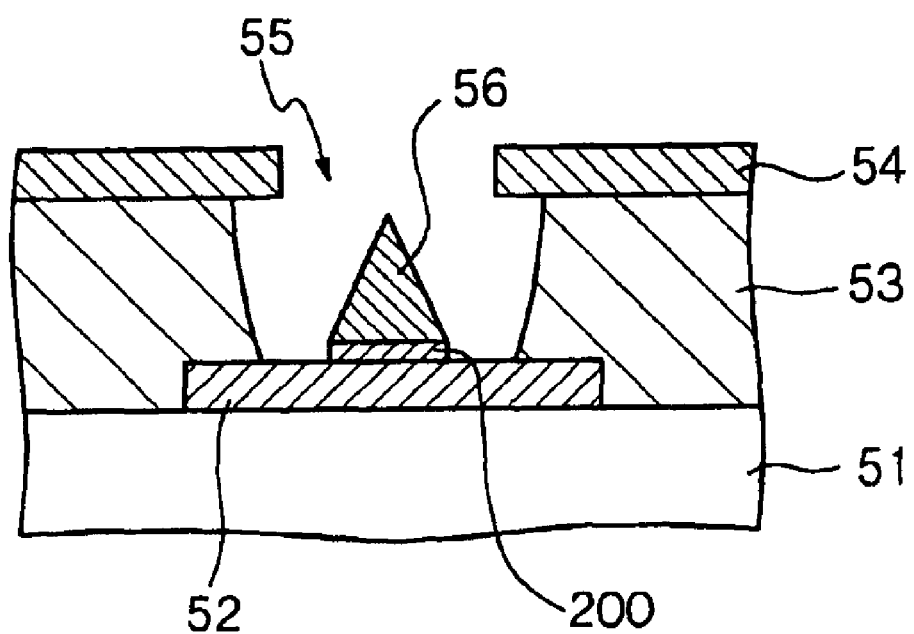

[STEP-410]

[STEP-420]

[STEP-430]

[STEP-440]

[STEP-440] CONTINUED

[STEP-450]

hp: THICKNESS OF MASK MATERIAL LAYER
he: HEIGHT OF ELECTRON EMITTING ELECTRODE

Fig. 49A  SELECTION RATIO TO RESIST : SMALL
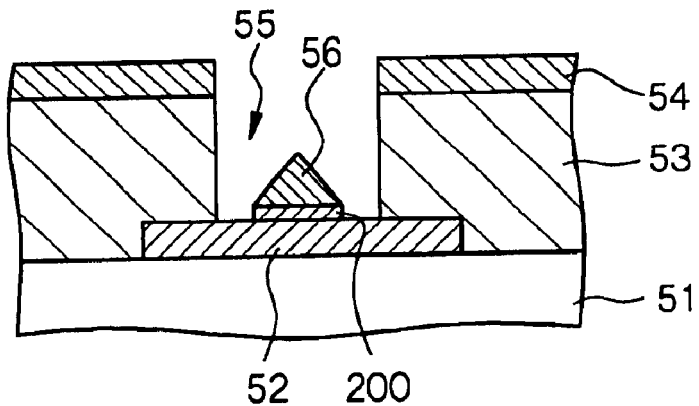
Fig. 49B  SELECTION RATIO TO RESIST : INTERMEDIATE
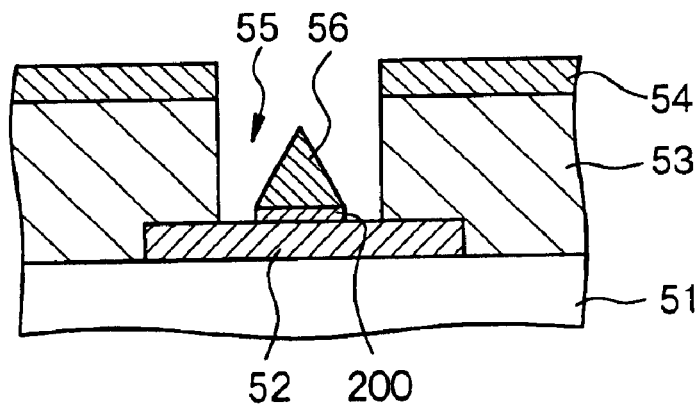
Fig. 49C  SELECTION RATIO TO RESIST : LARGE
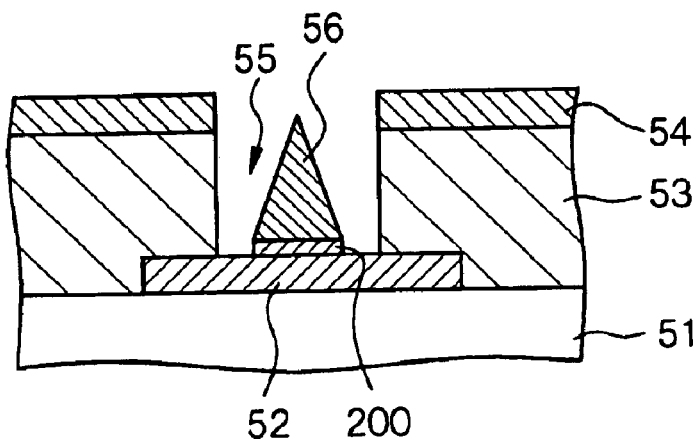

[STEP-510]

[STEP-520]

[STEP-530]

[STEP-540]

[STEP-550]

[STEP-560]

[STEP-600]

[STEP-610]

[STEP-620]

[STEP-700]

[STEP-700] CONTINUED

[STEP-710]

[STEP-720]

[STEP-720] CONTINUED

[STEP-730]

[STEP-800]

[STEP-810]

[STEP-820]

[STEP-830]

[STEP-900]

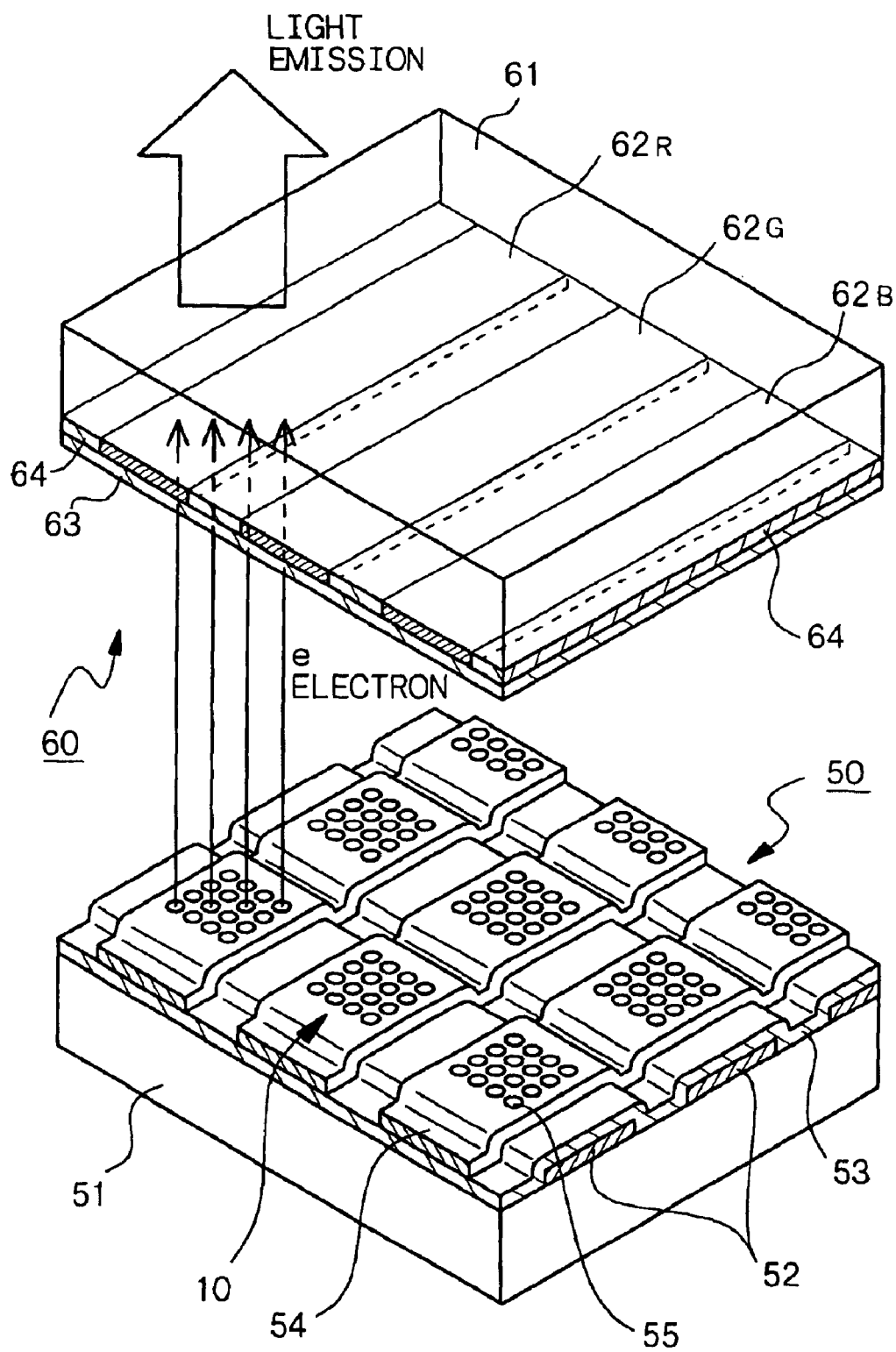

RESISTANCE LAYER

CATHODE PANEL FOR A COLD CATHODE FIELD EMISSION DISPLAY AND COLD CATHODE FIELD EMISSION DISPLAY, AND METHOD OF PRODUCING CATHODE PANEL FOR A COLD CATHODE FIELD EMISSION DISPLAY

BACKGROUND OF THE INVENTION AND RELATED ART STATEMENT

The present invention relates to a cathode panel for a cold cathode field emission display, a cold cathode field emission display into which the above cathode panel for a cold cathode field emission display is incorporated, and a method of producing a cathode panel for a cold cathode field emission display.

Studies of various flat panel type displays are under way as displays which are to replace currently main-stream cathode ray tubes (CRT). The flat panel type displays include a liquid crystal display (LCD), an electroluminescence display (ELD) and a plasma display panel (PDP). Further, there is also proposed a cold cathode field emission display (FED), which is capable of emitting electrons into vacuum from a solid without relying on thermal excitation, and it is of great interest from the viewpoint of a high resolution, display of high-brightness colors and a low power consumption.

A cold cathode field emission display (to be sometimes referred to as "display" hereinafter) generally has a constitution in which a cathode panel having cold cathode electron emitting portions (to be sometimes referred to as "electron emitting portions" hereinafter) disposed so as to correspond to pixels arranged in the form of a two-dimensional matrix and an anode panel having fluorescent layers which are caused to emit light by colliding with electrons emitted from the above electron emitting portions are placed to be opposed to each other through a vacuum layer. Each electron emitting portion formed on the cathode panel is constituted of one cold cathode field emission device (to be sometimes referred to as "field emission device" hereinafter) or a plurality of field emission devices.

The field emission device can be generally classified into Spindt type, edge type and flat type field emission devices.

FIG. 27 shows a conceptual view of a display to which the Spindt type field emission devices are applied, as an example, and FIG. 63 shows a partial schematic perspective exploded view of part of a cathode panel 50 and an anode panel 60 as a conventional example. The Spindt type field emission device constituting such a display comprises a cathode electrode 52 formed on a support 51, an insulating layer 53, a gate electrode 54 formed on the insulating layer 53 and a circular-cone-shaped electron emitting electrode 56 formed in an opening portion 55 penetrating through the gate electrode 54 and the insulating layer 53. A predetermined number of the electron emitting electrodes 56 are arranged in a two-dimensional matrix form, to form one electron emitting portion which constitutes one pixel. The cathode electrode 52 has a stripe form extending in a first direction, and the gate electrode 54 has a stripe form extending in a second direction different from the first direction (see FIG. 63). The cathode electrode 52 in the stripe form and the gate electrode 54 in the stripe form overlap each other, and the overlapped portion corresponds to the electron emitting portion 10. The cathode panel 50 has a plurality of such electron emitting portions.

The anode panel 60 has a structure in which a fluorescent layer 62 having a predetermined pattern (specifically, a fluorescent layer 62R to emit light in red, a fluorescent layer 62G to emit light in green and a fluorescent layer 62B to emit light in blue as shown in FIG. 63) is formed on a substrate 61, and the fluorescent layer 62 is covered with an anode electrode 63. A black matrix 64 composed of a light-absorbing material such as carbon is filled in every portion between two members of the fluorescent layers 62R, 62G and 63B to prevent the color mixing of a display image. The above order of stacking of the fluorescent layer 62 and the anode electrode 63 on the substrate 61 may be reversed. In this case, the anode electrode 63 is positioned in front of the fluorescent layer 62 when viewed from the side of a viewer of a display, so that it is required to use a transparent electrically conductive material such as ITO (indium-tin oxide) or the like, to form the anode electrode 63.

When a voltage is applied between the cathode electrode 52 and the gate electrode 54, an electric field is generated, and electrons are emitted from the top portion of the electron emitting electrode 56 due to the electric field. The electrons are attracted toward the anode electrode 63 formed in the anode panel 60 and collide with the fluorescent layer 62 which is a light emitting layer interposed between the anode electrode 63 and the transparent substrate 61. As a result, the fluorescent layer 62 is excited to emit light, and a desired image can be obtained. The operation of the field emission device is basically controlled by a voltage to be applied to the gate electrode 54.

The outline of the method of producing the Spindt type field emission device shown in FIGS. 27 and 63 will be explained below with reference to FIGS. 31A, 31B, 32A and 32B. This method is in principle a method of forming the circular-cone-shaped electron emitting electrode 56 composed of a metal material by vertical vapor deposition. That is, vaporized particles perpendicularly enter the opening portion 55. The amount of the vaporized particles which reach a bottom portion of the opening portion 55 is gradually decreased by utilizing the shielding effect of an overhanging deposit formed around an opening edge portion of the opening portion 55, so that the electron emitting electrode 56 as a circular-cone-shaped deposit is formed in a self-aligned manner. This method employs a method of pre-forming a peeling-off layer 57 on the insulating layer 53 and the gate electrode 54 for easing the removal of the unnecessary overhanging deposit, and the method will be explained with reference to FIGS. 31A, 31B, 32A and 32B.

[Step-100]

A conductive material layer composed, for example, of polysilicon for a cathode electrode is formed on a support 51 composed, for example, of a glass substrate by a plasma-enhanced CVD method. Then, the conductive material layer for a cathode electrode is patterned by a lithographic method and a dry etching method, to form the cathode electrode 52 having a stripe form. Thereafter, an insulating layer 53 composed of $SiO_2$ is formed on the entire surface by a CVD method, and then a conductive material layer (for example, TiN layer) for a gate electrode is formed by a sputtering method. Then, the conductive material layer for a gate electrode is patterned by a lithographic method and a dry etching method, to form the stripe-shaped gate electrode 54 which is composed of the conductive material layer and has an opening portion 55. Thereafter, an opening portion 55 having a diameter, for example, of approximately 1 μm is formed in the insulating layer 53 (see FIG. 31A).

[Step-110]

As shown in FIG. 31B, a peeling-off layer 57 is formed on the gate electrode 54 and the insulating layer 53 by oblique vapor deposition of nickel (Ni) while the support 51 is turned. In this case, the incidence angle of vaporized particles relative to a normal of the support 51 is set at a sufficiently large angle (for example, an incidence angle of 65° to 85°), whereby the peeling-off layer 57 can be formed on the insulating layer 53 and the gate electrode 54 almost without depositing any nickel in the bottom portion of the opening portion 55. The peeling-off layer 57 extends from the opening edge portion of the opening portion 55 like eaves, whereby the diameter of the opening portion 55 is substantially decreased.

[Step-120]

Then, an electrically conductive material such as molybdenum (Mo) is deposited on the entire surface by vertical vapor deposition (incidence angle 3° to 10°). During the above vapor deposition, as shown in FIG. 32A, as the conductive material layer 56A having an overhanging form grows on the peeling-off layer 57, the substantial diameter of the opening portion 55 is gradually decreased, the vaporized particles which contributes to the deposition in the bottom portion of the opening portion 55 gradually comes to be limited to particles which pass the central region of the opening portion 55. As a result, a circular-cone-shaped deposit is formed on the bottom portion of the opening portion 55, and the circular-cone-shaped deposit constitutes the electron emitting electrode 56.

[Step-130]

Then, as shown in FIG. 32B, the peeling-off layer 57 is peeled off from the insulating layer 53 and the gate electrode 54 by a lift-off method, and the conductive material layer 56A above the insulating layer 53 and the gate electrode 54 is selectively removed. In this manner, a cathode panel having a plurality of the Spindt type field emission devices can be obtained.

In the field emission device, the emission of electrons from the tip portion of the electron emitting electrode 56 begins when a potential difference $\Delta v$ between a voltage applied to the gate electrode 54 and a voltage applied to the cathode electrode 52 comes to be a threshold voltage $\Delta V_{th}$ or higher. And, for example, as the voltage applied to the gate electrode 54 increases (that is, as the potential difference $\Delta$ increases), an electron emission current caused by the emission of electrons from the tip portion of the electron emitting electrode 56 sharply increases.

Meanwhile, very clean treatment and high processing accuracy are required for producing a large-sized display. For example, for producing a color display having 380000 pixels, it is required to form 1140000 electron emitting portions. When a display is to be constituted of the Spindt type field emission devices, it is required to form tens to approximately one thousand Spindt type field emission devices per electron emitting portion. It is therefore required to form tens of millions of the fine field emission devices close to one another at intervals of several micrometers or less. For attaining a high electron emission current at a low driving voltage, preferably, the distance of the tip portion of the electron emitting electrode 56 and the opening edge portion of the gate electrode 54 is approximately 0.12 $\mu$m to 1.2 $\mu$m.

In the steps of producing the above Spindt type field emission devices, however, it is required to peel off the peeling-off layer 57 all over the large-area support (for example, glass substrate) for producing a display having a large-area screen, and the peeling of the peeling-off layer 57 causes a defect on the field emission devices. In a dry process, further, a reaction product is increasingly deposited in processing the large-area support, and the field emission devices are liable to have a defect due to particles. When an electrically conductive foreign matter (particle) is present between the gate electrode 54 and the electron emitting electrode 56, the gate electrode 54 and the electron emitting electrode 56 are short-circuited, and as a result, electrons are no longer emitted from the field emission device, so that a black spot appears on a display screen. In the cathode panel, generally, there are arranged a plurality of columns of cold cathode electron emitting regions each of which has a plurality of electron emitting portions arranged one-dimensionally (in the form of a stripe). When a short circuit is formed in the field emission device, there are some cases where the whole of one column of the stripe-shaped electron emitting portions including the short-circuited field emission device can no longer perform complete displaying.

In one method of avoiding the problem caused by the above short circuit of the field emission device, for example, a resistance layer having a resistance of about 2 M$\Omega$ is formed between the electron emitting electrode 56 and the cathode electrode 52, as is schematically shown in FIG. 64A. When a field emission device is in a short-circuited state, a leak current consequently flows between the gate electrode 54 and the cathode electrode 52 through the electron emitting electrode 56 and the resistance layer, which leads to an increase in consumption power. When a difference between a voltage applied to the gate electrode 54 and a voltage applied to the cathode electrode 52 is $\Delta V$, and when the resistance layer has a resistance value R, the consumption power P consumed due to short circuiting of the field emission devices can be calculated by the following equation, in which n is the number of field emission devices in a short-circuited state.

$$P=n(\Delta V^2/R)$$

The consumption power P can be decreased by increasing the resistance value R of the resistance layer. When the resistance value R is increased, however, there is brought a state where the resistance value R is added to an inter-layer capacitance component C between the gate electrode 54 and the cathode electrode 52 as is shown in FIG. 64B, and, as a result, a time constant increases. Driving signals to be applied to the gate electrode 54 and the cathode electrode 52 are therefore delayed, and as a result, the operation speed of the display is deferred. Therefore, the resistance value R of the resistance layer cannot be increased much, and if possible, it is preferred not to provide the resistance layer.

Another problem with the field emission devices is that the field emission devices vary in electron emitting characteristics. The field emission devices are formed on the cathode panel in the number of hundreds of thousands to hundreds of millions by the same process and even if these field emission devices look identical when observed through an electron microscope, the field emission devices vary in threshold voltage $\Delta V_{th}$. When a field emission device has an extremely low value of the threshold voltage $\Delta V_{th}$, it comes to be in an operation state even in a potential difference state where field emission devices which have a normal threshold voltage $\Delta V_{th}$ do not operate. As a result, there is caused a problem that a bright spot appears on a display screen.

OBJECT AND SUMMARY OF THE INVENTION

It is therefore an object of the present invention to provide a cathode panel for a cold cathode field emission display, which permits exclusion of a cold cathode electron emitting portion in operation or permits inhibition of operation of defective part of the cold cathode electron emitting portions when the cold cathode electron emitting portion causes a defect, and which does not incur a decrease in the production yield of cold cathode field emission displays.

It is another object of the present invention to provide a cold cathode field emission display to which the above cathode panel for a cold cathode field emission display is incorporated.

It is further another object of the present invention to provide a method of producing a cathode panel for a cold cathode field emission display.

According to a first aspect of the present invention for achieving the above object, there is provided a cathode panel for a cold cathode field emission display, comprising;

(a) a plurality of main wirings, (b) a plurality of branch wirings extending from each main wiring, and (c) cold cathode electron emitting portions connected to the branch wirings, wherein a branch wiring connecting a cold cathode electron emitting portion defective in operation and a main wiring is cut off.

According to a second aspect of the present invention for achieving the above object, there is provided a cathode panel for a cold cathode field emission display, comprising;

(a) a plurality of main wirings, (b) a plurality of branch wirings extending from each main wiring, and (c) cold cathode electron emitting portions connected to the branch wirings, wherein a branch wiring connecting a cold cathode electron emitting portion in a short-circuited state and a the main wiring is broken.

In the cathode panel according to the second aspect of the present invention, it is preferred to employ a constitution in which each cold cathode electron emitting portion is constituted of a plurality of cold cathode electron emitting portion units and each cold cathode electron emitting portion unit is connected to the main wiring through the branch wiring, since an apparently flawless pixel can be obtained even if, for example, one cold cathode electron emitting portion unit is short-circuited.

According to a third aspect of the present invention for achieving the above object, there is provided a cathode panel for a cold cathode field emission display, comprising;

(a) a plurality of main wirings, (b) a plurality of first branch wirings and a plurality of second branch wirings extending from each main wiring, and (c) a plurality of cold cathode electron emitting regions, wherein each cold cathode electron emitting region is constituted of a first cold cathode electron emitting portion connected to a first branch wiring extending from a main wiring and a second cold cathode electron emitting portion connected to a second branch wiring extending from said main wiring, when one of first and second cold cathode electron emitting portions constituting a cold cathode electron emitting region is defective in operation, the branch wiring connecting said one of the cold cathode electron emitting portions and the main wiring is cut off, and when both cold cathode electron emitting portions constituting a cold cathode electron emitting region is normal in operation, one of the first and second branch wirings connecting the first and second cold cathode electron emitting portions constituting the cold cathode electron emitting region and the main wiring is cut off.

According to a fourth aspect of the present invention for achieving the above object, there is provided a cathode panel for a cold cathode field emission display, comprising;

(a) a plurality of main wirings, (b) a plurality of first branch wirings and a plurality of second branch wirings extending from each main wiring, and (c) a plurality of cold cathode electron emitting regions, wherein each cold cathode electron emitting region is constituted of a first cold cathode electron emitting portion connected to a first branch wiring extending from a main wiring and a second cold cathode electron emitting portion connected to a second branch wiring extending from said main wiring, when a cold cathode electron emitting portion constituting a cold cathode electron emitting region is in a short-circuited state, the branch wiring connecting said cold cathode electron emitting portion and the main wiring is broken, and when both cold cathode electron emitting portions constituting a cold cathode electron emitting region is normal in operation, one of the first and second branch wirings connecting the first and second cold cathode electron emitting portions constituting the cold cathode electron emitting region and the main wiring is cut off.

According to a fifth aspect of the present invention for achieving the above object, there is provided a cathode panel for a cold cathode field emission display, comprising;

(a) a plurality of main wirings, (b) a plurality of branch wirings extending from each main wiring, and (c) a plurality of cold cathode electron emitting regions, wherein each cold cathode electron emitting region is constituted of a first cold cathode electron emitting portion connected to a branch wiring extending from a main wiring, and a second cold cathode electron emitting portion, and when a first cold cathode electron emitting portion is defective in operation, the branch wiring connecting said first cold cathode electron emitting portion and the main wiring is cut off, and the second cold cathode electron emitting portion constituting the cold cathode electron emitting region including said first cold cathode electron emitting portion is electrically connected to said main wiring.

According to a sixth aspect of the present invention for achieving the above object, there is provided a cathode panel for a cold cathode field emission display, comprising;

(a) a plurality of main wirings, (b) a plurality of branch wirings extending from each main wiring, (c) a plurality of cold cathode electron emitting regions, wherein each cold cathode electron emitting region is constituted of a first cold cathode electron emitting portion connected to a branch wiring extending from a main wiring, and a second cold cathode electron emitting portion, and when a first cold cathode electron emitting portion is in a short-circuited state, the branch wiring connecting said first cold cathode electron emitting portion and the main wiring is broken, and the second cold cathode electron emitting portion constituting the cold cathode electron emitting region including said first cold cathode electron emitting portion is electrically connected to said main wiring.

According to a seventh aspect of the present invention for achieving the above object, there is provided a cathode panel for a cold cathode field emission display, comprising;

(a) a plurality of main wirings each of which is constituted of a first main wiring and a second main wiring, (b) a plurality of first branch wirings extending from each first main wiring, (c) a plurality of second branch wirings extending from each second main wiring, and (d) cold cathode electron emitting portions connected to the first and second branch wirings, wherein a branch wiring connected to a malfunctioning cold cathode electron emitting portion is cut off so that such a malfunctioning cold cathode electron emitting portion does not work.

According to an eighth aspect of the present invention for achieving the above object, there is provided a cathode panel for a cold cathode field emission display, comprising;

(a) an effective region constituted of a plurality of cold cathode electron emitting portions arranged in a two-dimensional matrix form, and (b) an ineffective region constituted of a plurality of cold cathode electron emitting portions arranged in a circumferential portion of the effective region and formed in a two-dimensional matrix form, wherein the cold cathode electron emitting portions constituting the effective region are connected to a power source for actuating the cold cathode electron emitting portions, and the cold cathode electron emitting portions constituting the ineffective region are not connected to said power source.

According to a ninth aspect of the present invention for achieving the above object, there is provided a cathode panel for a cold cathode field emission display, comprising a plurality of cold cathode electron emitting portion groups arranged side by side, wherein each cold cathode electron emitting portion group has N columns of cold cathode electron emitting portions side by side, N being a natural number of 2 or more, each column having a plurality of the cold cathode electron emitting portions arranged one-dimensionally, a constant number of column or columns are selected from said columns in each cold cathode electron emitting portion group, the constant number being (N−1) or less, the selected column or columns of the cold cathode electron emitting portions are connected to a power source for actuating the cold cathode electron emitting portions, and non-selected column or columns of the cold cathode electron emitting portions are not connected to said power source.

According to a first aspect of the present invention for achieving the above object, there is provided a method of producing the cathode panel according to the first aspect of the present invention. That is, the method according to the first aspect of the present invention is a method of producing the cathode panel comprising;

(a) a plurality of main wirings, (b) a plurality of branch wirings extending from each main wiring, and (c) cold cathode electron emitting portions connected to the branch wirings, the method comprising;

carrying out a working test of the cold cathode electron emitting portions, and cutting off a branch wiring connecting a cold cathode electron emitting portion which is found to be defective in operation and a main wiring.

According to a second aspect of the present invention for achieving the above object, there is provided a method of producing the cathode panel according to the second aspect of the present invention. That is, the method according to the second aspect of the present invention is a method of producing the cathode panel comprising;

(a) a plurality of main wirings, (b) a plurality of branch wirings extending from each main wiring, and (c) cold cathode electron emitting portions connected to the branch wirings, the method comprising;

carrying out a test of cold cathode electron emitting portions for a short circuit, by applying a voltage to the cold cathode electron emitting portions from the main wirings through the branch wirings, and breaking a branch wring connecting a short-circuited cold cathode electron emitting portion and a main wiring by means of a current flowing in said branch wiring.

In the cathode panel production method according to the second aspect of the present invention, it is preferred to employ a constitution in which each cold cathode electron emitting portion is constituted of a plurality of cold cathode electron emitting portion units and each cold cathode electron emitting portion unit is connected to the main wiring through the branch wiring, since an apparently flawless pixel can be obtained even if, for example, one cold cathode electron emitting portion unit is short-circuited.

According to a third aspect of the present invention for achieving the above object, there is provided a method of producing the cathode panel according to the third aspect of the present invention. That is, the method according to the third aspect of the present invention is a method of producing the cathode panel comprising;

(a) a plurality of main wirings, (b) a plurality of first branch wirings and a plurality of second branch wirings extending from each main wiring, and (c) a plurality of cold cathode electron emitting regions, wherein each cold cathode electron emitting region is constituted of a first cold cathode electron emitting portion connected to a first branch wiring extending from a main wiring and a second cold cathode electron emitting portion connected to a second branch wiring extending from said main wiring, the method comprising;

carrying out a working test of the cold cathode electron emitting regions, cutting off one of first and second branch wirings connecting first and second cold cathode electron emitting portions constituting a cold cathode electron emitting region which is found to be defective in operation and a main wiring, and cutting off one of first and second branch wirings connecting first and second cold cathode electron emitting portions constituting a cold cathode electron emitting region which is found to be normally functioning and a main wiring.

According to a fourth aspect of the present invention for achieving the above object, there is provided a method of producing the cathode panel according to the fourth aspect of the present invention. That is, the method according to the fourth aspect of the present invention is a method of producing the cathode panel comprising;

(a) a plurality of main wirings, (b) a plurality of first branch wirings and a plurality of second branch wirings extending from each main wiring, and (c) a plurality of cold cathode electron emitting regions, wherein each cold cathode electron emitting region is constituted of a first cold cathode electron emitting portion connected to a first branch wiring extending from a main wiring and a second cold cathode electron emitting portion connected to a second branch wiring extending from said main wiring, the method comprising;

carrying out a test of cold cathode electron emitting portions for a short circuit by applying a voltage to the cold cathode electron emitting portions from the main wirings through the branch wirings, breaking a branch wiring connecting a short-circuited cold cathode electron emitting portion and a main wiring, in a short-circuited cold cathode electron emitting region, by means of a current flowing in said branch wiring, and cutting off one of first and second branch wirings connecting first and second cold cathode electron emitting portions constituting a normally functioning cold cathode electron emitting region and a main wiring.

According to a fifth aspect of the present invention for achieving the above object, there is provided a method of producing the cathode panel according to the fifth aspect of the present invention. That is, the method according to the fifth aspect of the present invention is a method of producing the cathode panel comprising;

(a) a plurality of main wirings, (b) a plurality of branch wirings extending from each main wiring, and (c) a plurality of cold cathode electron emitting regions, wherein each cold cathode electron emitting region is constituted of a first cold cathode electron emitting portion connected to a branch wiring extending from a main wiring, and a second cold cathode electron emitting portion, the method comprising;

carrying out a working test of the first cold cathode electron emitting portions, cutting off a branch wiring connecting a first cold cathode electron emitting portion which is found to be defective in operation and a main wiring, and electrically connecting the second cold cathode electron emitting portion constituting the cold cathode electron emitting region including said first cold cathode electron emitting portion to said main wiring.

According to a sixth aspect of the present invention for achieving the above object, there is provided a method of producing the cathode panel according to the sixth aspect of the present invention. That is, the method according to the sixth aspect of the present invention is a method of producing the cathode panel comprising;

(a) a plurality of main wirings, (b) a plurality of branch wirings extending from each main wiring, (c) a plurality of cold cathode electron emitting regions, wherein each cold cathode electron emitting region is constituted of a first cold cathode electron emitting portion connected to a branch wiring extending from a main wiring, and a second cold cathode electron emitting portion, the method comprising;

carrying out a test of the first cold cathode electron emitting portions for a short circuit by applying a voltage to the first cold cathode electron emitting portions from the main wirings through the branch wirings, breaking a branch wiring connecting a short-circuited first cold cathode electron emitting portion and a main wiring, in a short-circuited cold cathode electron emitting region, by a current flowing in said branch wiring, and electrically connecting the second cold cathode electron emitting portion constituting the cold cathode electron emitting region including said first cold cathode electron emitting portion to said main wiring.

According to a seventh aspect of the present invention for achieving the above object, there is provided a method of producing the cathode panel according to the seventh aspect of the present invention. That is, the method according to the seventh aspect of the present invention is a method of producing the cathode panel comprising;

(a) a plurality of main wirings each of which is constituted of a first main wiring and a second main wiring, (b) a plurality of first branch wirings extending from each first main wiring, (c) a plurality of second branch wirings extending from each second main wiring, and (d) cold cathode electron emitting portions connected to the first and second branch wirings, the method comprising;

carrying out a working test of the cold cathode electron emitting portions, and cutting off a branch wiring connected to a cold cathode electron emitting portion which is found to be defective in operation so that such a cold cathode electron emitting portion does not work.

According to an eighth aspect of the present invention for achieving the above object, there is provided a method of producing the cathode panel according to the ninth aspect of the present invention. That is, the method according to the eighth aspect of the present invention is a method of producing a cathode panel comprising a plurality of cold cathode electron emitting portion groups arranged side by side, wherein each cold cathode electron emitting portion group has N columns of cold cathode electron emitting portions side by side, N being a natural number of 2 or more, each column having a plurality of cold cathode electron emitting portions arranged one-dimensionally, the method comprising;

carrying out a working test of the cold cathode electron emitting portions, selecting a constant number of column or columns excluding any column including a cold cathode electron emitting portion which is found to be defective in operation in each cold cathode electron emitting portion group, the constant number being (N−1) or less, connecting the selected column or columns to a power source for actuating the cold cathode electron emitting portions, selecting a constant number of column or columns of cold cathode electron emitting portions which are found to be normally functioning in each cold cathode electron emitting portion group, the constant number being (N−1) or less, and connecting the selected column or columns to said power source.

According to a first aspect of the present invention for achieving the above object, there is provided a cold cathode field emission display having the cathode panel according to the first aspect of the present invention. That is, the cold cathode field emission display according to the first aspect of the present invention comprises a plurality of pixels, each pixel being constituted of a cold cathode electron emitting portion formed in a cathode panel and an anode electrode and a fluorescence layer formed in an anode panel and opposed to the cold cathode electron emitting portion, the cathode panel comprising;

(a) a plurality of main wirings, (b) a plurality of branch wirings extending from each main wiring, and (c) the cold cathode electron emitting portions connected to the branch wirings, wherein a branch wiring connecting a cold cathode electron emitting portion defective in operation and a main wiring is cut off.

According to a second aspect of the present invention for achieving the above object, there is provided a cold cathode field emission display having the cathode panel according to the second aspect of the present invention. That is, the cold cathode field emission display according to the second aspect of the present invention comprises a plurality of pixels, each pixel being constituted of a cold cathode electron emitting portion formed in a cathode panel and an anode electrode and a fluorescence layer formed in an anode panel and opposed to the cold cathode electron emitting portion, the cathode panel comprising;

(a) a plurality of main wirings, (b) a plurality of branch wirings extending from each main wiring, and (c) the cold cathode electron emitting portions connected to the branch wirings, wherein a branch wiring connecting a cold cathode electron emitting portion in a short-circuited state and a the main wiring is broken.

In the cold cathode field emission display according to the second aspect of the present invention, it is preferred to employ a constitution in which each cold cathode electron emitting portion is constituted of a plurality of cold cathode electron emitting portion units and each cold cathode electron emitting portion unit is connected to the main wiring through the branch wiring, since an apparently flawless pixel can be obtained even if, for example, one cold cathode electron emitting portion unit is short-circuited.

According to a third aspect of the present invention for achieving the above object, there is provided a cold cathode field emission display having the cathode panel according to the third aspect of the present invention. That is, the cold cathode field emission display according to the third aspect of the present invention comprises a plurality of pixels, each pixel being constituted of a cold cathode electron emitting region formed in a cathode panel and an anode electrode and a fluorescence layer formed in an anode panel and opposed to the cold cathode electron emitting region, the cathode panel comprising;

(a) a plurality of main wirings, (b) a plurality of first branch wirings and a plurality of second branch wirings extending from each main wiring, and (c) a plurality of the cold cathode electron emitting regions, wherein each cold cathode electron emitting region is constituted of a first cold cathode electron emitting portion connected to a first branch wiring extending from a main wiring and a second cold cathode electron emitting portion connected to a second branch wiring extending from said main wiring, when one of first and second cold cathode electron emitting portions constituting a cold cathode electron emitting region is defective in operation, the branch wiring connecting said one of the cold cathode electron emitting portions and the main wiring is cut off, and when both cold cathode electron emitting portions constituting a cold cathode electron emitting region is normal in operation, one of the first and second branch wirings connecting the first and second cold cathode electron emitting portions constituting the cold cathode electron emitting region and the main wiring is cut off.

According to a fourth aspect of the present invention for achieving the above object, there is provided a cold cathode field emission display having the cathode panel according to the fourth aspect of the present invention. That is, the cold cathode field emission display according to the fourth aspect of the present invention comprises a plurality of pixels, each pixel being constituted of a cold cathode electron emitting region formed in a cathode panel and an anode electrode and a fluorescence layer formed in an anode panel and opposed to the cold cathode electron emitting region, the cathode panel comprising;

(a) a plurality of main wirings, (b) a plurality of first branch wirings and a plurality of second branch wirings extending from each main wiring, and (c) a plurality of the cold cathode electron emitting regions, wherein each cold cathode electron emitting region is constituted of a first cold cathode electron emitting portion connected to a first branch wiring extending from a main wiring and a second cold cathode electron emitting portion connected to a second branch wiring extending from said main wiring, when a cold cathode electron emitting portion constituting a cold cathode electron emitting region is in a short-circuited state, the branch wiring connecting said cold cathode electron emitting portion and the main wiring is broken, and when both cold cathode electron emitting portions constituting a cold cathode electron emitting region is normal in operation, one of the first and second branch wirings connecting the first and second cold cathode electron emitting portions constituting the cold cathode electron emitting region and the main wiring is cut off.

According to a fifth aspect of the present invention for achieving the above object, there is provided a cold cathode field emission display having the cathode panel according to the fifth aspect of the present invention. That is, the cold cathode field emission display according to the fifth aspect of the present invention comprises a plurality of pixels, each pixel being constituted of a cold cathode electron emitting region formed in a cathode panel and an anode electrode and a fluorescence layer formed in an anode panel and opposed to the cold cathode electron emitting region, the cathode panel comprising;

(a) a plurality of main wirings, (b) a plurality of branch wirings extending from each main wiring, and (c) a plurality of the cold cathode electron emitting regions, wherein each cold cathode electron emitting region is constituted of a first cold cathode electron emitting portion connected to a branch wiring extending from a main wiring, and a second cold cathode electron emitting portion, and when a first cold cathode electron emitting portion is defective in operation, the branch wiring connecting said first cold cathode electron emitting portion and the main wiring is cut off, and the second cold cathode electron emitting portion constituting the cold cathode electron emitting region including said first cold cathode electron emitting portion is electrically connected to said main wiring.

According to a sixth aspect of the present invention for achieving the above object, there is provided a cold cathode field emission display having the cathode panel according to the sixth aspect of the present invention. That is, the cold cathode field emission display according to the sixth aspect of the present invention comprises a plurality of pixels, each pixel being constituted of a cold cathode electron emitting region formed in a cathode panel and an anode electrode and a fluorescence layer formed in an anode panel and opposed to the cold cathode electron emitting region, the cathode panel comprising;

(a) a plurality of main wirings, (b) a plurality of branch wirings extending from each main wiring, (c) a plurality of the cold cathode electron emitting regions, wherein each cold cathode electron emitting region is constituted of a first cold cathode electron emitting portion connected to a branch wiring extending from a main wiring, and a second cold cathode electron emitting portion, and when a first cold cathode electron emitting portion is in a short-circuited state, the branch wiring connecting said first cold cathode electron emitting portion and the main wiring is broken, and the second cold cathode electron emitting portion constituting the cold cathode electron emitting region including said first cold cathode electron emitting portion is electrically connected to said main wiring.

According to a seventh aspect of the present invention for achieving the above object, there is provided a cold cathode field emission display having the cathode panel according to the seventh aspect of the present invention. That is, the cold cathode field emission display according to the seventh aspect of the present invention comprises a plurality of pixels, each pixel being constituted of a cold cathode electron emitting portion formed in a cathode panel and an anode electrode and a fluorescence layer formed in an anode panel and opposed to the cold cathode electron emitting portion, the cathode panel comprising;

(a) a plurality of main wirings each of which is constituted of a first main wiring and a second main wiring, (b) a plurality of first branch wirings extending from each first main wiring, (c) a plurality of second branch wirings extending from each second main wiring, and (d) the cold cathode electron emitting portions connected to the first and second branch wirings, wherein a branch wiring connected to a malfunctioning cold cathode electron emitting portion is cut off so that such a malfunctioning cold cathode electron emitting portion does not work.

According to an eighth aspect of the present invention for achieving the above object, there is provided a cold cathode field emission display having the cathode panel according to the eighth aspect of the present invention. That is, the cold cathode field emission display according to the eighth aspect of the present invention comprises a plurality of pixels, each pixel being constituted of a cold cathode electron emitting portion formed in a cathode panel and an anode electrode and a fluorescence layer formed in an anode panel and opposed to the cold cathode electron emitting portion, the cathode panel comprising;

(a) an effective region constituted of a plurality of the cold cathode electron emitting portions arranged in a two-dimensional matrix form, and (b) an ineffective region constituted of a plurality of the cold cathode electron emitting portions arranged in a circumferential portion of the effective region and formed in a two-dimensional matrix form, wherein the cold cathode electron emitting portions constituting the effective region are connected to a power source for actuating the cold cathode electron emitting portions, and the cold cathode electron emitting portions constituting the ineffective region are not connected to said power source.

According to a ninth aspect of the present invention for achieving the above object, there is provided a cold cathode field emission display having the cathode panel according to the ninth aspect of the present invention. That is, the cold cathode field emission display according to the ninth aspect of the present invention comprises a plurality of pixels, each pixel being constituted of a cold cathode electron emitting portion formed in a cathode panel and an anode electrode and a fluorescence layer formed in an anode panel and opposed to the cold cathode electron emitting portion, the cathode panel comprising a plurality of cold cathode electron emitting portion groups arranged side by side, wherein each cold cathode electron emitting portion group has N columns of the cold cathode electron emitting portions side by side, N being a natural number of 2 or more, each column having a plurality of the cold cathode electron emitting portions arranged one-dimensionally, a constant number of column or columns are selected from said columns in each cold cathode electron emitting portion group, the constant number being (N–1) or less, the selected column or columns of the cold cathode electron emitting portions are connected to a power source for actuating the cold cathode electron emitting portions, and non-selected column or columns of the cold cathode electron emitting portions are not connected to said power source.

The term "cutting off a branch wiring" means that part of the branch wiring is removed by an external physical or chemical action, and the term "a branch wiring is cut off" means a state where part of the branch wiring is removed by an external physical or chemical action. The term "breaking a branch wiring" means that part of the branch wiring is removed by melting or that the branch wiring is broken due to an electro-migration based on a current stress caused by flowing an excess current in the branch wiring so that the branch wiring is brought into a non-continuity state. The term "a branch wiring is broken" means a state where part of the branch wiring is removed by being melted, or a state where the branch wiring is broken due to an electro-migration based on a current stress caused by flowing an excess current in the branch wiring so that the branch wiring is brought into a non-continuity state. The term "a cold cathode electron emitting portion defective in operation" means a cold cathode electron emitting portion which causes a dark point or a bright point to appear in a display. The short-circuiting of a cold cathode field emission device is caused in one case by a presence of an electrically conductive foreign matter (particle), and it is also caused in another case when an electrically conductive material for manufacturing cold cathode field emission devices remains during manufacturing process of the cold cathode field emission devices.

In the cathode panels according to the second, fourth and sixth aspects of the present invention, in the production methods according to the second, fourth and sixth aspects of the present invention, and further in the cold cathode field emission displays according to the second, fourth and sixth aspects of the present invention, the branch wiring is preferably made of an aluminum layer or an aluminum alloy layer, or it is preferably constituted of a first branch wiring portion made of an aluminum layer or an aluminum alloy layer and a second branch wiring portion having a two-layered structure of an aluminum layer or an aluminum alloy layer and a barrier metal layer thereon, from the viewpoint of reliably breaking the branch wiring by a current flowing in the branch wiring. The aluminum layer is preferably composed of aluminum having a purity of at least 99%. The aluminum alloy layer includes Al—Si, Al—Cu and Al—Si—Cu layers. Preferably, the aluminum alloy layer contains Si and/or Cu in a total amount of 1 to 2 atomic %. The material for constituting the barrier metal is required to be a material having a higher melting point than aluminum or the aluminum alloy, and it can be selected from refractory metal such as tungsten (W), molybdenum (Mo) and titanium (Ti), nitrides such as TiN, alloys such as Ti—W, and alloys and compounds of the above refractory metal. For easily breaking the branch wiring, preferably, the branch wiring has a portion having a width of 0.5 to 5 µm, and the length of the branch wiring is at least 10 µm but does not exceed, for example 0.5 mm, although the above width and length shall not be limited thereto.

In the cathode panel of the present invention, the cold cathode field emission display of the present invention and the cathode panel production method of the present invention (these will be sometimes generically called "the present invention" hereinafter), each cold cathode electron emitting portion (to be referred to as "electron emitting portion" hereinafter) can be constituted of a plurality of (for example, tens to one thousand) Spindt type field emission devices, a plurality of (tens to hundreds) edge type field emission devices or one or a plurality of flat type field emission device(s).

In the present invention, an electron emitting portion defective in operation or a short-circuited electron emitting portion is electrically isolated from the main wiring, or an electron emitting portion constituting the ineffective region or a non-selected column or columns of the cold cathode electron emitting portion(s) is not connected to a power source for actuating the electron emitting portions. Therefore, the above electron emitting portion, the ineffective region or the non-selected column or columns of the cold cathode electron emitting portion(s) does not participate in the emission of electrons. Even if the electron emitting portion has a defect, or even if the cold cathode electron emitting region has a defect, the defect is precluded in operation. As a consequence, there is incurred no decrease in the production yields of displays.

BRIEF DESCRIPTION OF THE DRAWINGS

The present invention will be explained with reference to drawings hereinafter.

FIG. 31B, are schematic partial end views of a support, etc., for explaining the method of producing the Spindt type field emission device.

FIG. 35C, are schematic partial end views of a support, etc., for explaining the method of producing the edge type field emission device shown in FIG. 33B.

FIG. 36B, are schematic partial end views of a support, etc., for explaining the method of producing the edge type field emission device shown in FIG. 33B.

FIG. 44 is a schematic partial end view of a Spindt type field emission device of Example 4.

FIG. 45B, are schematic partial end views of a support, etc., for explaining the method of producing the Spindt type field emission device shown in FIG. 44.

FIG. 46B, are schematic partial end views of a support, etc., for explaining the method of producing the Spindt type field emission device shown in FIG. 44.

FIGS. 49A to 49C schematically show relationships of a selection ratio to resist with the height and form of an electron emitting electrode.

FIG. 50B, are schematic partial end views of a support, etc., for explaining the method of producing the Spindt type field emission device of Example 5.

FIGS. 52A and 52B, following

FIG. 53B, are schematic partial end views of a support, etc., for explaining the method of producing the Spindt type filed emission device of Example 6.

FIG. 54B, is a schematic partial end view of a support, etc., for explaining the method of producing the Spindt type field emission device of Example 6.

FIG. 56, are schematic partial end views of a support, etc., for explaining the method of producing the Spindt type field emission device of Example 7.

FIG. 57B, are schematic partial end views of a support, etc., for explaining the method of producing the Spindt type field emission device of Example 7.

FIG. 58B, are schematic partial end views of a support, etc., for explaining the method of producing the Spindt type field emission device of Example 7.

FIG. 60B, are schematic partial end views of a support, etc., for explaining the method of producing the Spindt type field emission device of Example 8.

FIG. 63 is a schematic exploded view of part of a cathode panel and an anode panel of a display to which a conventional Spindt type field emission device is applied.

DESCRIPTION OF THE PREFERRED EMBODIMENTS

First, the outlines of Spindt type, edge type and flat type field emission devices and basic production steps of these field emission devices will be explained.

Figure 32A:
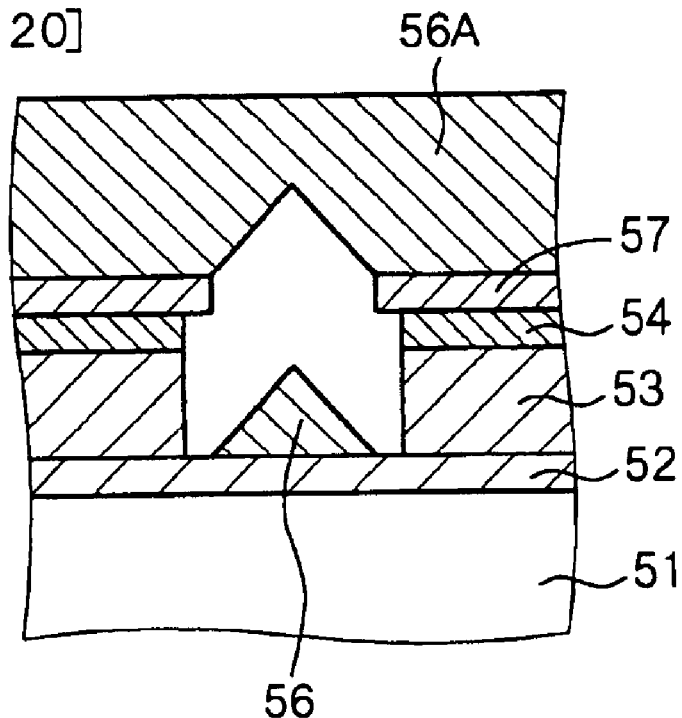
FIGS. 32A and 32B, following
Figure 32B:
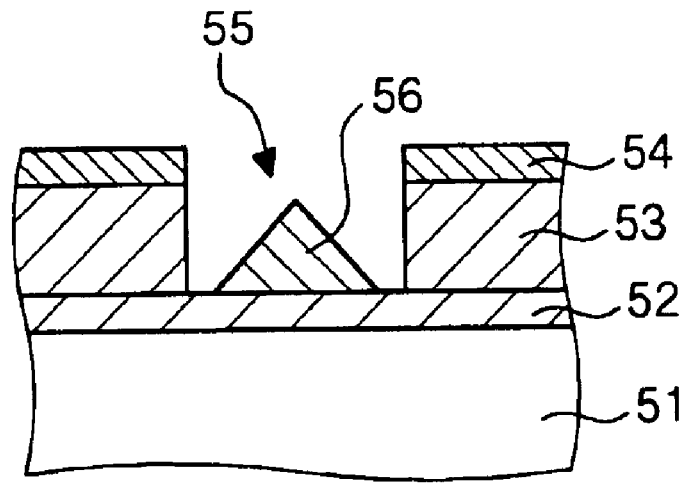

The Spindt type field emission device is structured as shown in FIG. 32B. That is, the Spindt type field emission device comprises;

(A) a cathode electrode 52 formed on a support 51, (B) an insulating layer 53 formed on the support 51 and the cathode electrode 52, (C) a gate electrode 54 formed on the insulating layer 53, (D) an opening portion 55 which penetrates through the gate electrode 54 and the insulating layer 53, and (E) an electron emitting electrode 56 which is formed on the cathode electrode 52 positioned in a bottom portion of the opening portion 55 and has a conical form, and electrons are emitted from the tip portion of the electron emitting electrode 56. The basic method of producing the Spindt type field emission device is as already explained with reference to FIGS. 31A, 31B, 32A and 32B.

Figure 33A:
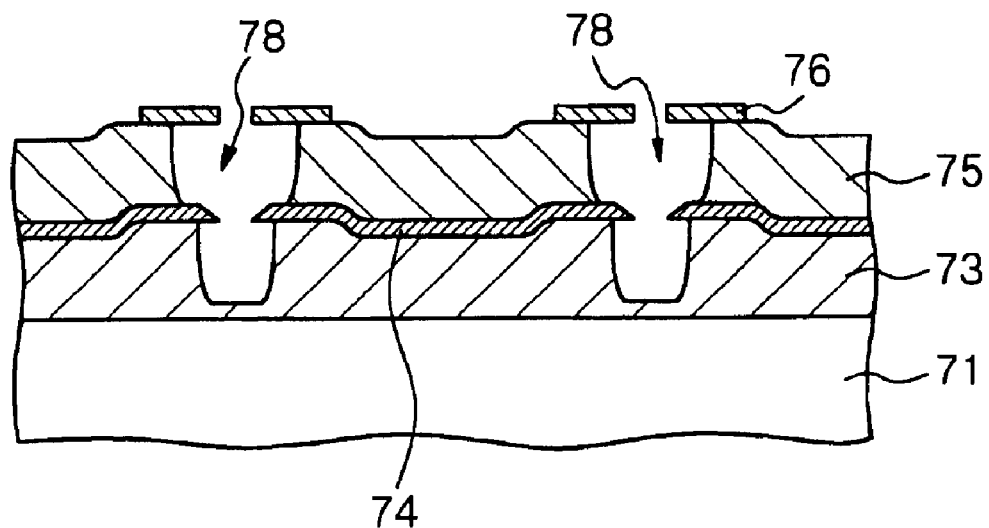
FIGS. 33A and 33B are schematic partial end views of edge type field emission devices.

FIG. 33A shows a schematic partial end view of the edge type field emission device. The edge type field emission device comprises;

(A) a first insulating layer 73 formed on a support 71, (B) an electron emitting layer 74 formed on the first insulating layer 73, (C) a second insulating layer 75 formed on the electron emitting layer 74 and the first insulating layer 73, (D) a gate electrode 76 formed on the second insulating layer 75, and (E) an opening portion 78 which penetrates through at least the gate electrode 76, the second insulating layer 75 and the electron emitting layer 74, and electrons are emitted from an edge portion of the electron emitting layer 74 which edge portion is projected from a wall surface of the opening portion 78. The above-constituted edge type field emission device will be called "edge type field emission device of first structure" as a matter of convenience.

Figure 33B:
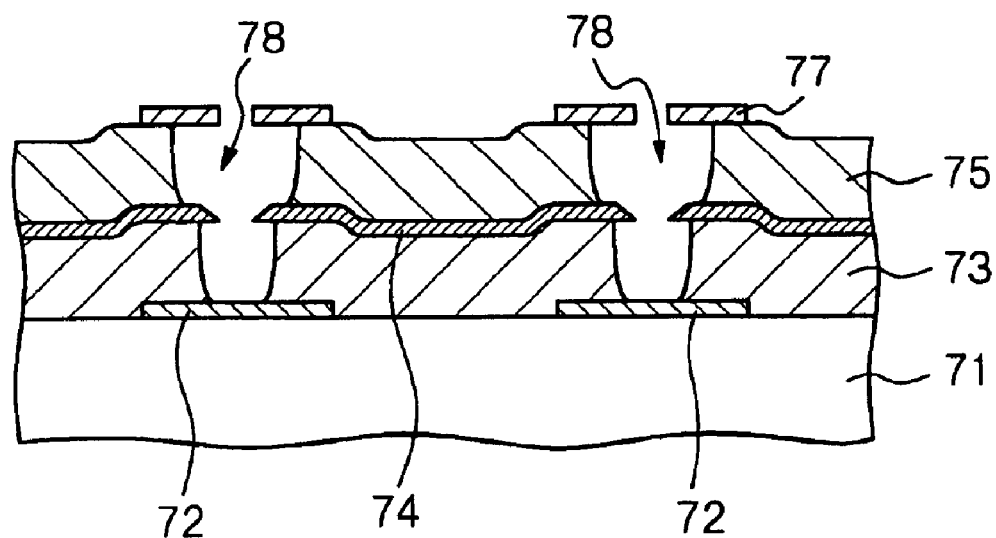
Figure 34:
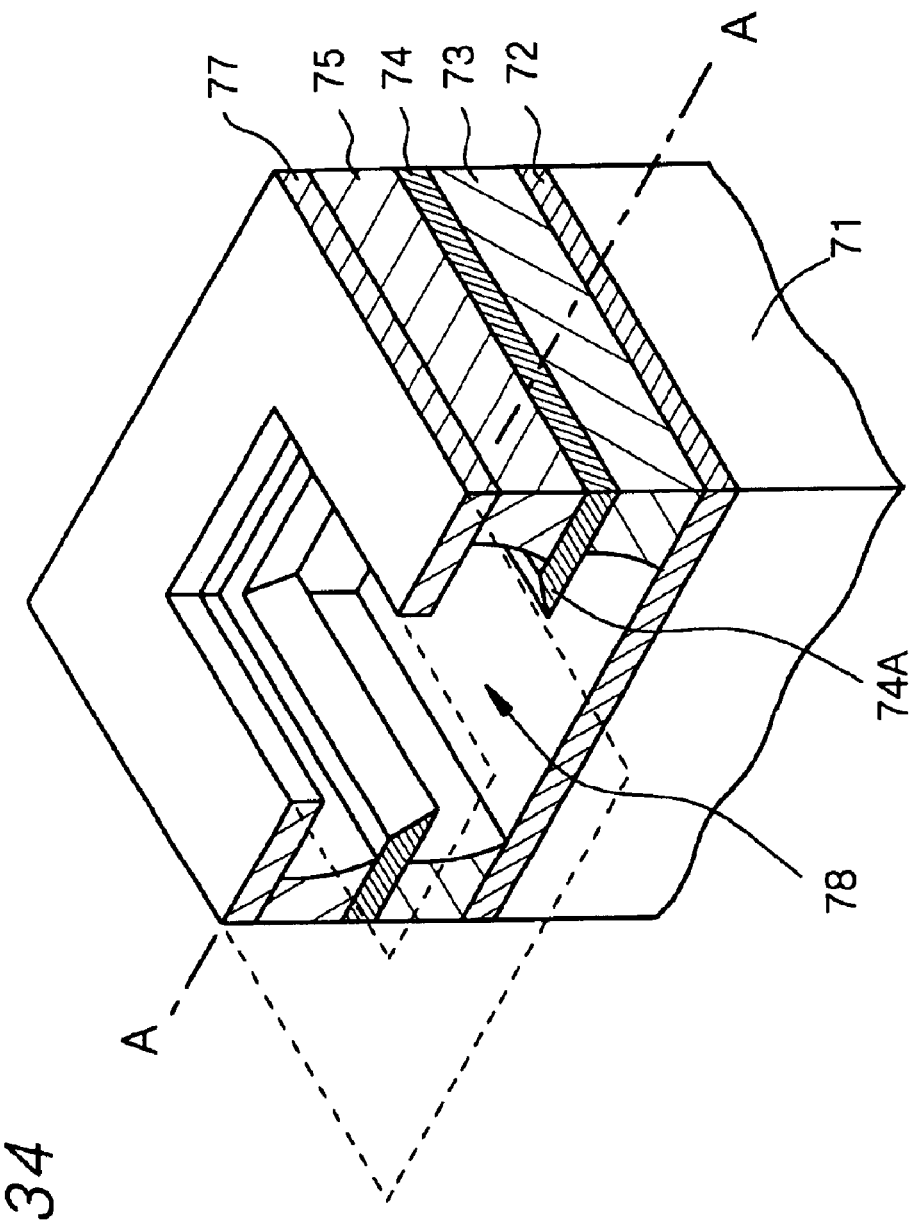
FIG. 34 is a schematic perspective view prepared by partially cutting a support, etc., in the vicinity of an opening portion of the edge type field emission device shown in FIG. 33B.
Figure 35A:
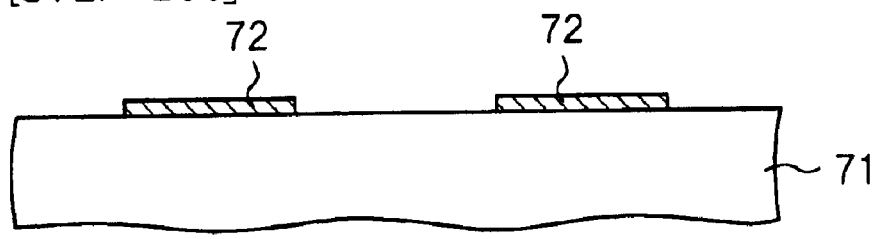
FIGS. 35A to 35C are schematic partial end views of a support, etc., for explaining the method of producing the edge type field emission device shown in FIG. 33B.
Figure 35B:
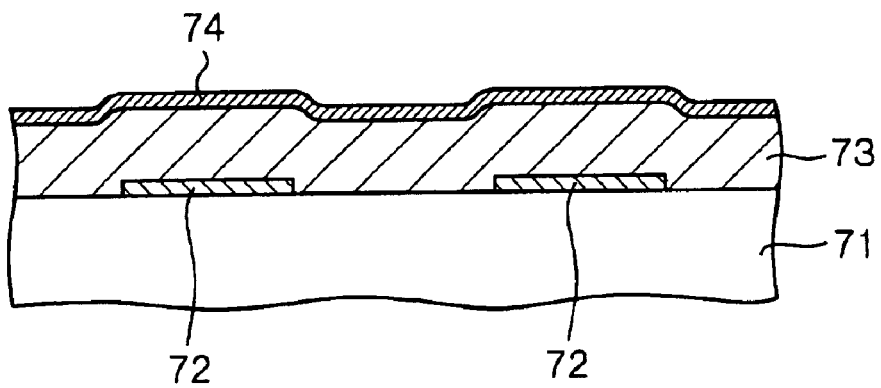
Figure 35C:
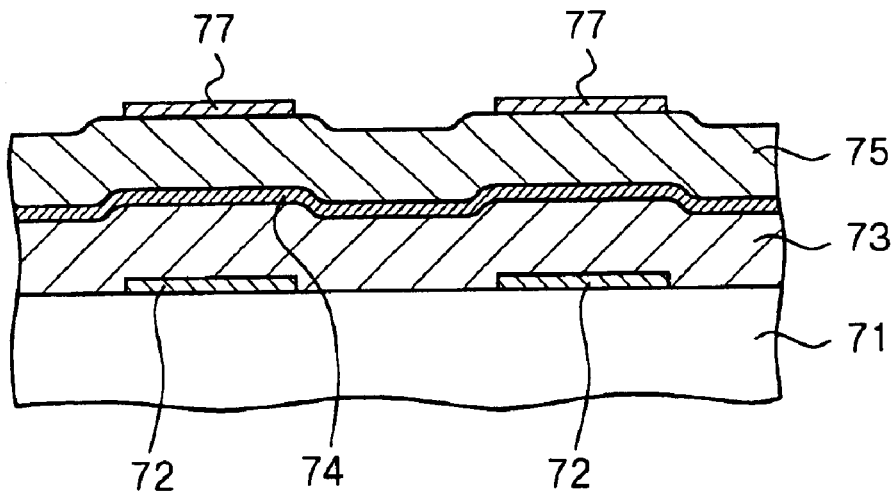

FIG. 33B shows a schematic partial end view of a variant of the edge type field emission device. The variant of the edge type field emission device comprises;

(A) a first gate electrode 72 formed on a support 71, (B) a first insulating layer 73 formed on the support 71 and the first gate electrode 72, (C) an electron emitting layer 74 formed on the first insulating layer 73, (D) a second insulating layer 75 formed on the first insulating layer 73 and the electron emitting layer 74, (E) a second gate electrode 77 formed on the second insulating layer 75, and (F) an opening portion 78 which penetrates through the second gate electrode 77, the second insulating layer 75, the electron emitting layer 74 and the first insulating layer 73 and has a bottom portion where the surface of the first gate electrode 72 is exposed, and electrons are emitted from an edge portion 74A of the electron emitting layer 74 which edge portion is projected from a wall surface of the opening portion 78. FIG. 34 shows a schematic perspective view obtained by partially cut and exposing the support 71, etc., around the opening portion 78. The schematic partial end view shown in FIG. 33B is an end view taken along a line A—A in FIG. 34. The above-constituted edge type field emission device will be called "edge type field emission device of second structure" as a matter of convenience. In the edge type field emission device of second structure, the first gate electrode 72 is formed below the electron emitting layer 74, so that an electric field having a far higher intensity than that in the edge type field emission device of first structure can be generated in the vicinity of the edge portion 74A of the electron emitting layer 74 which edge portion is projected from the wall surface of the opening portion 78.

The method of producing the edge type field emission device shown in FIG. 33B will be explained with reference to FIGS. 35A to 37B.

[Step-200]

First, an approximately 0.2 $\mu$m thick conductive material layer composed of tungsten for a first gate electrode is formed on the support 71 made, for example, of a glass substrate by a sputtering method. The conductive material layer is patterned by general procedures according to a lithographic method and a dry etching method, to form the first gate electrode 72 (see FIG. 35A).

[Step-210]

Then, the first insulating layer 73 is formed on the entire surface. In this embodiment, for example, an approximately 0.3 $\mu$m thick first insulating layer 73 composed of $SiO_2$ is formed. Further, a conductive material layer composed of tungsten for an electron emitting layer is formed on the first insulating layer 73. The conductive material layer has a thickness, for example, of 0.2 $\mu$m. Then, it is patterned in a predetermined form to form the electron emitting layer 74 (see FIG. 35B).

[Step-220]

Then, the second insulating layer 75 composed, for example, of $SiO_2$ is formed on the entire surface. The second insulating layer 75 has a thickness, for example, of 0.7 $\mu$m. Further, an approximately 0.2 $\mu$m thick conductive material layer composed of tungsten for a second gate electrode is formed on the second insulating layer 75, and the conductive material layer is patterned in a predetermined form, whereby the second gate electrode 77 can be obtained (see FIG. 35C). The material and the thickness of the second gate electrode 77 may be the same as, or different from, those of the first gate electrode 72.

[Step-230]

Then, a resist layer 79 is formed on the entire surface, and further, a resist opening portion 79A is formed in the resist layer 79 so as to expose part of the surface of the second gate electrode 77. The resist opening portion 79A has the form of a rectangle as a plan view. The major sides of the rectangle are approximately 100 $\mu$m long, and the minor sides are several $\mu$m to approximately 10 $\mu$m long. Then, the second gate electrode 77 exposed in the bottom portion of the resist opening portion 79A is anisotropically etched, for example, by an RIE (reactive ion etching) method, to form an opening portion 78A (see FIG. 36A). Since the second gate electrode 77 is composed of tungsten in this embodiment, the opening portion 78A having a perpendicular wall can be formed by etching with an $SF_6$ gas.

[Step-240]

Figure 36A:
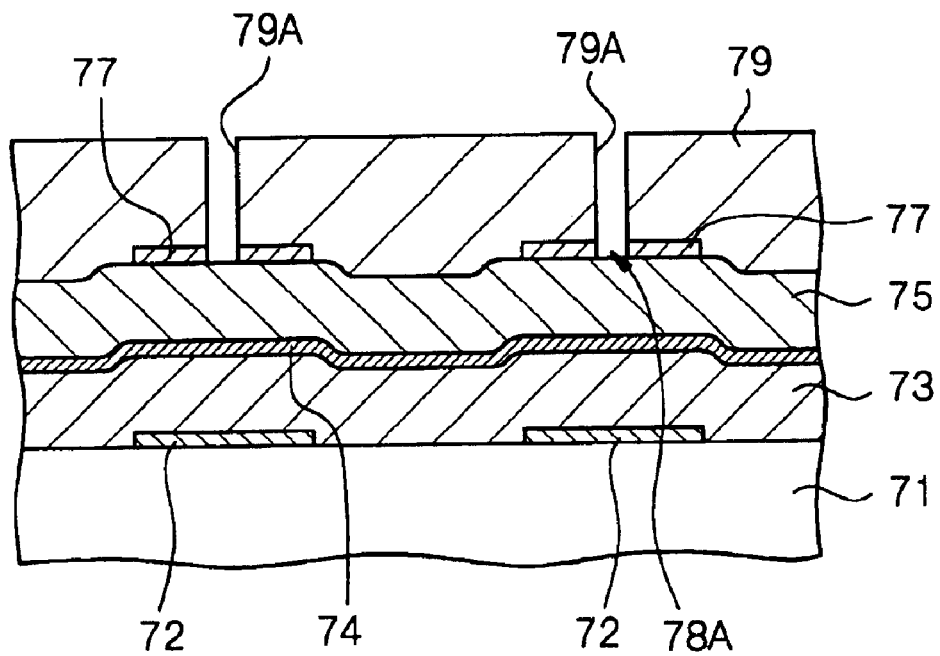
FIGS. 36A and 36B, following
Figure 36B:
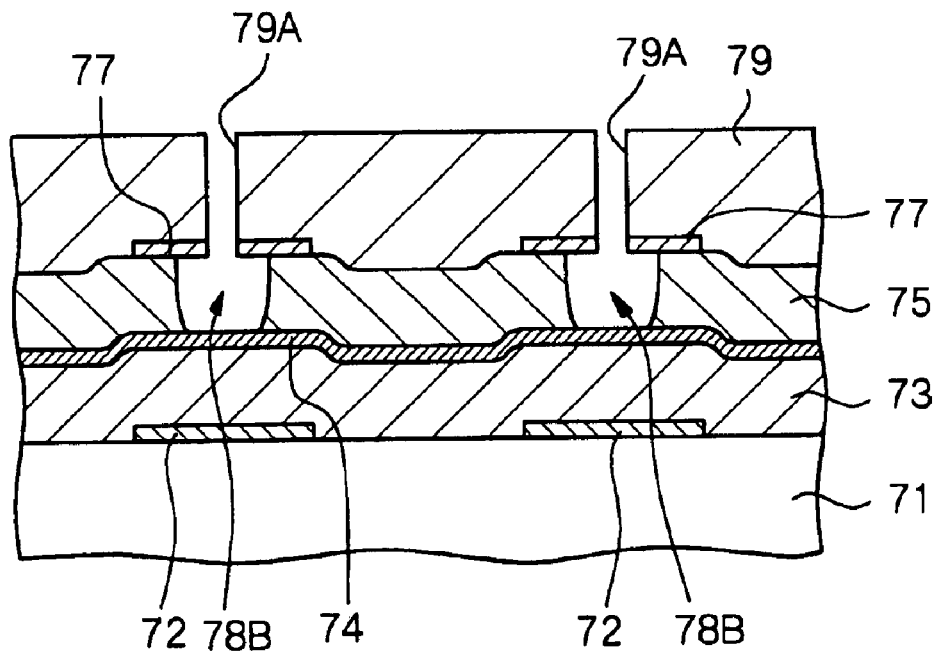

Then, as shown in FIG. 36B, the second insulating layer 75 exposed in the bottom portion of the opening portion 78A is isotropically etched to form an opening portion 78B. Since the second insulating layer 75 is composed of $SiO_2$ in this embodiment, wet etching is carried out using a buffered hydrofluoric acid aqueous solution. The wall surface of the opening portion 78B comes to be positioned back from the opening edge portion of the opening portion 78A, and the backing amount in this case can be controlled by adjusting the length of the etching time. In this embodiment, the wet etching is carried out until the lower end of the opening portion 78B stands back from the opening edge portion of the opening portion 78A.

[Step-250]

Figure 37A:
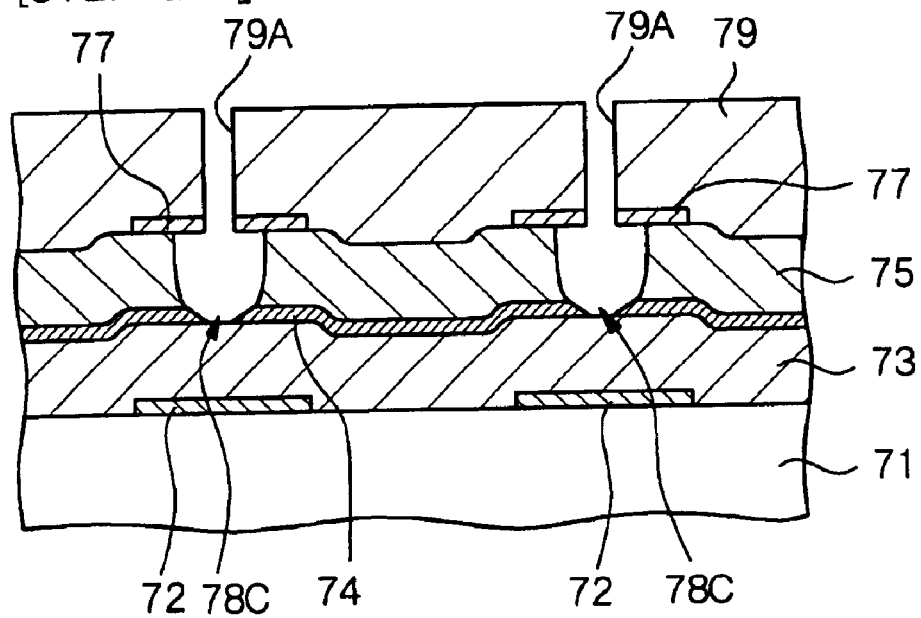
FIGS. 37A and 37B, following

Then, as shown in FIG. 37A, the electron emitting layer 74 exposed in the bottom portion of the opening portion 78B is dry-etched under a condition using ions as main etching species. In the dry-etching using ions as main etching species, ions as charged particles can be accelerated by using a bias voltage applied to a substance to be etched and an interaction of plasma and a magnetic field, so that anisotropic etching generally proceeds, and as a result, the substance has an etched surface which constitutes an perpendicular wall. In [Step-250], however, some of the main etching species in the plasma have an incidence angle different from the perpendicularity, and scattering on the opening edge portion of the opening portion 78A also causes some oblique-incidence components, so that there is a certain probability that some main etching species enter a region of the exposed surface of the electron emitting layer 74 which region is originally free from the arrival of ions since it is shield by the opening portion 78A. In this case, main etching species having a smaller incidence angle from a normal of the electron emitting layer 74 exhibit a higher incidence probability, and those having a larger incidence angle exhibit a lower incidence probability. While the position of the upper end portion of an opening portion 78C formed in the electron emitting layer 74 is nearly aligned with the position of the lower end portion of the opening portion 78B, therefore, the position of the lower end portion of the opening portion 78C is projected forward more than the position of the upper end portion thereof. That is, the thickness of the electron emitting layer 74 decreases toward the tip portion in the projection direction, so that the end portion comes to be sharpened. This embodiment uses $SF_6$ as an etching gas, whereby the electron emitting layer 74 can be well processed.

[Step-260]

Figure 37B:
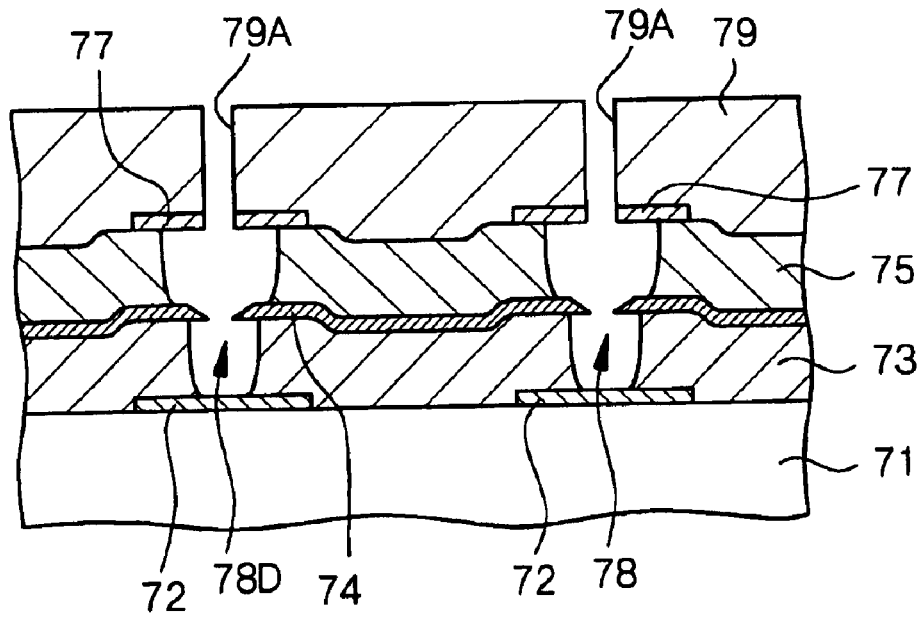

Then, as shown in FIG. 37B, the first insulating layer 73 exposed in the bottom portion of the opening portion 78C is isotropically etched to form an opening portion 78D, whereby the opening portion 78 is completed. In this embodiment, the wet etching is carried out with a buffered hydrofluoric acid aqueous solution like the etching of the above second insulating layer 75. The wall surface of the opening portion 78D comes to be positioned back from than the lower end portion of the opening portion 78C. The backing amount in this case can be controlled by adjusting the length of the etching time. In this case, the wall surface of the previously formed opening portion 78B comes to be positioned further backward. After the completion of the opening portion 78, the resist layer 79 is removed, whereby a cathode panel having the edge type field emission devices structured as shown in FIG. 33B can be obtained.

Figure 38:
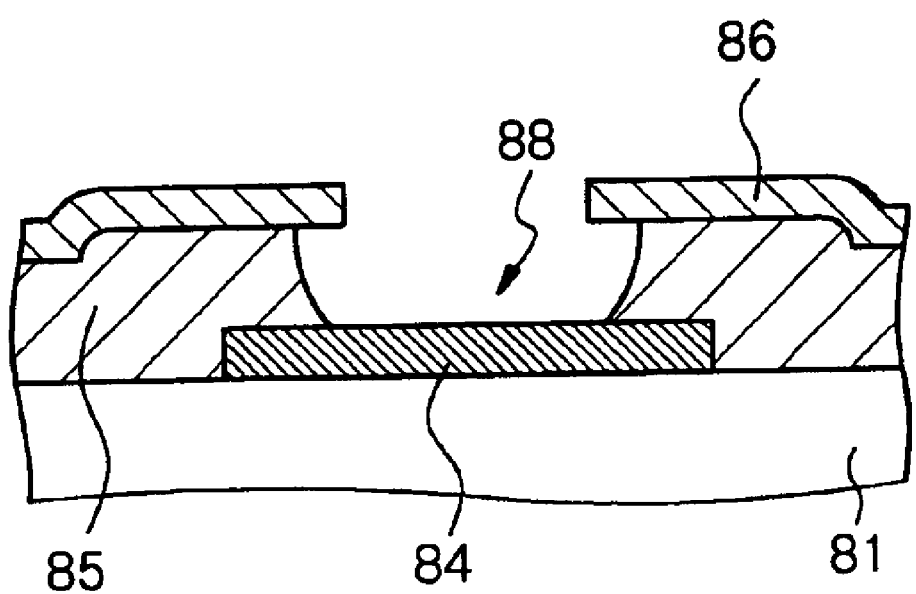
FIG. 38 is a schematic partial end view of a flat type field emission device.

FIG. 38 shows a schematic partial end view of the flat type field emission device. The flat type field emission device comprises;

(A) an electron emitting layer 84 formed on a support 81,
(B) an insulating layer 85 formed on the support 81 and the electron emitting layer 84,
(C) a gate electrode 86 formed on the insulating layer 85, and
(D) an opening portion 88 which penetrates through the gate electrode 86 and the insulating layer 85 and has a bottom portion where the surface of the electron emitting layer 84 is exposed, and electrons are emitted from the surface of the electron emitting layer 84 exposed in the bottom portion of the opening portion 88.

Figure 39A:
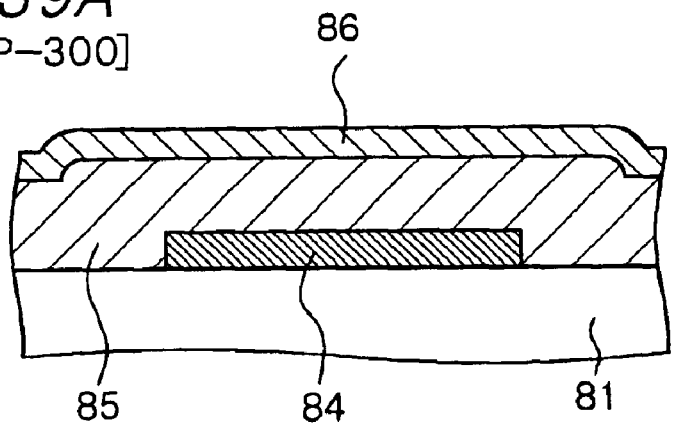
FIGS. 39A to 39C are schematic partial end views of a support, etc., for explaining the method of producing the flat type field emission device shown in FIG. 38.
Figure 39B:
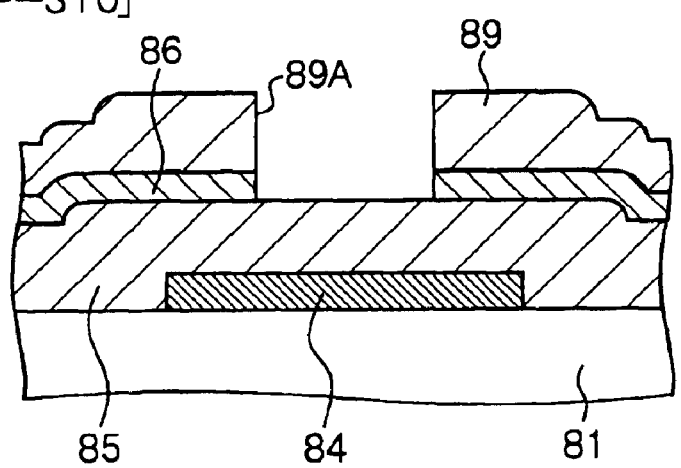

The method of producing the flat type field emission device shown in FIG. 38 will be explained with reference to FIGS. 39A to 39C hereinafter.

[Step-300]

First, an approximately 0.2 $\mu$m thick conductive material layer composed of tungsten for an electron emitting layer is formed on the support 81 made, for example, of a glass substrate by a sputtering method, and the conductive material layer is patterned according to general procedures, to form the electron emitting layer 84. Then, the insulating layer 85 is formed on the support 81 and the electron emitting layer 84. In this embodiment, for example, an approximately 1 $\mu$m thick $SiO_2$ layer is formed by a CVD method using TEOS (tetraethoxysilane) as a source gas. Further, an approximately 0.2 $\mu$m conductive material layer composed, for example, of tungsten for a gate electrode is formed on the insulating layer 85, and the conductive material layer is patterned to form the gate electrode 86. FIG. 39A shows a state where the above process is completed.

[Step-310]

Then, a resist layer 89 is formed on the entire surface, and further, a resist opening portion 89A is formed in the resist layer 89 so as to expose part of the surface of the gate electrode 86. The resist opening portion 89A has the form, for example, of a circle as a plan view. Then, the gate electrode 86 exposed in the bottom portion of the resist opening portion 89A is anisotropically etched, for example, by an RIE method. Since the gate electrode 86 is composed of tungsten in this embodiment, the etching can be carried out with an $SF_6$ gas. FIG. 39B shows a state where the above process is completed.

[Step-320]

Figure 39C:
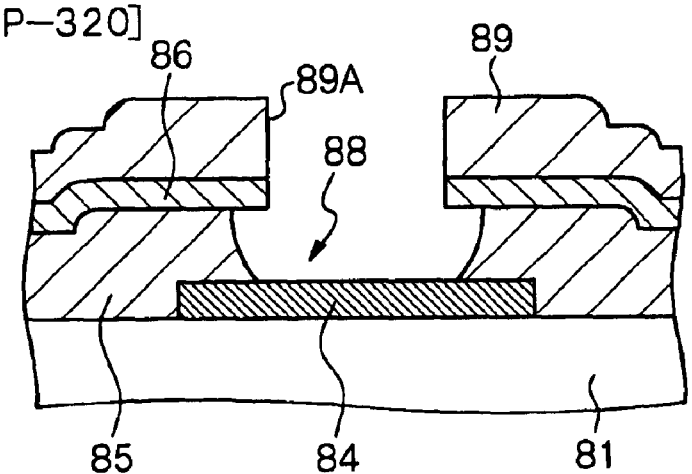

Then, as shown in FIG. 39C, the insulating layer 85 exposed inside the resist opening portion 89A is isotropically etched, to form the opening portion 88. Since the insulating layer 85 is composed of $SiO_2$ in this embodiment, wet etching is carried using a buffered hydrofluoric acid aqueous solution. The wall surface of the insulating layer 85 comes to be positioned back from the opening edge portion of the gate electrode 86, and the backing amount in this case can be controlled by adjusting the length of the etching time. In the above manner, a cathode panel having the flat type field emission devices shown in FIG. 38 can be obtained.

In the Spindt type field emission device, the electron emitting electrode 56 can be composed of a metal such as tungsten (W), niobium (Nb), tantalum (Ta), titanium (Ti), molybdenum (Mo), chromium (Cr), aluminum (Al) or copper (Cu), or any one of alloys or compounds of these metal elements. Of these, so-called refractory metal or alloy or compound thereof is preferred. The electron emitting electrode 56 can be formed, for example, by a vapor deposition method or a sputtering method.

In the edge type field emission device or the flat type field emission device, the electron emitting layer 74 or 84 can be typically composed, for example, of tungsten (W), tantalum (Ta), titanium (Ti), molybdenum (Mo), chromium (Cr), any one of alloys or compounds of these (for example, nitrides such as TiN or silicides such as $WSi_2$, $MoSi_2$, $TiSi_2$ and TaSi$_2$), or semiconductor such as diamond. The method of forming the electron emitting layer 74 or 84 can be selected from general thin-film-forming processes such as a vapor deposition method, a sputtering method, a CVD method, an ion plating method, a printing method and a plating method. Although not specially limited, the thickness of the electron emitting layer 74 or 84 is approximately 0.05 to 0.5 $\mu$m, preferably 0.1 to 0.3 $\mu$m. The material for constituting the electron emitting layer 74 or 84 may be same as, or different from, the material for forming the gate electrode.

The material for constituting the cathode electrode 52 and the gate electrode 54 in the Spindt type field emission device, the material for constituting the gate electrode 76 or for constituting the first gate electrode 72 and the second gate electrode 77 in the edge type field emission device and the material for constituting the gate electrode 86 in the flat type field emission device can be selected from metals such as tungsten (W), niobium (Nb), tantalum (Ta), molybdenum (Mo), chromium (Cr), aluminum (Al) and copper (Cu), alloys or compounds of these metal elements, semiconductors such as silicon (Si), diamond or carbon. The above electrodes may be composed of one material, materials of the same kind, or material of different kinds. The above electrodes can be formed by any one of general thin-film-forming processes such as a vapor deposition method, a sputtering method, a CVD method, an ion plating method, a printing method and a plating method.

The branch wiring and the main wiring can be composed of one material, or can be composed of different materials. In some cases, the cathode electrode 52 and the gate electrode 54 in the Spindt type field emission device, the gate electrode 76 or the first gate electrode 72 and the second gate electrode 77 in the edge type field emission device, and the gate electrode 86 in the flat type field emission device can be integrally formed of the same material as that of the branch wiring and the main wiring (i.e., aluminum or aluminum alloy).

As a material for the insulating layer 53, the first insulating layer 73, the second insulating layer 75 or the insulating layer 85, SiO$_2$, SiN, SiON and a glass paste hardened (cured) product may be used alone, or may be used to form a stack structure of at least two members of these. The above layer(s) can be formed by a known process such as a CVD method, a coating method, a sputtering method and a printing method.

The supports 51, 71 and 81 can be selected from any supports so long as the surface thereof is constituted of a material having an insulation property. These supports include a glass substrate, a glass substrate having an insulation layer formed on its surface, a quartz substrate, a quartz substrate having an insulation layer formed on its surface and a semiconductor substrate having an insulation layer formed on its surface.

In the present invention, there may be employed a constitution in which an insulating interlayer is formed on the entire surface including the surface of the gate electrode or the second gate electrode and a focus electrode may be formed on the insulating interlayer. In this case, a second opening portion communicating with the opening portion is formed in the insulating interlayer. The focus electrode refers to an electrode which focuses or converges the path of electrons attracted toward the anode electrode for making it possible to improve a brightness and prevent color mixing between adjacent pixels. The focus electrode is effective particularly when the distance from the cathode panel to the anode panel is relatively large. The focus electrode is not necessarily required to be formed for every field emission device. For example, when the focus electrodes are arranged in a predetermined arrangement direction of the field emission devices, a common focusing effect can be produced on a plurality of the field emission devices. Therefore, the second opening portion formed in the insulating interlayer is not necessarily required to be provided in a material layer constituting the focus electrode. The form of the second opening portion as a plan view may be congruent with, similar to, or different from, the form of the opening portion as a plan view.

EXAMPLE 1

Example 1 is concerned with the cathode panel for a cold cathode field emission display (to be simply referred to as "cathode panel" hereinafter) and a display according to the first aspect of the present invention, and a method of producing the cathode panel.

The electron emitting portion 10 can be constituted of a plurality (for example, approximately tens to one thousand) of the above Spindt type field emission devices, a plurality (approximately tens to hundreds) of the above edge type field emission devices or one or a plurality of the above flat type field emission device(s). In principle, all of Examples to be described hereinafter will explain cathode panels with reference to embodiments in which the electron emitting portion 10 is constituted of a plurality of the Spindt type field emission devices, while these Examples can also apply to embodiments in which the electron emitting portion 10 is constituted of field emission devices of any other type.

Figure 1:
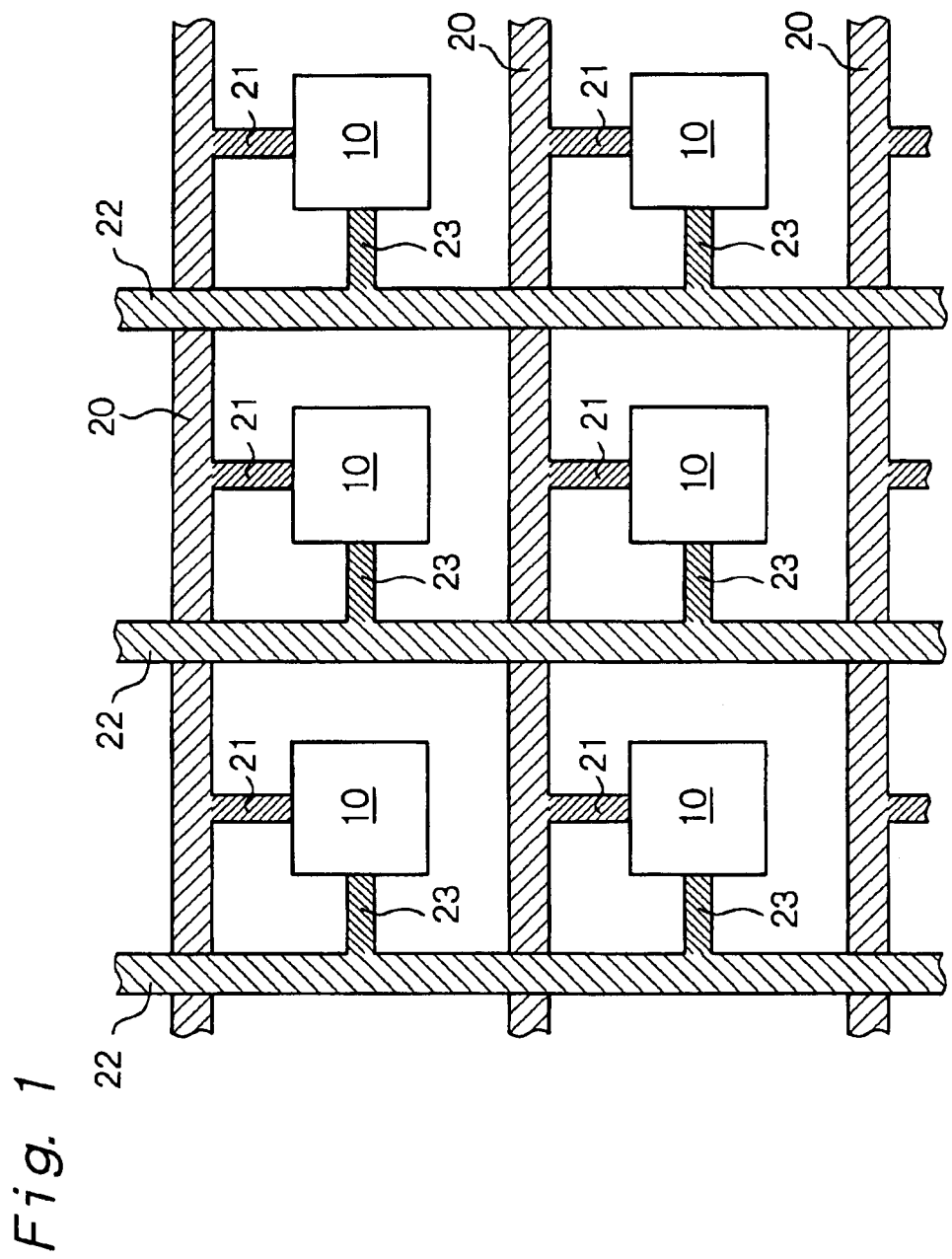
FIG. 1 is a schematic plan layout of main wirings, branch wirings and cold cathode emitting portions in a cathode panel of Example 1.
Figure 4:
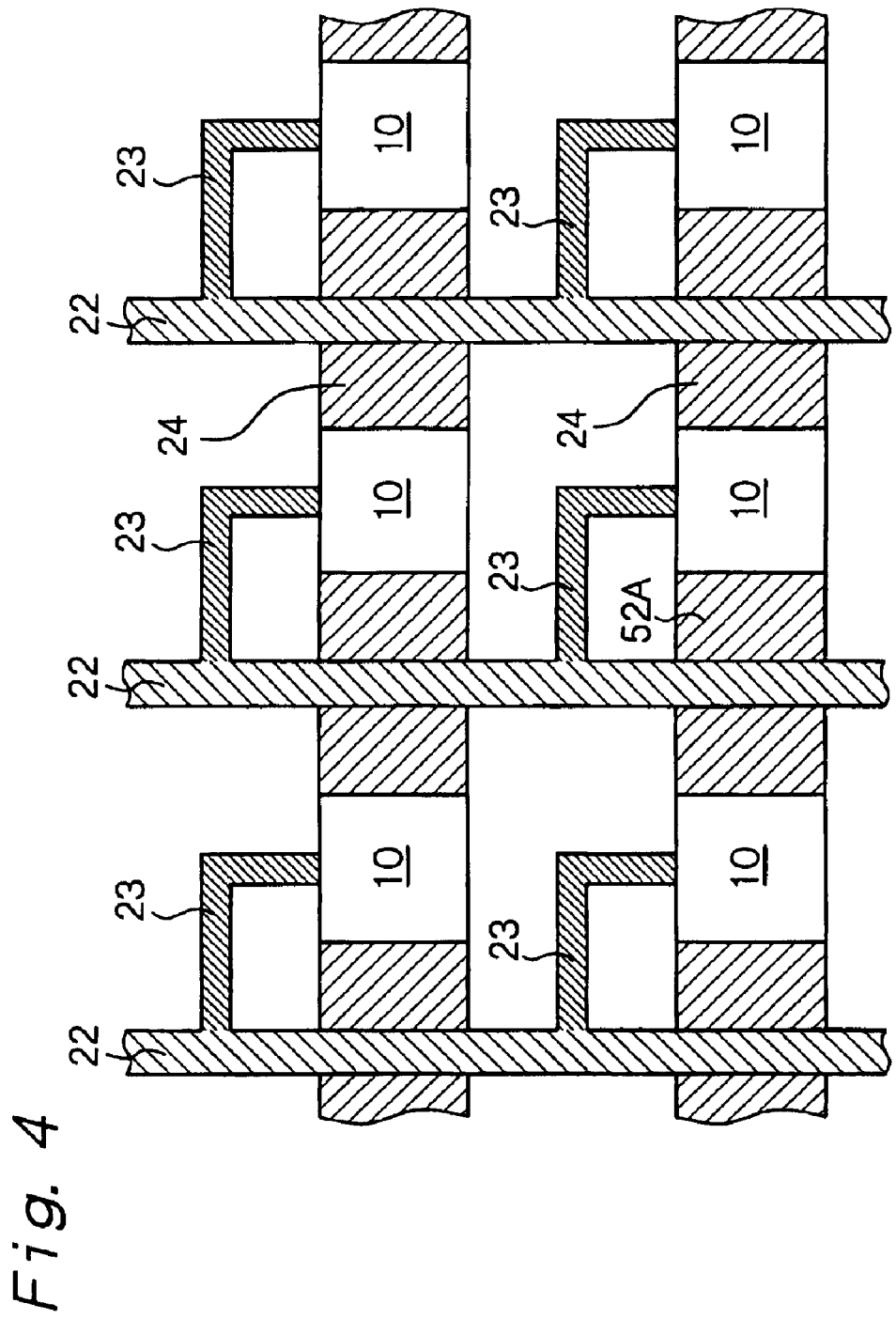
FIG. 4 shows a schematic plan layout of main wirings, branch wirings and cold cathode electron emitting portions in a variant of the cathode panel of Example 1.
Figure 5:
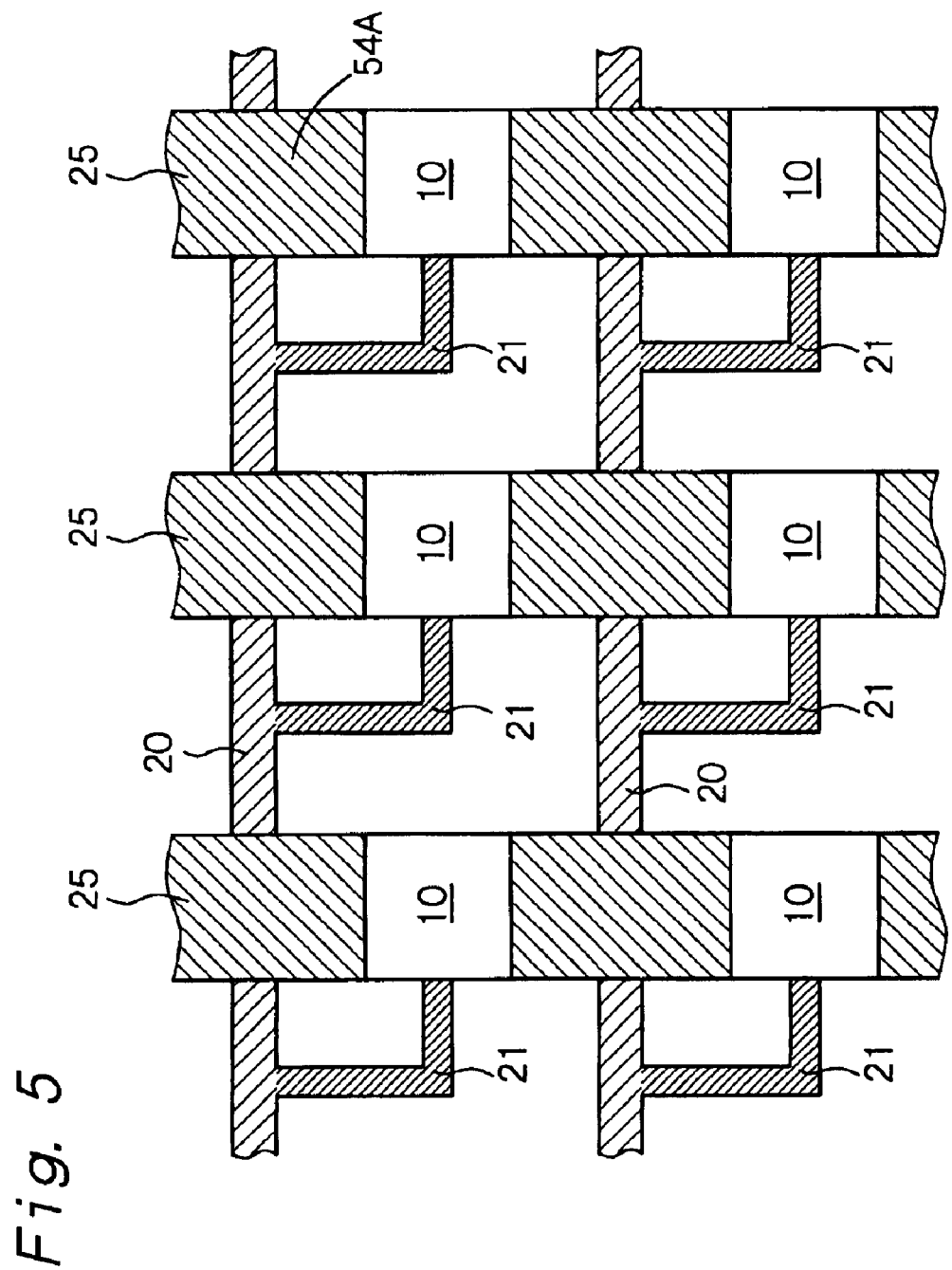
FIG. 5 shows a schematic plan layout of main wirings, branch wirings and cold cathode electron emitting portions in a variant of the cathode panel of Example 1.

As FIG. 1 shows a schematic plan layout of main wirings, branch wirings and the electron emitting portions, the cathode panel of Example 1 has a plurality of main wirings 20, 22, a plurality of branch wirings extending from each main wiring, and electron emitting portions 10 connected to the branch wirings. A plurality of the branch wirings 21 extend from each main wiring 20, and a plurality of the branch wirings 23 extend from each main wiring 22. Each main wiring 20 extends in a first direction, and each main wiring 22 extend in a second direction different from the first direction (for example, in the direction at right angles with the first direction). Each electron emitting portion 10 is connected to the branch wirings 21 and 23. For example, in an embodiment of a cathode panel having electron emitting portion 10 having the Spindt type field emission devices, the cathode electrodes constituting the electron emitting portion 10 are connected to the branch wiring 21, and the gate electrodes are connected to the branch wiring 23. In FIG. 1 and FIGS. 4 and 5 to be referred to later, showing of the support and the insulating layer and detailed showing of the field emission devices are omitted. In Figures showing schematic plan layouts of the main wirings, the branch wirings and the electron emitting portions, the main wirings and the branch wirings are provided with slanting lines for distinctly showing them.

The main wirings 20 and the branch wirings 21 can be formed concurrently with the formation of the cathode electrode 52 in the previously described [step-100] in which a conductive material layer composed, for example, of a polysilicon for a cathode electrode is formed on the support 51 made, for example, of a glass substrate by a plasma-enhanced CVD method and then the conductive material layer is patterned by a lithographic method and a dry etching method. The patterned conductive material layer for a cathode electrode for constituting the electron emitting portion 10 has the form, for example, of a rectangle.

Otherwise, the main wirings 20 and the branch wirings 21 can be formed concurrently with the formation of the electron emitting layer 74 in the previously described [Step-210] in which a conductive material layer composed, for example, of tungsten for an electron emitting layer is formed on the first insulating layer 73 and the conductive material layer is patterned by a lithographic method and a drying etching method.

Otherwise, the main wirings 20 and the branch wirings 21 can be formed concurrently with the formation of the electron emitting layer 84 in the previously described [step-300] in which a conductive material layer composed, for example, of tungsten for an electron emitting layer is formed on the support 81 made, for example, of a glass substrate and the conductive material layer is patterned by a lithographic method and a drying etching method.

The main wirings 22 and the branch wirings 23 can be formed concurrently with the formation of the gate electrode 54 in the previously described [Step-100] in which a conductive material layer for a gate electrode is patterned by a lithographic method and a drying etching method. The patterned conductive material layer for a gate electrode, constituting the gate electrodes for constituting the electron emitting portion 10, has a rectangular form nearly similar to the rectangular form of the patterned conductive material layer for a cathode electrode.

Otherwise, the main wirings 22 and the branch wirings 23 can be formed concurrently with the formation of the first gate electrode 72 in the previously described [Step-200] in which a conductive material layer composed, for example, of tungsten for a first gate electrode is formed on the support 71 made, for example, of a glass substrate and the conductive material layer is patterned by a lithographic method and a dry etching method. Alternatively, the main wirings 22 and the branch wirings 23 can be formed concurrently with the formation of the second gate electrode 77 in the previously described [Step-220] in which a conductive material layer composed, for example, of tungsten for a second gate electrode is formed on the second insulating layer 75 and the conductive material layer is patterned by a lithographic method and a dry etching method.

Otherwise, the main wirings 22 and the branch wirings 23 can be formed concurrently with the formation of the gate electrode 86 in the previously described [step-300] in which a conductive material layer composed, for example, of tungsten for a gate electrode is formed on the insulating layer 85 and the conductive material layer is patterned by a lithographic method and a dry etching method.

The above-explained methods of forming the main wirings 20 and 22 and the branch wirings 21 and 23 can be applied to field emission devices in Examples 3 and 5 to be described later.

Figure 29A:
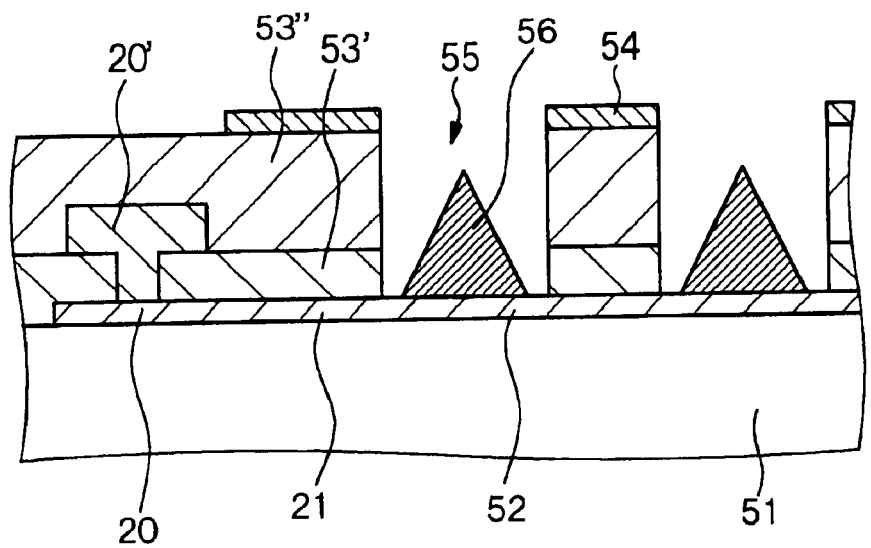
FIG. 29A is a schematic partial end view of a cold cathode electron emitting portion having a main wiring having a shunt structure.
Figure 29B:
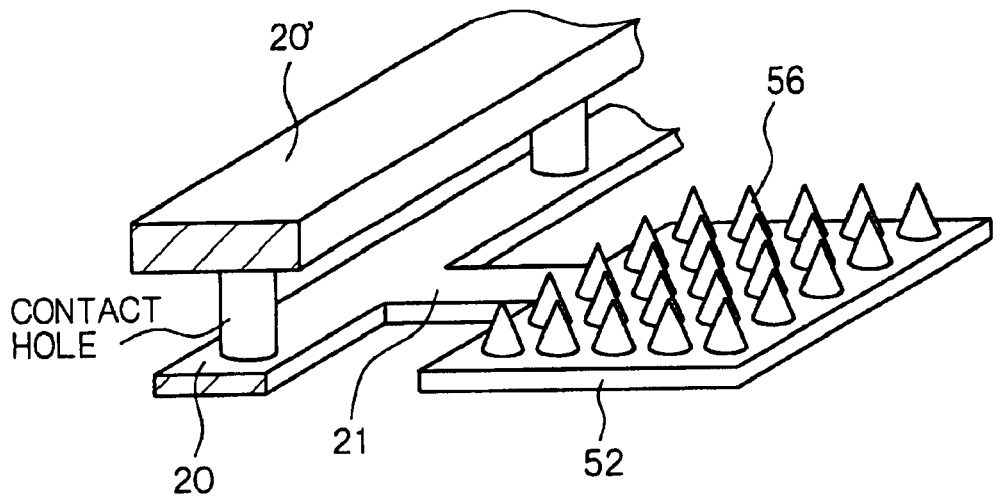
FIG. 29B is a schematic exploded view of part of the cold cathode electron emitting portion having the main wiring having the shunt structure.

As is shown in the schematic partial end view of FIG. 29A and the schematic exploded perspective view of FIG. 29B, there may be also employed a constitution of main wirings 20 and 20' having a so-called shunt structure. That is, in [Step-100], a conductive material layer composed, for example, of polysilicon for a cathode electrode is formed on the support 51 made, for example, of a glass substrate by a plasma-enhanced CVD method, and then the conductive material layer is patterned by a lithographic method and a dry etching method, to form the cathode electrodes, the main wirings and the branch wirings 21. Then, an insulating layer 53' composed of $SiO_2$ is formed on the entire surface by a CVD method, and a hole portion is formed in the insulating layer 53' above the main wiring 20. Then, a layer composed, for example, of an aluminum-containing alloy is formed on the insulating layer 53' including an inside of the hole portion, and the aluminum-containing alloy layer is patterned to form the main wiring 20' on the insulating layer 53' as well. The above main wiring 20' is electrically connected to the main wiring 20 through the hole portion in which the aluminum-containing layer is filled (these will be together called "contact hole"). Then, an insulating layer 53" is formed on the entire surface, and a conductive material layer (for example, TiN layer) for a gate electrode is formed by a sputtering method. Then, the conductive material layer is patterned by a lithographic method and a dry etching method, to form the gate electrodes which are constituted of the above conductive material layer and have an opening portion 55 each. Then, opening portions 55 having a diameter of approximately 1 μm each are formed in the insulating layers 53" and 53'.

Figure 30A:
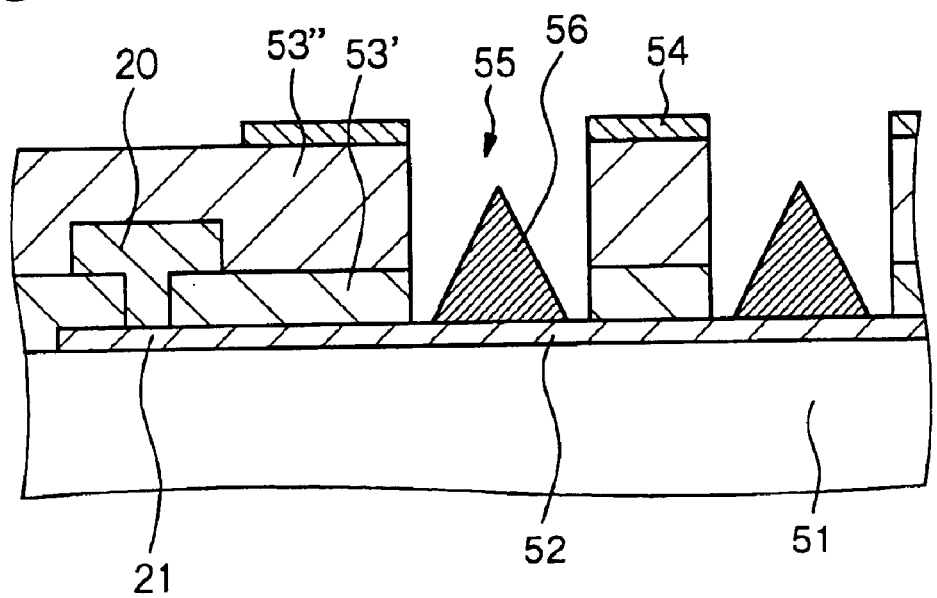
FIG. 30A is a schematic partial end view of a variant of the structure of the main wiring.
Figure 30B:
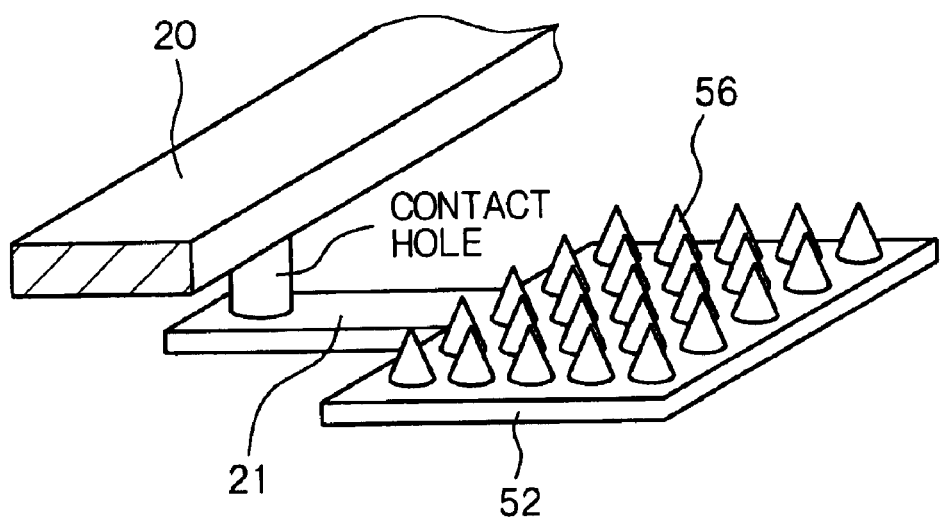
FIG. 30B is a schematic exploded view of part of the variant of the structure of the main wiring.
Figure 31A:
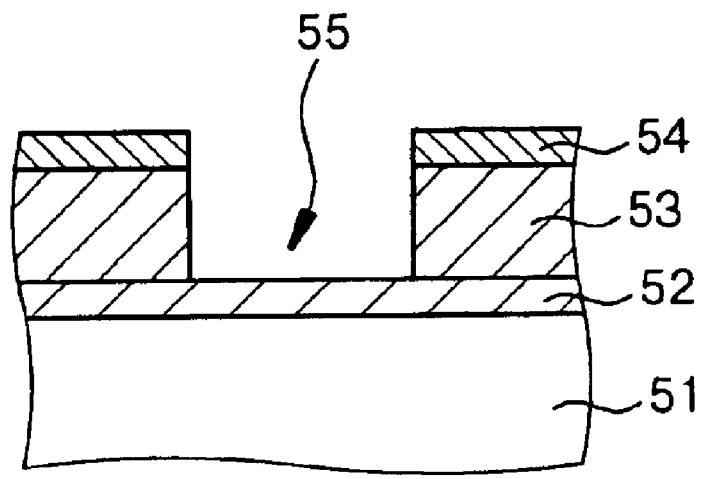
FIGS. 31A and 31B are schematic partial end views of a support, etc., for explaining the method of producing a Spindt type field emission device.
Figure 31B:
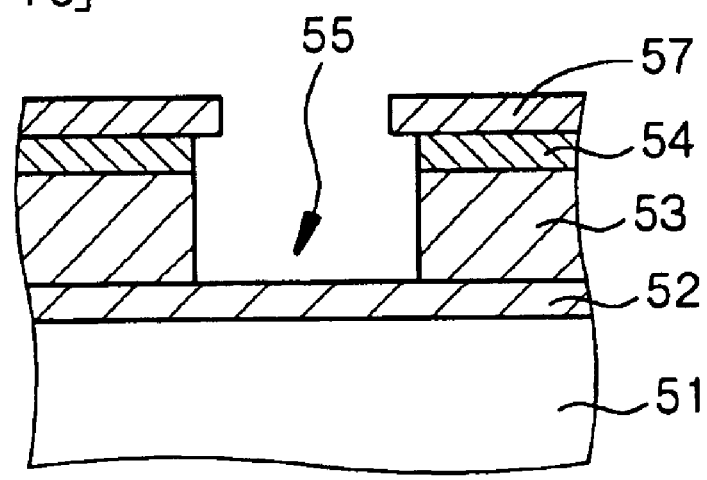

Further, as is shown in the schematic partial end view of FIG. 30A and the schematic exploded perspective view of FIG. 30B, there may be employed a constitution in which the main wiring 20 is formed on the insulating layer 53' alone without forming the main wiring 20 on the support 51, and the branch wiring 21 formed on the support 51 and the main wiring 20 are connected through a contact hole.

In the above shunt structure of the main wiring 20, the occurrence of signal delay, etc., can be avoided. The above shunt structure can be also applied to the cathode panel having electron emitting portions 10 constituted of the edge type field emission devices each or the flat type field emission devices each.

In the obtained cathode panel 50, a working test (working check or working evaluation) of the electron emitting portions 10 are carried out. The working test includes a wiring short-circuit test in which electron emitting portions 10 are measured for a resistance value or anomalous heat generation for a short circuit, and a display characteristic test in which electrons are actually emitted from the cathode panel 50.

Figure 43:
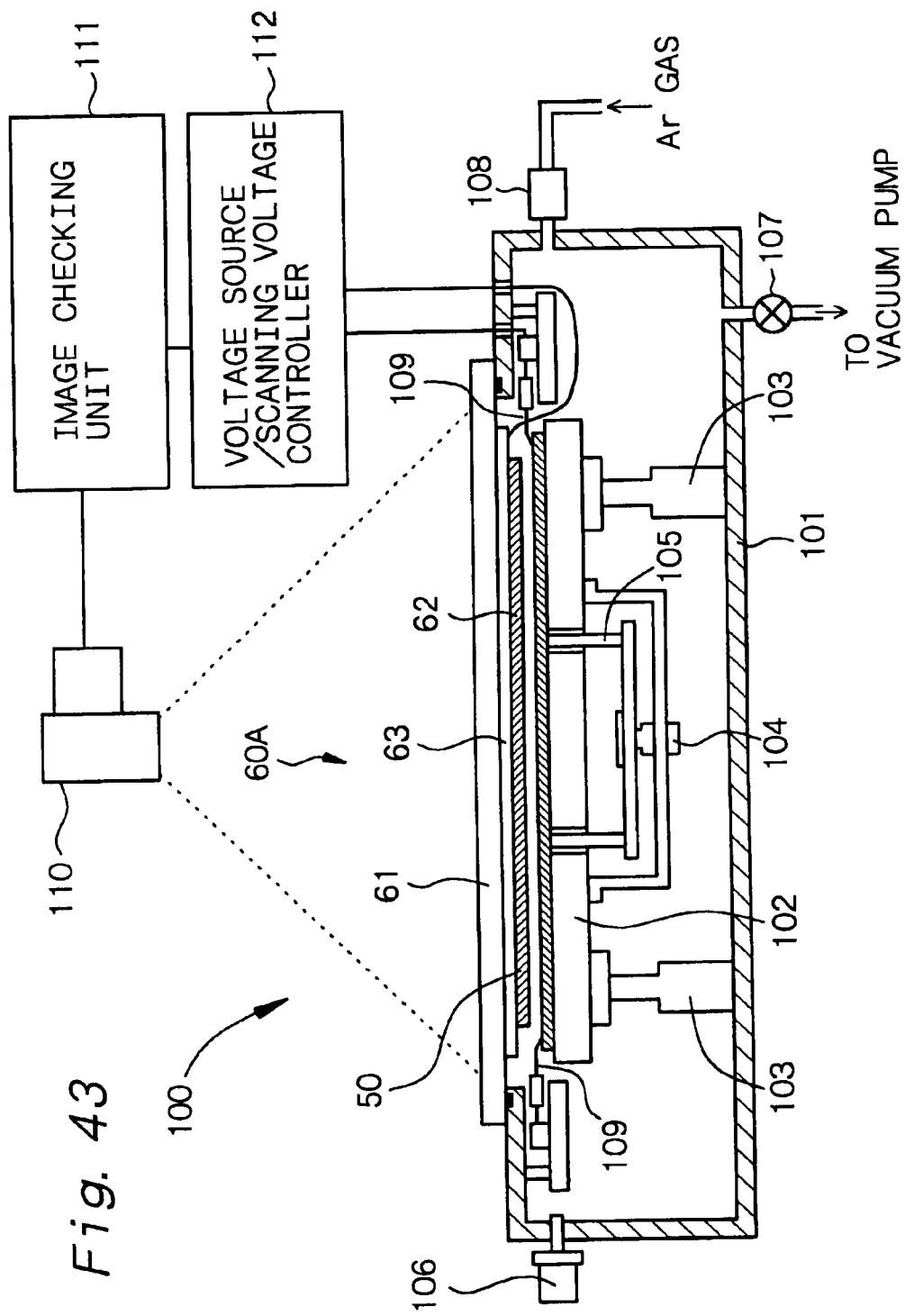
FIG. 43 shows a schematic view of a testing apparatus suitable for carrying out the display characteristic test.
Figure 45A:
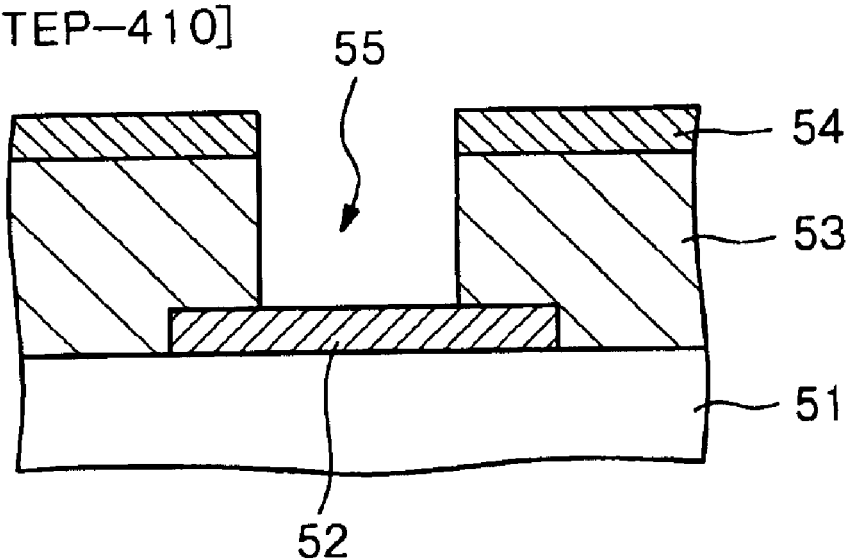
FIGS. 45A and 45B are schematic partial end views of a support, etc., for explaining the method of producing the Spindt type field emission device shown in FIG. 44.
Figure 45B:
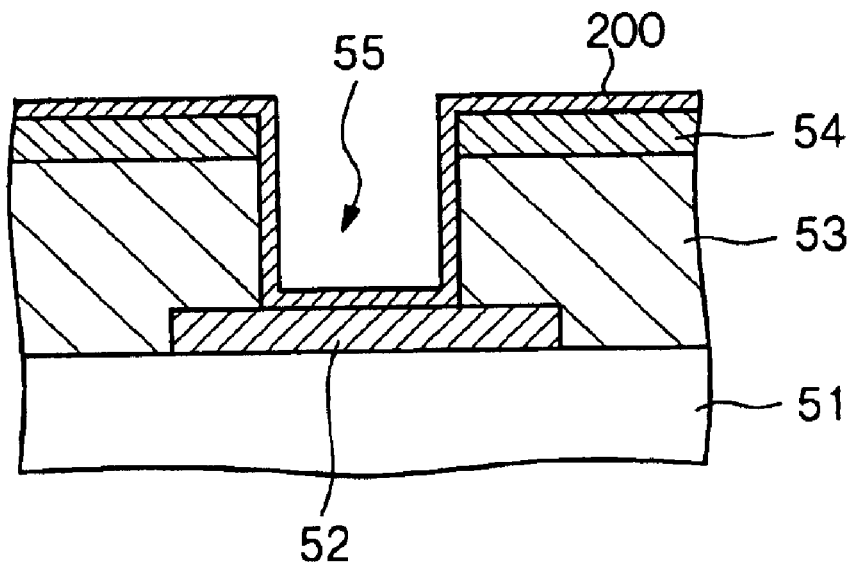

FIG. 43 shows a schematic view of a testing apparatus (checking apparatus or evaluation apparatus) 100 suitable for carrying out the display characteristic test. The testing apparatus 100 has a housing 101 opened in an upper portion. In the housing 101, a checkup table 102 is disposed, and checkup table elevating cylinders 103 are provided below the checkup table 102. The checkup table elevation cylinders 103 are placed on a movable base (not shown) and are movable in the direction perpendicular to the paper surface of FIG. 43 together with the checkup table 102. Further, the checkup table 102 is provided with a pin elevation cylinder 104 below it, and pins 105 are elevated upward and downward in holes formed through the checkup table 102 by the actuation of the pin elevation cylinder 104. The housing 101 is connected to a vacuum pump (not shown) through a valve 107, and a high-vacuum atmosphere can be generated in the housing 101. Further, there is attached a gas flow rate control unit 108 through which an inert gas such as an argon gas can be introduced into the housing 101. In the housing 101, further, there are disposed as many checking voltage application needles 109 structured so as to come in contact with end portions of the main wirings 20 and 22, for example, as the main wirings 20 and 22.

On the opened upper portion of the housing 101, there is disposed a panel 60A having a structure similar to the structure of an anode panel, and the panel 60A has a fluorescent layer 62 and an anode electrode 63 formed on a transparent substrate 61. An image-receiving unit 110 having a CCD camera is disposed above the panel 60A. The image receiving unit 110 is connected to an image checking unit 111. A voltage source/scanning voltage controller 112 is connected to the image checking unit 111, the checking voltage application needles 109 and the anode electrodes 63.

In a working test of the cathode panel 50, the cathode panel 50 is placed on the pins 105 in an elevated position, and the pins 105 is lowered by actuating the pin elevation cylinder 104, to place the cathode panel 50 on the checkup table 102. And, the cathode panel 50 on the checkup table 102 is moved into the housing 101 through a door (not shown) provided in the housing 101, and the vacuum pump is operated to generate a high vacuum atmosphere in the housing 101. An inert gas such as an argon gas is introduced into the housing 101 through the gas flow rate control unit 108, whereby the pressure in the housing 101 is controlled to be a predetermined value (for example, $1.2 \times 10^3$ Pa).

After a desired atmosphere is generated in the housing 101, the checkup table 102 is elevated by actuating the checkup table elevation cylinder 103, to adjust the distance between the cathode panel 50 and the panel 60A, for example, to 1 mm. The checking voltage application needles 109 are also brought into contact with end portions of the main wirings 20 and 22. And, a scanning voltage (for example, 10 volts) is applied to the cathode electrodes 52 of the electron emitting portions 10 from the voltage source/scanning voltage controller 112 through the checking voltage application needles 109, the main wirings 20 and the branch wirings 21, a control voltage (for example, 15 volts) is applied to the gate electrodes 54 of the electron emitting portions 10 from the voltage source/scanning voltage controller 112 through the checking voltage application needle 109, the main wirings 22 and the branch wirings 23, and further, an accelerating voltage (for example, 1.5 kV) is applied to the anode electrode 63 from the voltage source/scanning voltage controller 112, whereby electrons are emitted from the tip portions of the electron emitting electrodes 56. And, the electrons are attracted toward the anode electrode 63 formed in the panel 60A to collide with the fluorescent layer 62 which is a light emitting layer interposed between the anode electrode 63 and the transparent substrate 61. As a result, the fluorescent layer 62 is excited, whereby desired images can be obtained.

The above images are received in the image receiving unit 110, and signals from the image receiving unit 110 are processed in the image checking unit 111. When an electron emitting portion 10 is defective in operation, an image formed from a pixel corresponding to such an electron emitting portion 10 causes a dark point, a bright point, a non-uniform brightness or the like. A position of the electron emitting portion 10 which causes the above image defect (to be called "malfunctioning electron emitting portion 10" hereinafter) is analyzed with the image checking unit 111 and shown on a display unit (not shown). Otherwise, position data of the malfunctioning electron emitting portion 10 is sent to an elimination apparatus to be described later.

After completion of the display characteristic test, atmospheric pressure is restored in the housing 101, the checkup table 102 is lowered by actuating the checkup table elevation cylinder 103, and the checkup table 102 with the cathode panel 50 placed thereon is moved out of the housing 101.

Figure 2:
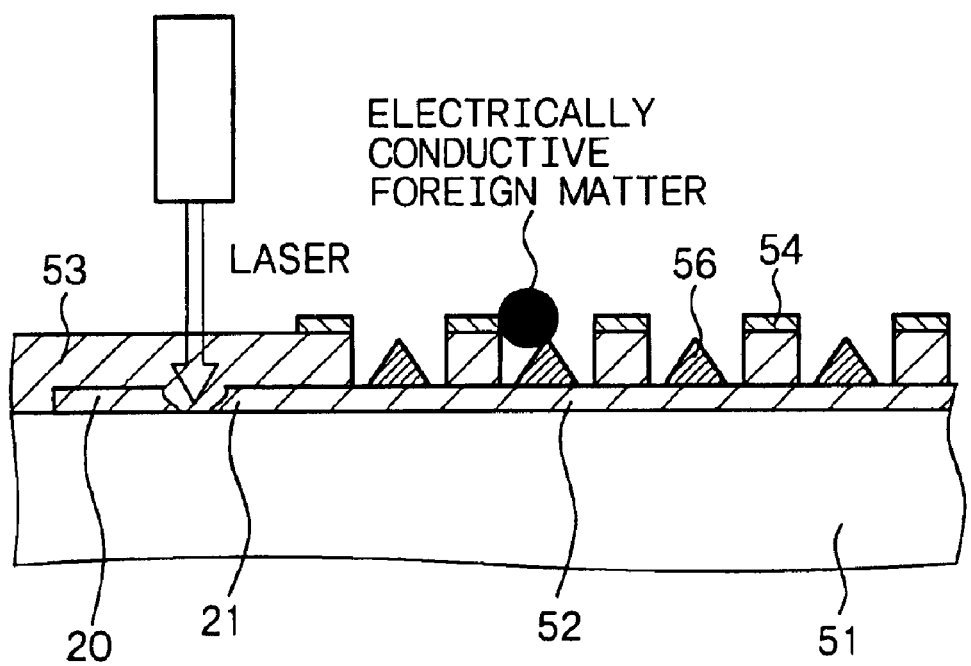
FIG. 2 schematically shows a method of cutting off a branch wiring connecting a cold cathode electron emitting portion and a main wiring.

In the malfunctioning electron emitting portion 10, the branch wiring 21 connecting the electron emitting portion 10 and the main wiring 20 is cut off. Otherwise, the branch wiring 23 connecting the electron emitting portion 10 and the main wiring 22 is cut off. Specifically, as shown in FIG. 2, the branch wiring 21 connecting the electron emitting portion 10 and the main wiring 20 is cut off by means of a laser beam in the elimination apparatus having a laser.

Figure 3A:
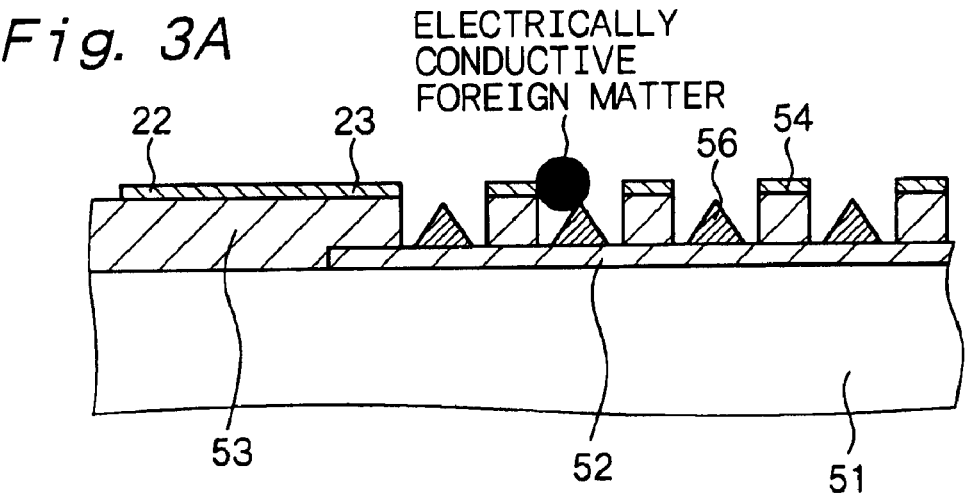
FIGS. 3A to 3C schematically show a method of cutting off a branch wiring connecting a cold cathode electron emitting portion and a main wiring.
Figure 3B:
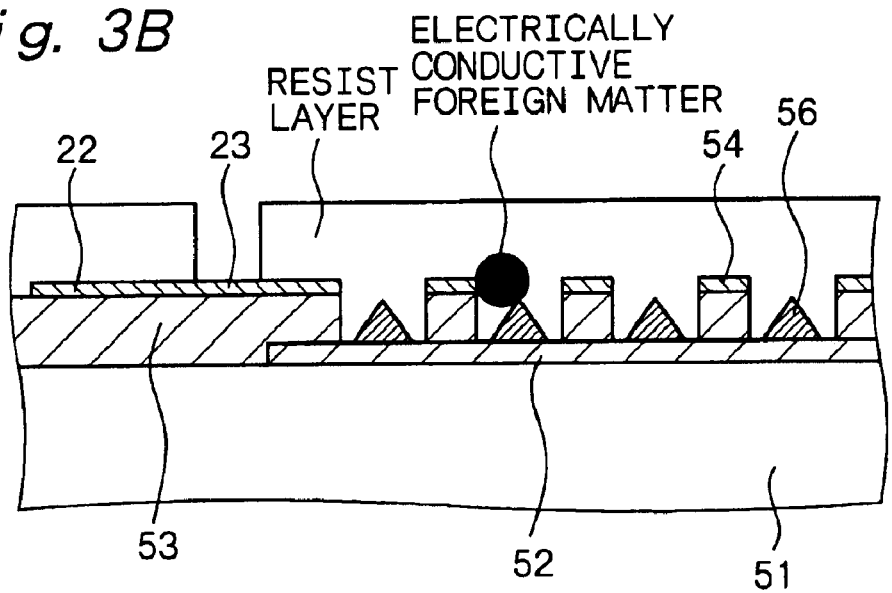
Figure 3C:
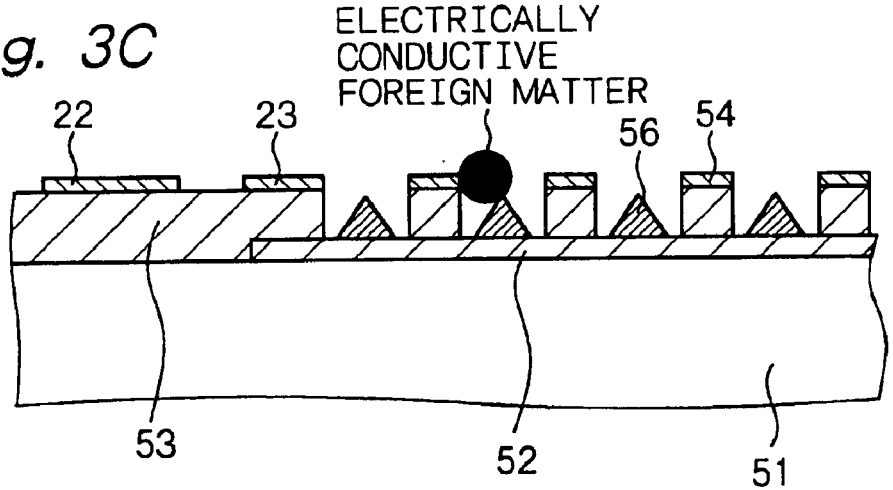

Otherwise, as shown in FIGS. 3A and 3B, a resist layer is, formed on the entire surface of the cathode panel 50 and exposed to a light beam and developed to expose a portion of the branch wiring 23 to be cut off. The branch wiring is cut off by etching the exposed portion of the branch wiring 23 by a dry etching method, and the resist layer is removed (see FIG. 3C).

Figure 27:
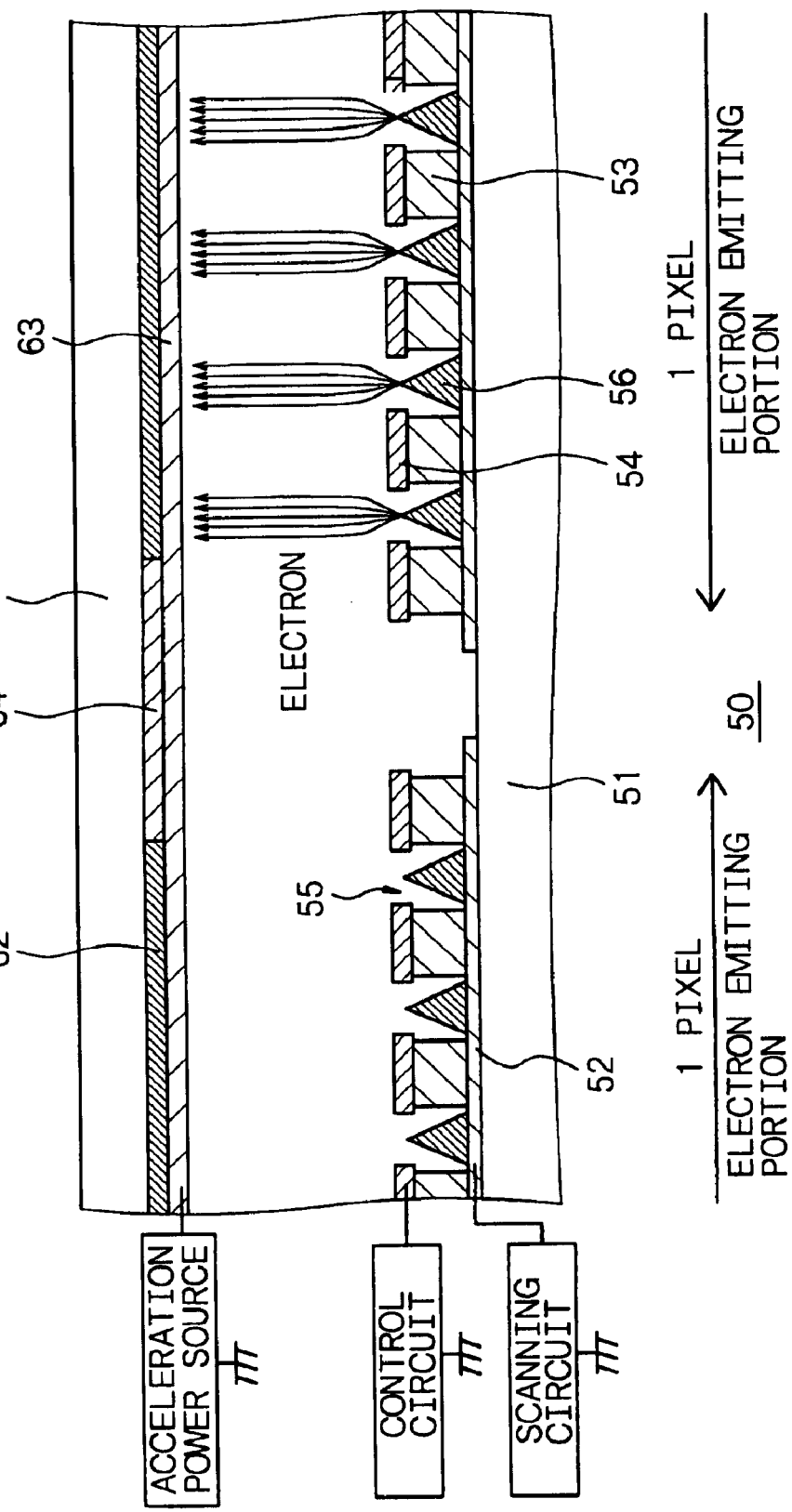
FIG. 27 is a conceptual view of a display to which Spindt type field emission devices are applied.
Figure 28:
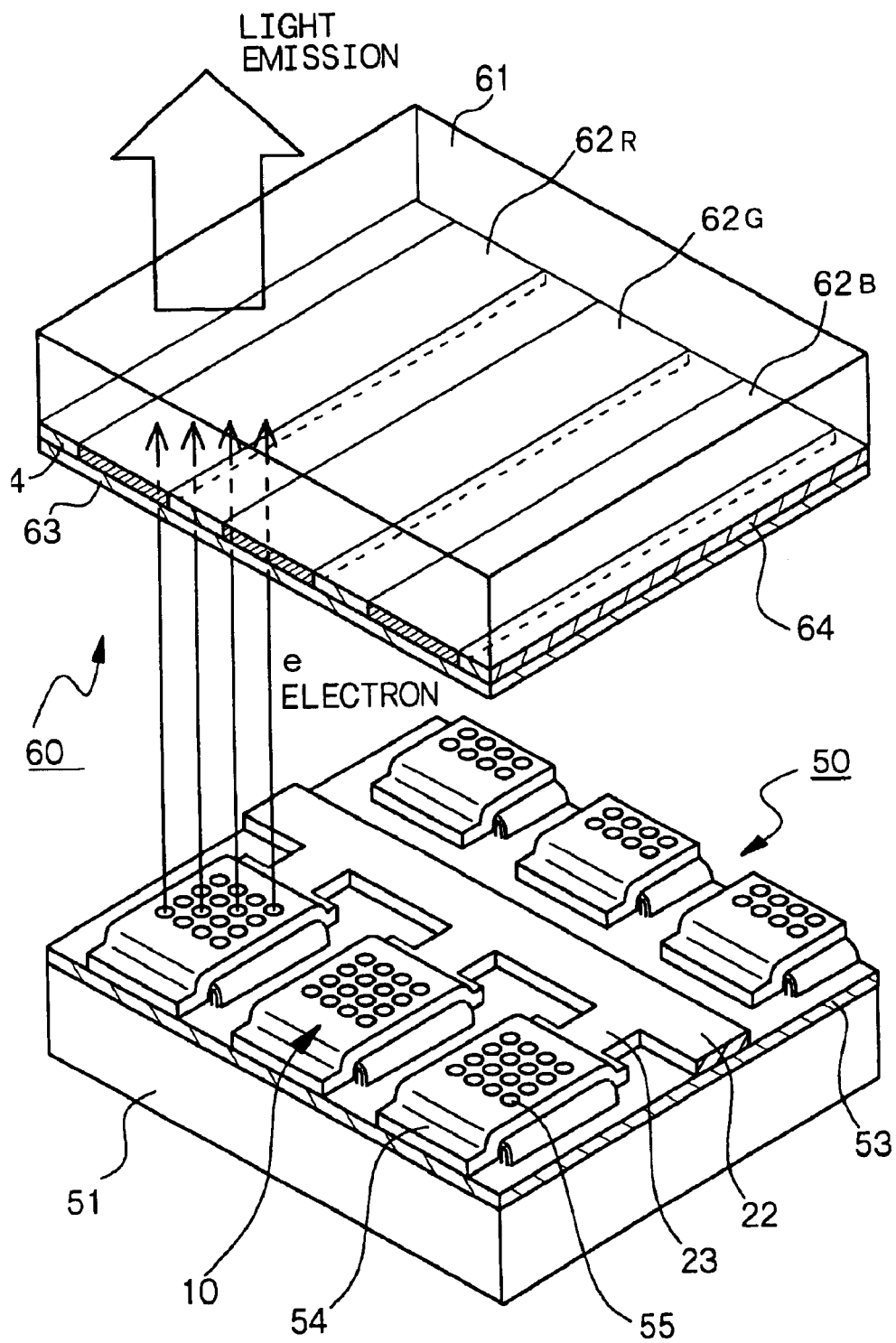
FIG. 28 shows a schematic exploded perspective view of part of a cathode panel and an anode panel of the display to which Spindt type field emission devices are applied.

The cathode panel 50 for which the above procedures are completed and the anode panel 60 are assembled, whereby a display shown in FIGS. 27 and 28 can be constituted. That is, in principle, the display comprises a plurality of pixels each of which is constituted of the electron emitting portion 10 formed on the cathode panel 50, and the anode electrode 63 and the fluorescent layer 62 formed on the anode panel 60 so as to be opposed to the electron emitting portion 10. Displays in Examples to be described hereinafter also have a similar constitution. FIG. 28 is a schematic exploded perspective view of part of the cathode panel 50 and the anode panel 60. Specifically, an approximately 1 mm high frame made of ceramic or glass is provided, the frame and the anode panel 60 are temporarily bonded with a seal material composed of a frit glass, a seal material composed of a frit glass is applied to the cathode panel 50 and dried, the anode panel 60 and the cathode panel 50 are attached to each other through the frame, and the resultant set is calcined or sintered at approximately 450° C. for 10 to 30 minutes. Then, a gas inside the display is discharged until a vacuum of approximately $10^{-4}$ Pa is generated, and the display is sealed by a proper method. Otherwise, the anode panel 60 and the cathode panel 50 are attached to each other through the frame in a vacuum chamber, and the resultant set is calcined or sintered at approximately 450° C. for 10 to 30 minutes, whereby a vacuum is automatically generated in a space formed by the anode panel 60, the cathode panel 50 and the frame. The substrate 61 constituting the anode panel 60 can be composed of any material so long as the material surface is constituted of a material having insulation properties. The substrate 61 includes a glass substrate, a glass substrate having an insulation layer formed on its surface, a quartz substrate, a quartz substrate having an insulation layer formed on its surface and a semiconductor substrate having an insulation layer formed on its surface. In some cases, the substrate 61 is required to be transparent depending upon a constitution of the display.

In the constitution shown in FIG. 1, each electron emitting portion 10 is constituted of tens to one thousand Spindt type field emission devices. A desired number of the cathode electrodes 52 of the Spindt type field emission devices constituting the electron emitting portion 10 are present in the patterned conductive material layer for a cathode electrode. Specifically, the conductive material layer for a cathode electrode, having the form, for example, of a rectangle, per se is the cathode electrodes 52, and a region of the conductive material layer for a cathode electrode which region is positioned in the bottom portion of the opening portion 55 corresponds to the cathode electrode 52. Further, a desired number of the gate electrodes 54 of the Spindt type field emission devices constituting the electron emitting portion 10 are present in the patterned conductive material layer for a gate electrode. Specifically, the conductive material layer for a gate electrode, having the form, for example, of a rectangle, per se is the gate electrodes 54, and a region of the conductive material layer for a gate electrode which region is positioned in the vicinity of the opening portion 55 corresponds to the gate electrode 54.

Otherwise, in the constitution shown in FIG. 1, each electron emitting portion 10 is constituted of approximately tens to hundreds edge type field emission devices. In the electron emitting portion 10 constituted of the edge type field emission device structured as shown in FIG. 33A, a desired number of the electron emitting layers 74 of the edge type field emission devices constituting the electron emitting portion 10 are present in the patterned conductive material layer for an electron emitting layer. Specifically, the conductive material layer for an electron emitting layer, having the form, for example, of a rectangle, per se is the electron emitting layers 74, and a region of the conductive material layer for an electron emitting layer which region is positioned in the vicinity of the opening portion 78 corresponds to the electron emitting layer 74. Further, a desired number of the gate electrodes 76 of the edge type field emission devices constituting the electron emitting portion 10 are present in the patterned conductive material layer for a gate electrode. Specifically, the conductive material layer for a gate electrode, having the form, for example, of a rectangle, per se is the gate electrodes 76, and a region of the conductive material layer for a gate electrode which region is positioned in the vicinity of the opening portion 78 corresponds to the gate electrode 76.

In the constitution shown in FIG. 1, further, in one electron emitting portion 10 constituted of the edge type field emission device structured as shown in FIG. 33B, a desired number of the first gate electrodes 72 of the edge type field emission devices constituting the electron emitting portion 10 are present in the patterned conductive material layer for a first gate electrode. Specifically, the conductive material layer for a first gate electrode, having the form, for example, of a rectangle, per se is the first gate electrodes 72, and a region of the conductive material layer for a first gate electrode which region is positioned in the bottom portion of the opening portion 78 corresponds to the first gate electrode 72. Further, a desired number of the electron emitting layers 74 of the edge type field emission devices constituting the electron emitting portion 10 are present in the patterned conductive material layer for an electron emitting layer. Specifically, the conductive material layer for an electron emitting layer, having the form, for example, of a rectangle, per se is the electron emitting layers 74, and a region of the conductive material layer for an electron emitting layer which region is positioned in the vicinity of the opening portion 78 corresponds to the electron emitting layer 74. Further, a desired number of the second gate electrodes 77 of the edge type field emission devices constituting the electron emitting portion 10 are present in the patterned conductive material layer for a second gate electrode. Specifically, the conductive material layer for a second gate electrode, having the form, for example, of a rectangle, per se is the second gate electrodes 77, and a region of the conductive material layer for a second gate electrode which regions is positioned in the vicinity of the opening portion 78 corresponds to the second gate electrode 77.

Otherwise, in the constitution shown in FIG. 1, each electron emitting portion 10 is constituted, for example, of one or a plurality of the flat type field emission device(s). In each electron emitting portion 10 constituted of the flat type field emission devices structured as shown in FIG. 38, a desired number of electron emitting layers 84 of the flat type field emission devices constituting the electron emitting portion 10 are present in the patterned conductive material layer for an electron emitting layer. Specifically, the conductive material layer for an electron emitting layer, having the form, for example, of a rectangle, per se is the electron emitting layers 84, and a region of the conductive material layer for an electron emitting layer which region is positioned in the bottom of the opening portion 88 corresponds to the electron emitting layer 84. Further, a desired number of the gate electrodes 86 of the edge type field emission devices constituting the electron emitting portion 10 are present in the patterned conductive material layer for a gate electrode. Specifically, the conductive material layer for a gate electrode, having the form, for example, of a rectangle, per se is the gate electrodes 86, and a region of the conductive material layer for a gate electrode which is positioned in the vicinity of the opening portion 88 corresponds to the gate electrode 86.

FIGS. 4 and 5 show schematic plan layouts of variants of the main wirings, the branch wirings and the electron emitting portions.

In the constitution shown in FIG. 4, a desired number of cathode electrodes 52 of the Spindt type field emission devices constituting the electron emitting portion 10 are present in each patterned conductive material layer 52A for a cathode electrode. That is, the conductive material layer 52A for a cathode electrode per se is the cathode electrodes 52, and a region of the conductive material layer 52A for a cathode electrode which region is positioned in the bottom of the opening portion 55 corresponds to the cathode electrode 52. Unlike the form shown in FIG. 1, the conductive material layer 52A for a cathode electrode is patterned in a stripe form, and part of the above stripe-like conductive material layer 52A for a cathode electrode (a region overlapping the patterned conductive material layer for a gate electrode) constitutes the cathode electrodes 52 of each electron emitting portion 10. In other words, the cathode electrodes of the electron emitting portions 10 adjacent in the first direction are connected with cathode electrode extending portions 24. A desired number of gate electrodes 54 of the Spindt type field emission devices constituting the electron emitting portion 10 are present in the patterned conductive material layer for a gate electrode. That is, the conductive material layer for a gate electrode, having the form, for example, of a rectangle, per se is the gate electrodes 54, and a region of the conductive material layer for a gate electrode which region is positioned in the vicinity of the opening portion 55 corresponds to the gate electrode 54.

In the cathode panel shown in FIG. 4, a predetermined number of columns of the cold cathode electron emitting portions are arranged side by side, and each column has a plurality of electron emitting portions 10 arranged one-dimensionally. The above term "a plurality of electron emitting portions 10 arranged one-dimensionally" means that part of the stripe-shaped conductive material layer 52A for a cathode electrode constitutes the cathode electrodes 52 of each electron emitting portion 10, or that the cathode electrodes of electron emitting portions 10 adjacent to each other in a certain direction are connected with the cathode electrode extending portion 24.

In the cathode panel shown in FIG. 4, the main wirings 20 and the branch wirings 21 are omitted unlike the cathode panel shown in FIG. 1, and the conductive material layer 52A for a cathode electrode in the form of a stripe extending in the first direction works as these wirings. The main wirings 22 extend in a second direction different from the first direction (for example, the direction at right angles with the first direction). The gate electrodes constituting the electron emitting portion 10 are connected to the branch wiring 23.

when an electron emitting portion 10 is defective in operation, a branch wiring 23 connecting such an electron emitting portion 10 and a main wiring 22 can be cut off.

In a constitution shown in FIG. 5, a desired number of the cathode electrodes 52 of the Spindt type field emission devices constituting the electron emitting portion 10 are present in the patterned conductive material layer for a cathode electrode. That is, the conductive material layer for a cathode electrode, having the form, for example, of a rectangle, per se is the cathode electrodes 52, and a region of the conductive material layer for a cathode electrode which region is positioned in the bottom portion of the opening portion 55 corresponds to the cathode electrode 52. A desired number of the gate electrodes 54 of the Spindt type field emission devices constituting the electron emitting portion 10 are present in the patterned conductive material layer for a gate electrode. That is, the conductive material layer for a gate electrode per se is the gate electrodes 54, and a region of the conductive material layer for a gate electrode which region is positioned in the vicinity of the opening portion 55 corresponds to the gate electrode 54. The conductive material layer 54A for a gate electrode is patterned in the form of a stripe unlike the form shown in FIG. 1, and part of the above stripe-shaped conductive material layer 54A for a gate electrode (region which overlaps the patterned conductive material layer for a cathode electrode) constitutes the gate electrodes 54 of each electron emitting portion 10. In other words, the gate electrodes of the electron emitting portions 10 adjacent to each other in the second direction are connected with the gate electrode extending portions 25.

As described above, in the cathode panel shown in FIG. 5, a predetermined number of columns of the cold cathode electron emitting portions are arranged side by side, and each column has electron emitting portions 10 arranged one-dimensionally. The term "having electron emitting portions 10 arranged one-dimensionally" means that part of the stripe-shaped conductive material layer 54A for a gate electrode constitutes the gate electrodes of each electron emitting portion 10, or that the gate electrodes of the electron emitting portions 10 adjacent to each other in a certain direction are connected with the gate electrode extending portion 25.

In the cathode panel shown in FIG. 5, the main wirings 22 and the branch wirings 23 are omitted unlike the cathode panel shown in FIG. 1. The stripe-shaped conductive material layer 54A for a gate electrode extending in the second direction works as these wirings. The main wirings 20 extend in a first direction different from the second direction (for example, direction at right angles with the second direction). The cathode electrodes constituting the electron emitting portion 10 are connected to the branch wiring 21.

When an electron emitting portion 10 is defective in operation, a branch wiring 21 connecting such an electron emitting portion 10 and a main wiring can-be cut off.

Table 1 summarizes constitutions of electrodes and electron emitting layers and constitutions of main wirings and branch wirings when the constitutions shown in FIGS. 4 and 5 are applied to cathode panels having electron emitting portions having the edge type field emission devices of first structure, the edge type field emission devices of second structure or the flat type field emission devices. In Table 1, symbol "H" represents a constitution having main wirings and branch wirings, and symbol "S" represents a constitution where electrodes or electron emitting layers are constituted of a stripe-shaped conductive material layer for a cathode electrode or a gate electrode. Symbols "H" and "S" in Tables to be described later have the same meanings. In these constitutions, any branch wiring connecting an electron emitting portion defective in operation and a main wiring can be cut off so that the electron emitting portion defective in operation does not work.

TABLE 1

[Edge type field emission device of first structure]

|     | Electron emitting layer | Gate electrode |
| --- | --- | --- |
| (1) | H | H |
| (2) | H | S |
| (3) | S | H |

[Edge type field emission device of second structure]

|     | First gate electrode | Electron emitting layer | Second gate electrode |
| --- | --- | --- | --- |
| (1) | H | H | H |
| (2) | S | H | H |
| (3) | H | S | H |
| (4) | H | H | S |
| (5) | S | S | H |
| (6) | S | H | S |
| (7) | H | S | S |

[Flat type field emission device:]

|     | Electron emitting layer | Gate electrode |
| --- | --- | --- |
| (1) | H | H |
| (2) | H | S |
| (3) | S | H |

EXAMPLE 2

Example 2 is concerned with the cathode panel, the display and the cathode panel production method according to the second aspect of the present invention.

Each of electron emitting portions can be constituted of a plurality (for example, tens to one thousand) of the Spindt type field emission devices, a plurality (approximately tens to hundreds) of the edge type field emission devices or one or a plurality of the flat type field emission device(s) which have been already explained. A cathode panel will be explained with reference to an embodiment in which each electron emitting portion is constituted of a plurality of the Spindt type field emission devices hereinafter, while the explanation can also apply to embodiments in which each electron emitting portion is constituted of field emission devices of any other type.

Figure 6:
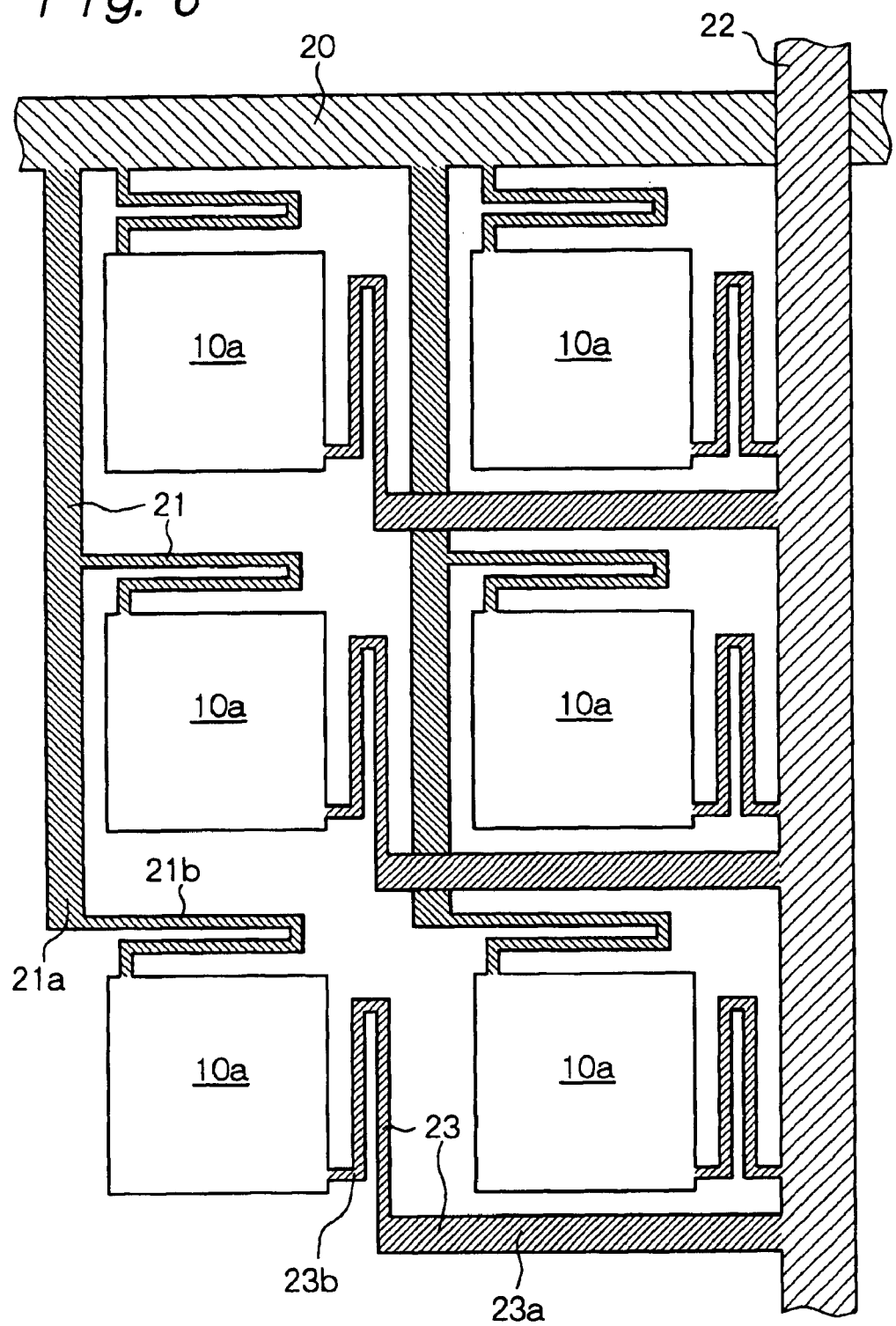
FIG. 6 shows a schematic plan layout of main wirings, branch wirings and cold cathode electron emitting portions in a cathode panel of Example 2.

As is shown in the schematic plan layout of FIG. 6, the cathode panel of Example 2 also has a plurality of main wirings 20 and 22 (FIG. 6 shows one each), a plurality of branch wirings 21 and 23 extending from the main wirings 20 and 22, and electron emitting portions connected to the branch wirings 21 and 23. FIG. 6 shows one of the electron emitting portions. A plurality of the branch wirings 21 extend from each main wiring 20, and a plurality of the branch wirings 23 extend from each main wiring 22. The main wirings 20 extend in a first direction, and the main wirings 22 extend in the direction different from the first direction (for example, the direction at right angles with the first direction). Each branch wiring 21 is constituted of a broad portion 21a and a narrow portion 21b. Further, each branch wiring 23 is constituted of a broad portion 23a and a narrow portion 23b.

Each electron emitting portion having dimensions, for example, of 100 $\mu$m×180 $\mu$m has one or a plurality of cold cathode electron emitting portion units (to be referred to as "electron emitting portion unit" hereinafter)(6 cold cathode electron emitting portion units in Example 2), and each electron emitting portion unit 10a is connected to the main wirings 20 and 22 through the branch wirings 21 and 23. In an embodiment of a cathode panel having the electron emitting portions each of which is constituted of the Spindt type field emission devices, the cathode electrodes constituting one electron emitting portion are connected to the branch wiring 21, and the gate electrodes are connected to the branch wiring 23. In FIG. 6, showing of a support and an insulating layer and detailed showing of the field emission devices are omitted.

Figure 7A:
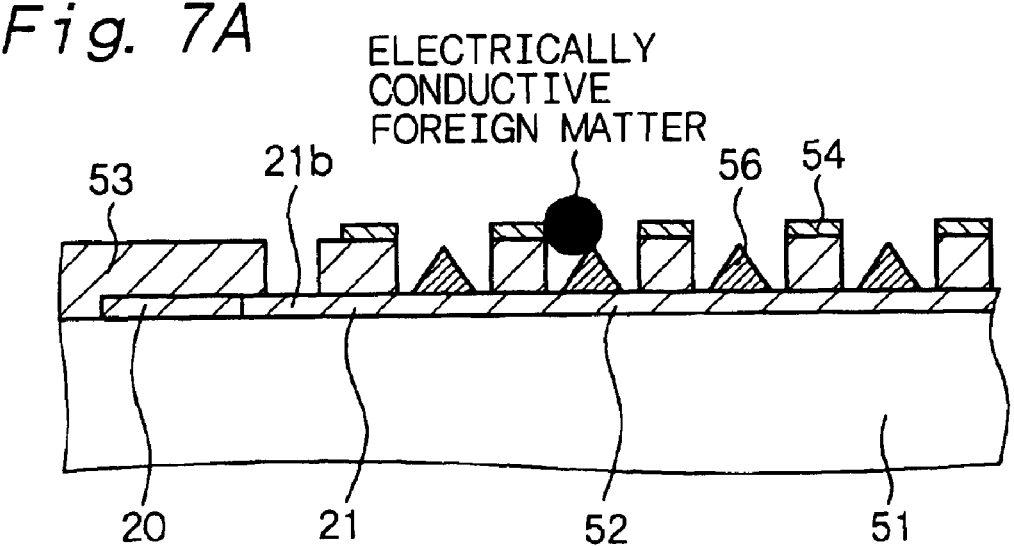
FIGS. 7A and 7B show schematic partial end views of a main wiring, a branch wiring and cold cathode electron emitting portions in the cathode panel of Example 2.

The main wirings 20 and the branch wirings 21 can be formed concurrently with the formation of the cathode electrodes 52 in the previously described [Step-100] in which a conductive material layer composed, for example, of aluminum for a cathode electrode is formed on a support 51 made, for example, of a glass substrate by a sputtering method, and the conductive material layer is patterned by a lithographic method and a dry etching method. The patterned conductive material layer for a cathode electrode, which constitutes the cathode electrodes of each electron emitting portion, has the form, for example, of a rectangle. After the completion of the field emission devices, at least part of an insulating layer 53 above the branch wiring 21, more specifically, above the narrow portion 21b of the branch wiring is removed beforehand by a lithographic method and a dry etching method as shown in the schematic partial end view of FIG. 7A. The above removal of part of the insulating layer 53 can be carried out simultaneously with the formation of a pad portion for connecting the main wiring and a scanning circuit.

Figure 8A:
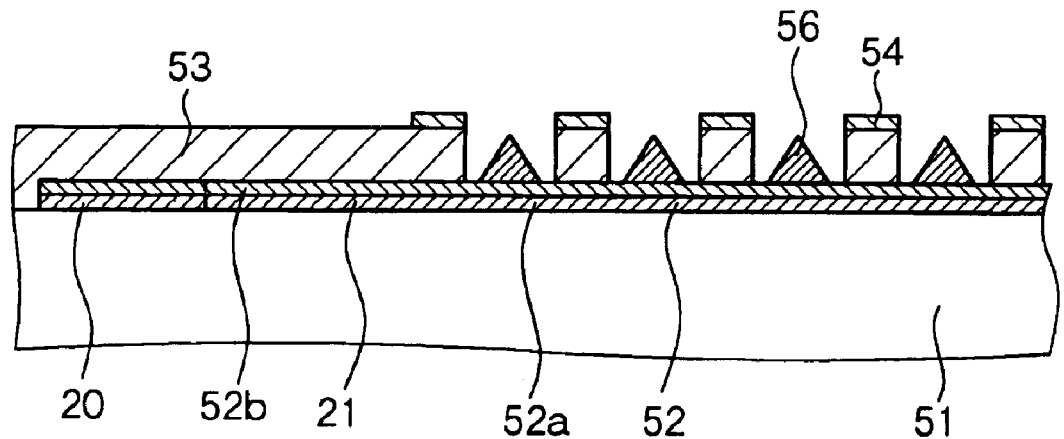
FIGS. 8A and 8B show schematic partial end views of a main wiring, a branch wiring and cold cathode electron emitting portions for explaining part of steps of producing a variant of the cathode panel of Example 2.
Figure 8B:
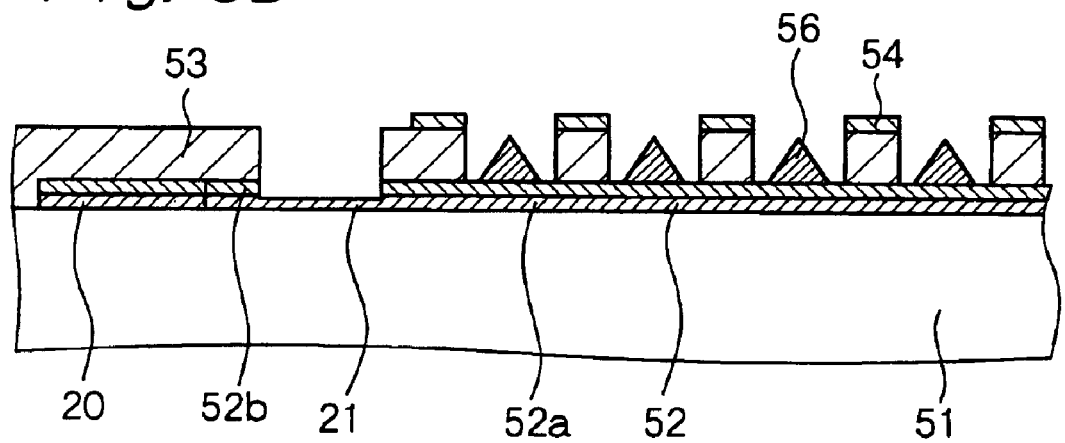

Otherwise, the main wirings 20 and the branch wirings 21 can be formed concurrently with the formation of the cathode electrodes 52 in the previously described [Step-100] in which, for example, an aluminum layer 52a and a TiN barrier metal layer 52b are consecutively formed on a support 51 made, for example, of a glass substrate by a sputtering method to form a two-layered conductive material layer for a cathode electrode, and the two-layered conductive material layer is patterned by a lithographic method and a dry etching method. After the completion of the field emission devices, an insulating layer 53 and the barrier metal layer 52b above at least part of each branch wiring 21 are removed beforehand by a lithographic method and a dry etching method. That is, the branch wirings 21 are constituted of a first branch wiring portion made of an aluminum layer and a second branch wiring portion made of two layers of an aluminum layer and a barrier metal layer. Specifically, an etching mask (not shown) composed of a resist material is formed on the completed field emission devices (see FIG. 8A) by a lithographic method, the insulating layer 53 composed of $SiO_2$ and the barrier metal layer 52b composed of TiN are etched under a condition shown in Table 2 using a parallel plate RIE system, and then, the etching mask is removed (see FIG. 8B). The removal of part of the insulating layer 53 and the barrier metal layer 52b can be carried out simultaneously with the formation of a pad portion for connecting the main wirings and a scanning circuit.

TABLE 2

| | |
|---|---|
| Gas | $CHF_3/CO/Ar$ = 30/70/300 sccm |
| Pressure | 7.3 Pa |
| RF power | 1.3 kW |
| Temperature | 20° C. |

Otherwise, the main wirings 20 and the branch wirings 21 can be formed in the previously described [Step-210]. That is, the main wirings 20 and the branch wrings 21 are formed on the first insulating layer 73 by a film forming method and a dry etching method, and then, the electron emitting layer 74 is formed. Otherwise, the main wirings. 20 and the branch wirings 21 can be formed in the previously described [Step-300]. That is, the main wirings 20 and the branch wrings 21 are formed on the support 81 made, for example, of a glass substrate by a film forming method and a dry etching method, and then, the electron emitting layer 84 is formed.

On the other hand, the main wirings 22 and the branch wirings 23 can be formed concurrently with the formation of the gate electrodes 54 in the previously described [Step-100] in which the conductive material layer composed, for example, of aluminum for a gate electrode is patterned by a lithographic method and a dry etching method. The patterned conductive material layer for a gate electrode, constituting the gate electrodes of each electron emitting portion, has a rectangular form nearly equivalent to that of the patterned conductive material layer for a cathode electrode.

Otherwise, the main wirings 22 and the branch wirings 23 can be formed concurrently with the formation of the gate electrodes 54 in the previously described [Step-100] in which the conductive material layer made of two layers, for example, of a 0.5 µm thick aluminum layer and a 0.1 µm thick barrier metal layer composed of TiN for a gate electrode is patterned by a lithographic method and a dry etching method. After the completion of the field emission devices, the barrier metal layer of at least part of the branch wirings 23 is removed beforehand by a lithographic method and a dry etching method. That is, each branch wiring 23 is constituted of a first branch wiring portion made of the aluminum layer and a second branch wiring portion made of two layers of the aluminum layer and the barrier metal layer.

Otherwise, the main wirings 22 and the branch wirings 23 can be formed in the previously described [Step-200]. That is, the main wirings 22 and the branch wirings 23 are formed on the support 71 made, for example, of a glass substrate by a film forming method and a dry etching method and then the first gate electrodes 72 are formed. Otherwise, the main wirings 22 and the branch wirings 23 can be formed in the previously described [Step-220]. That is, the main wirings 22 and the branch wirings 23 are formed on the second insulating layer 75 by a film forming method and a dry etching method, and then the second gate electrodes 77 are formed. Otherwise, the main wirings 22 and the branch wirings 23 can be formed in the previously described [Step-300]. That is, the main wirings 22 and the branch wirings 23 are formed on the insulating layer 85 by a film forming method and dry etching method and then the gate electrodes 86 are formed.

In the above cases, at least one of the branch wiring 21 and the branch wiring 23 is made of an aluminum layer or an aluminum alloy layer, or is formed of a first branch wiring portion made of an aluminum layer or an aluminum alloy layer and a second branch wiring portion made of two layers of an aluminum layer or an aluminum alloy layer and a barrier metal layer.

The above methods of forming the main wirings and 22 and the above methods of forming the branch wirings 21 and 23 can be applied to Examples 4 and 6 to be described later.

In Example 2, the narrow portions 21b and 23b of the branch wirings 21 and 23 made of an aluminum layer having a purity of 99.99% have a width of 2 µm, a thickness of 0.5 µm and a length of at least 0.1 mm. Further, the main wirings 20 and 22 and the broad portions 21a and 23a of the branch wirings 21 and 23 made of an aluminum layer having a purity of 99.99% have a width of 20 μm and a thickness of 0.5 μm. The narrow portions 21b and 23b of the branch wirings 21 and 23 have the following electric resistance value R. The aluminum layer has a volume resistivity ρ of $2.7 \times 10^{-6}$ (Ω·cm), and the narrow portions 21b and 23b of the branch wirings 21 and 23 have a cross-sectional area of A and a length of L.

$$R = \rho L / A$$
$$= 2.7 \times 10^2 \cdot L(\Omega/\text{cm})$$

If $L = 0.5$ mm, therefore, $$R = 13.5 \Omega.$$

Figure 7B:
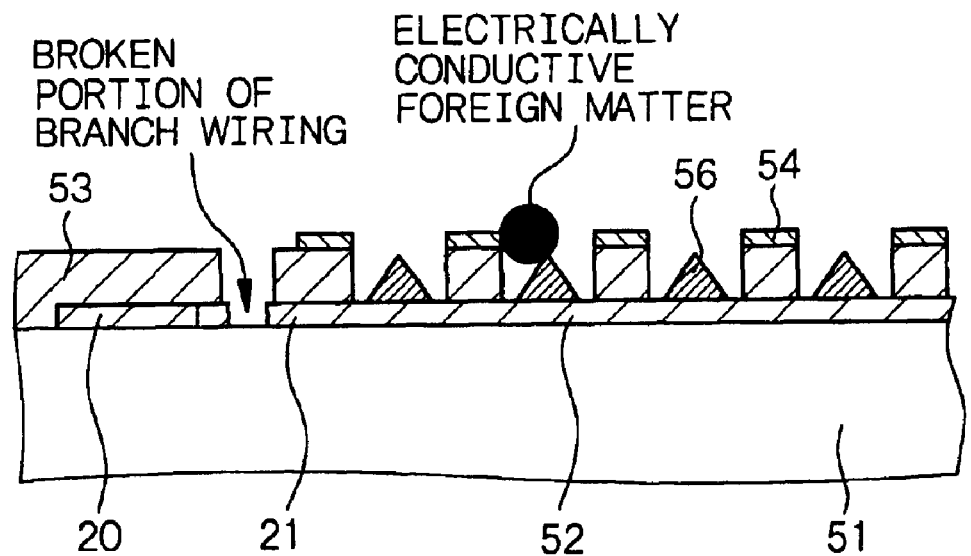

The obtained cathode panel 50 is tested for a short circuit by applying a voltage to the electron emitting portions from the main wirings 20 and 22 through the branch wirings 21 and 23. Specifically, a potential difference of 10 volts (=E) is applied between the main wiring 20 and the main wiring 22. The potential difference may be applied continuously or in the form of pulses. In a short-circuited electron emitting portion, i.e., an electron emitting portion including a field emission device where, for example, an electrically conductive foreign matter is present between a gate electrode 54 and an electron emitting electrode 56, the branch wirings 21 and/or 23 connecting the above electron emitting portion and the main wirings and 22 are broken by means of a current I which flows in the branch wirings 21 and 23 (see the schematic partial end view of FIG. 7B). The breaking of the narrow portions 21b and 23b of the branch wirings 21 and 23 can take place in one of them or in both of them. The current I which flows in the narrow portions 21b and 23b of the branch wirings 21 and 23 has a current density J below.

$$J = I/A$$
$$= (E/R)/A$$
$$= (10/13.5)/10^{-8}$$
$$= 7.4 \times 10^7 (\text{ampere/cm}^2)$$

Figure 9:
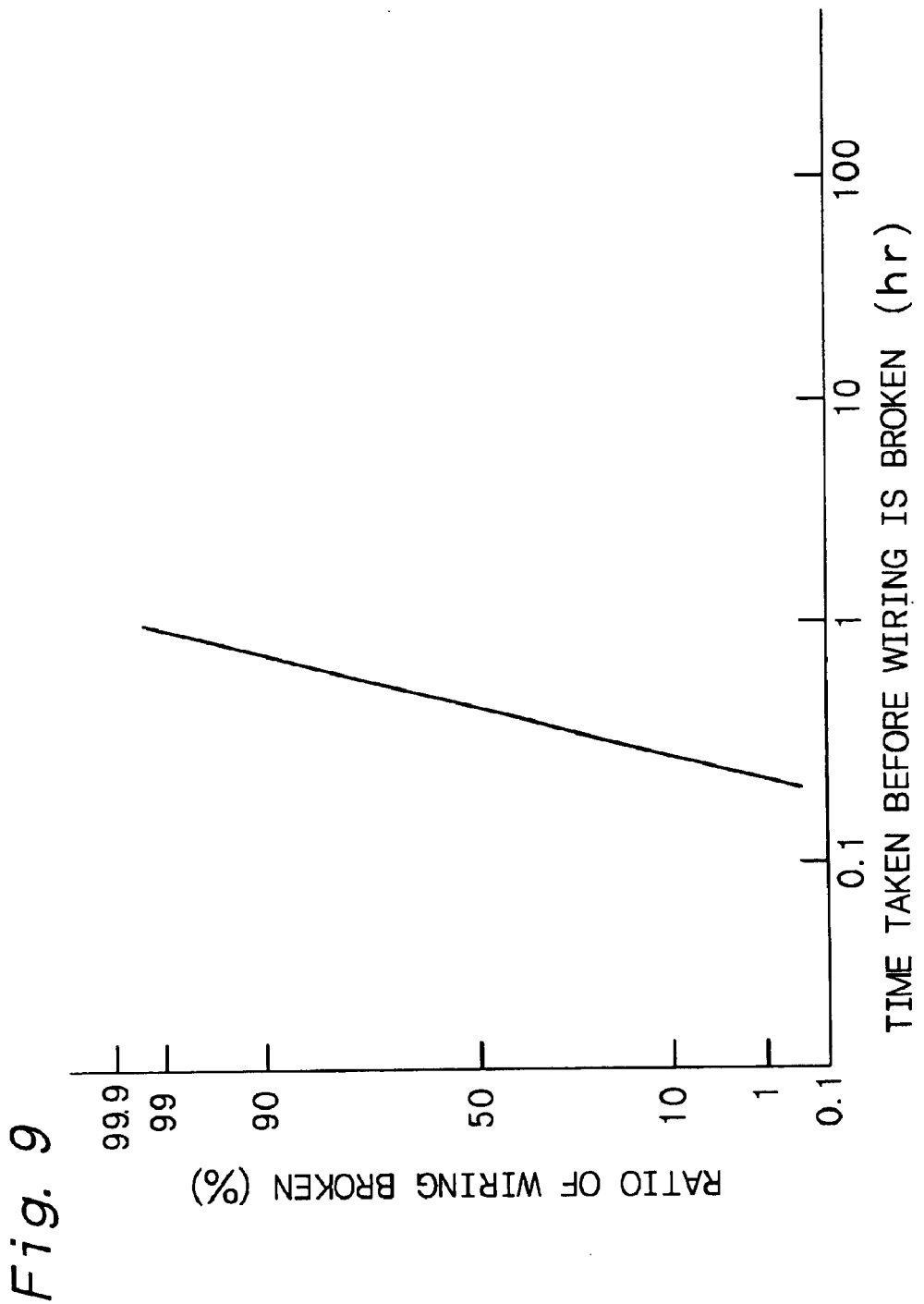
FIG. 9 is a graph showing a result of studies of a time taken until the branch wiring of the cathode panel of Example 2 was broken.

Under the above condition, a time taken before the narrow portions 21b and 23b of the branch wirings were broken due to electro-migration was studied, and FIG. 9 shows the results. The test was carried out in atmosphere. It is seen from FIG. 9 that almost all of the branch wirings connecting the short-circuited electron emitting portions and the main wirings are broken when the potential difference by 10 volts is continuously applied between the main wirings 20 and the main wirings 22 for about 1 hour. When the test for a short circuit is carried out under an inert gas atmosphere in a state where the electron emitting portions, the main wirings 20 and 22 and the branch wirings 21 and 23 are heated, the time taken before a branch wiring connecting a short-circuited electron emitting portion and a main wiring is broken can be decreased.

In Example 2, each electron emitting portion is constituted of a plurality of (for example, six) electron emitting portion units 10a. In this case, even if the branch wiring, for example, to one electron emitting portion unit 10a is broken, the remaining electron emitting portion units 10a work, so that an apparently flawless pixel can be obtained.

The cathode panel 50 for which the above procedures are completed and the anode panel 60 are assembled, whereby a display shown in FIG. 27 can be constituted.

In some cases, after the cathode panel 50 and the anode panel 60 are assembled, the test for a short circuit can be carried out and a branch wiring connecting a short-circuited electron emitting portion and a main wiring can be broken.

Examples of variants of the main wirings, the branch wirings and the electron emitting portions include those constitutions shown in the schematic plan layouts of FIGS. 4 and 5.

EXAMPLE 3

Example 3 is concerned with the cathode panel, the display and the cathode panel production method according to the third aspect of the present invention.

Each of electron emitting portions can be constituted of a plurality (for example, tens to one thousand) of the Spindt type field emission devices, a plurality (approximately tens to hundreds) of the edge type field emission devices or one or a plurality of the flat type field emission device(s) which have been already explained. A cathode panel will be explained with reference to an embodiment in which each electron emitting portion is constituted of a plurality of the Spindt type field emission devices hereinafter, while the explanation can also apply to embodiments in which each electron emitting portion is constituted of field emission devices of any other type.

As FIG. 3 shows the schematic plan layout of main wirings, branch wirings and electron emitting portions, the cathode panel of Example 3 has a plurality of main wirings 30 and 32, a plurality of first branch wirings 31A and 33A and a plurality of second branch wirings 31B and 33B extending from the main wirings 30 and 32 and a plurality of cold cathode field emitting regions (to be simply referred to as "electron emitting regions" hereinafter). A plurality of the first branch wirings 31A and a plurality of the second branch wirings 31B extend from each main wiring 30, and a plurality of the first branch wirings 33A and a plurality of the second branch wirings 33B extend from each main wiring 32. The main wirings 30 extend in a first direction, and the main wirings 32 extend in a second direction different from the first direction (direction at right angles with the first direction). FIG. 10 and FIGS. 11 to 17 to be referred to later omit showing of a support and an insulating layer and detailed showing of field emission devices.

Each electron emitting region is constituted of a first cold cathode electron emitting portion 10A (to be simply referred to as "first electron emitting portion 10A" hereinafter) connected to the first branch wirings 31A and 33A extending from the main wirings 30 and 32, respectively, and a second cold cathode electron emitting portion 10B (to be simply referred to as "second electron emitting portion 10B" hereinafter) connected to the second branch wirings 31B and 33B extending from the main wirings 30 and 32, respectively. Specifically, the cathode electrodes constituting the first electron emitting portion 10A are connected to the main wiring 30 through the first branch wiring 31A, and the gate electrodes constituting the first electron emitting portion 10A are connected to the main wiring 32 through the first branch wiring 33A. The cathode electrodes constituting the second electron emitting portion 10B are connected to the main wiring 30 through the second branch wiring 31B, and the gate electrodes constituting the second electron emitting portion 10B are connected to the main wiring 32 through the second branch wiring 33B. When one of first and second electron emitting portions (for example, a first electron emitting portion 10A) constituting an electron emitting region is defective in operation, the branch wiring (for example, the first branch wiring 31A or the first branch wiring 33A) for connecting such an electron emitting portion (for example, the first electron emitting portion 10A) and the main wiring 30 or 32 is cut off. When both of electron emitting portions (a first electron emitting portion 10A and a second electron emitting portion 10B) constituting an electron emitting region are normal in operation, the branch wiring (for example, the second branch wiring 31B or 33B) for connecting one (for example, a second electron emitting portion 10B) of the first and second electron emitting portions constituting such an electron emitting region and the main wiring 30 or 32 is cut off.

As described above, each electron emitting region is constituted of a pair of electron emitting portions 10A and 10B, and one of the first electron emitting portion 10A and the second electron emitting portion 10 is worked, whereby the brightness of a display can be maintained at a constant level.

The main wirings 30, the first branch wirings 31A and the second branch wirings 31B can be formed in the same manner as in the formation of the main wirings and the branch wirings 21 in Example 1, and the main wirings 32, the first branch wirings 33A and the second branch wirings 33B can be formed in the same manner as in the formation of the main wirings 22 and the branch wirings 23 in Example 1. Detailed explanations thereof are therefore omitted.

In an obtained cathode panel 50, a working test is carried out with regard to the first and second electron emitting portions 10A and 10B. The working test includes a wiring short-circuit test in which these electron emitting portions are measured for a resistance value or an anomalous heat generation to check whether or not they are short-circuited, and a display characteristic test in which electrons are actually emitted from the cathode panel 50. In the display characteristic test, when a pair of electron emitting portions 10A and 10B work normally, an image corresponding to a pixel is brighter than in a case where one of a pair of electron emitting portions 10A and 10B is defective in operation.

In an electron emitting region defective in operation, for example, the branch wiring 31A connecting the first electron emitting portion 10A and the main wiring 30 is cut off. Otherwise, the branch wiring 33A connecting the first electron emitting portion 10A and the main wiring 32 is cut off. In an electron emitting region normal in operation, for example, the branch wiring 31B connecting the second electron emitting portion 10B and the main wiring 30 is cut off. Otherwise, the branch wiring 33B connecting the second electron emitting portion 10B and the main wiring 32 is cut off. Specifically, a method similar to that in Example 1 can be carried out.

The cathode panel 50 for which the above procedures are completed and an anode panel 60 are assembled, whereby a display shown in FIG. 27 can be constituted.

FIGS. 11 to 17 show schematic plan layouts of variants of the main wirings, the branch wirings and the electron emitting portions.

Figure 10:
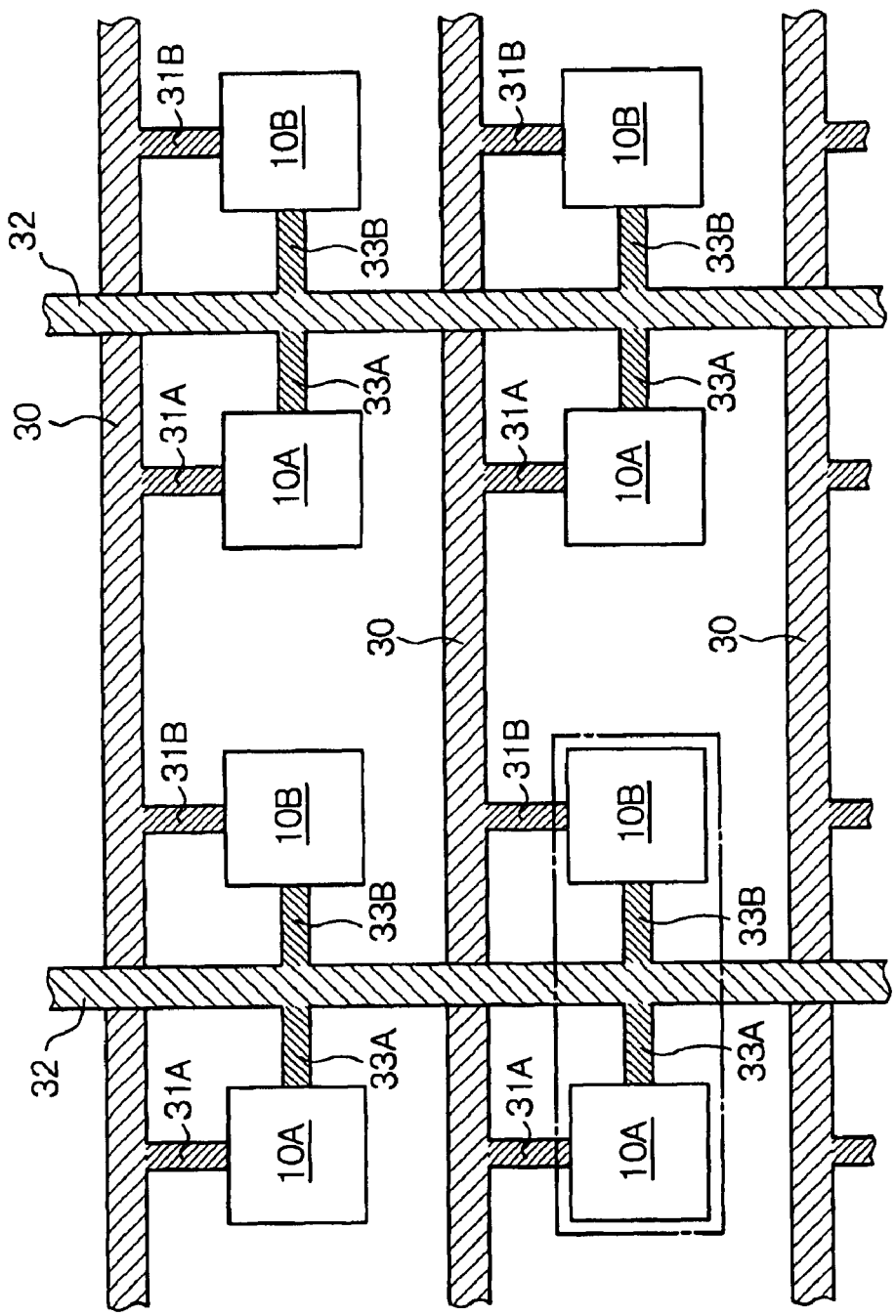
FIG. 10 shows a schematic plan layout of main wirings, branch wirings and cold cathode electron emitting portions in a cathode panel of Example 3.
Figure 11:
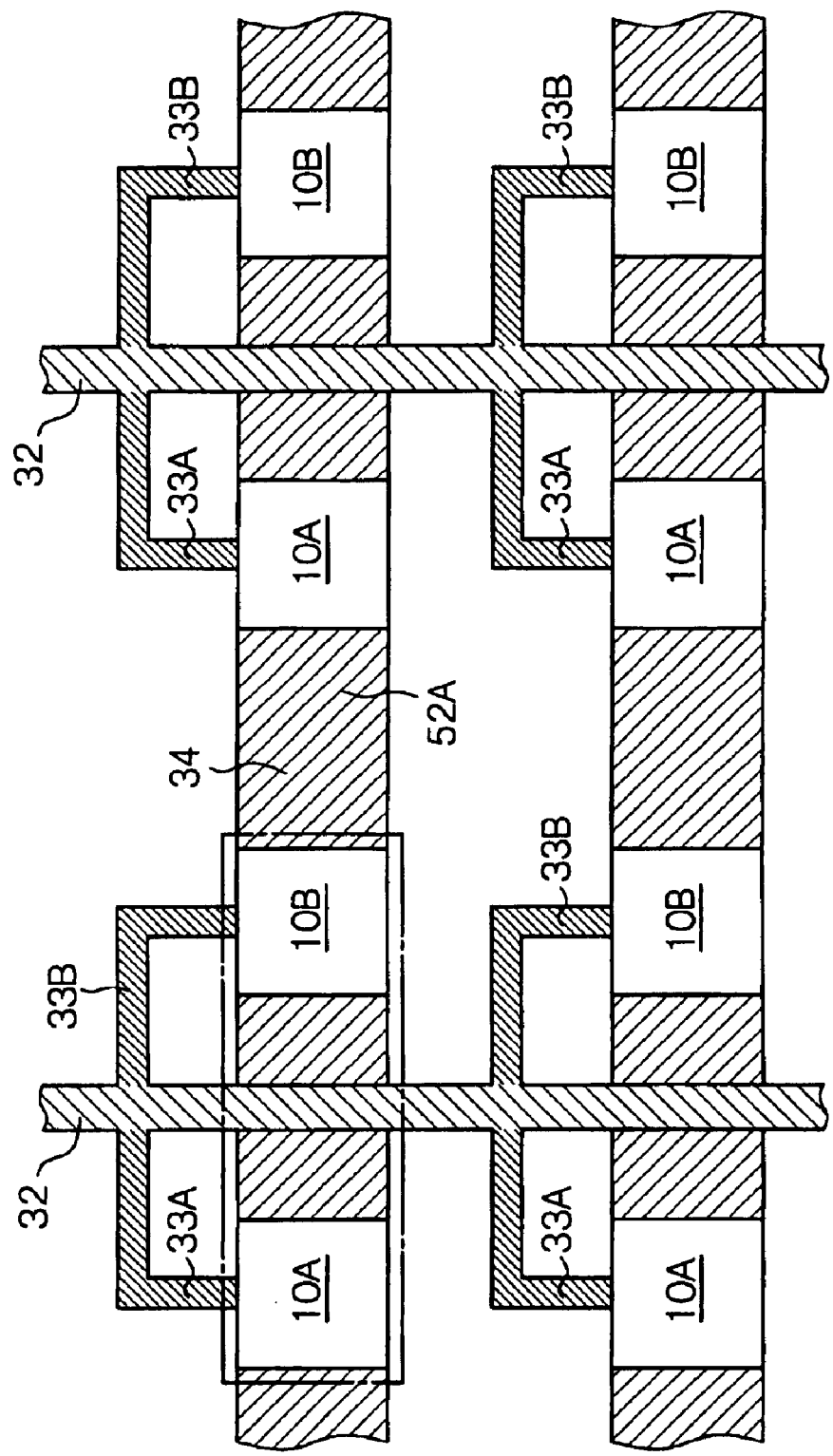
FIG. 11 shows a schematic plan layout of main wirings, branch wirings and cold cathode electron emitting portions in a variant of the cathode panel of Example 3.

In a constitution shown in FIG. 11, a conductive material layer 52A for a cathode electrode is patterned in the form of a stripe unlike the form shown in FIG. 11. Part of the stripe-shaped conductive material layer 52A for a cathode electrode (region overlapping a patterned conductive material layer for a gate electrode) constitutes the cathode electrodes 52 of electron emitting portions 10A and 10B. In other words, the cathode electrodes of the electron emitting portions 10A and 10B adjacent to each other in the first direction are connected through cathode electrode extending portions 34, and a plurality of the electron emitting portions 10A and 10B are one-dimensionally arranged in the first direction. In the cathode panel shown in FIG. 11, main wirings 30 and branch wirings 31A and 31B are omitted unlike the cathode panel shown in FIG. 10, and the stripe-shaped conductive material layer 52A for a cathode electrode, extending in the first direction, works as these wirings. The main wirings 32 extend in a second direction different from the first direction (for example, direction at right angles with the first direction). The gate electrodes constituting the electron emitting portions 10A and 10B are connected to the branch wirings 33A and 33.

In an electron emitting region defective in operation, for example, the first branch wiring 33A connecting the first electron emitting portion 10A and the main wiring 32 can be cut off. In an electron emitting region normal in operation, for example, the second branch wiring 33B connecting the second electron emitting portion 10B and the main wiring 32 can be cut off.

Figure 12:
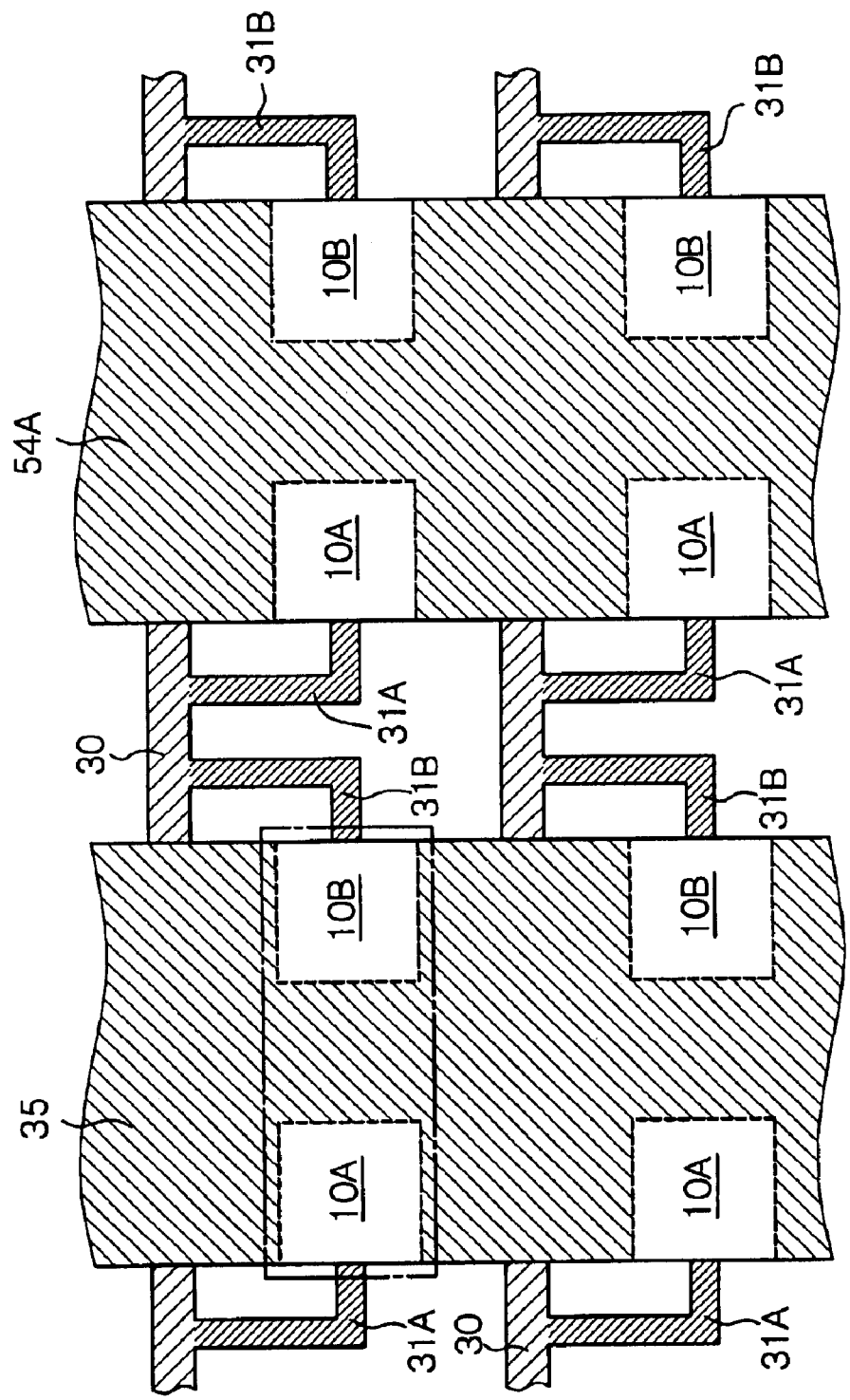
FIG. 12 shows a schematic plan layout of main wirings, branch wirings and cold cathode electron emitting portions in a variant of the cathode panel of Example 3.

In a constitution shown in FIG. 12, a conductive material layer 54A for a gate electrode is patterned in the form of a stripe unlike the form shown in FIG. 10. Part of the above stripe-shaped conductive material layer 54A for a gate electrode (region overlapping a patterned conductive material layer for a cathode electrode) constitutes the gate electrodes 54 of the electron emitting portions 10A and 10B. In other words, the gate electrodes of the electron emitting portions 10A and 10B adjacent to each other in the second direction are connected to each other with gate electrode extending portions 35, and a plurality of the electron emitting portions 10A and 10B are one-dimensionally arranged in the second direction. In the cathode panel shown in FIG. 12, main wirings 32 and branch wirings 33A and 33B are omitted unlike the cathode panel shown in FIG. 10. The stripe-shaped conductive material layer 54A for a gate electrode, extending in the second direction, works as these wirings. The main wirings 30 extend in a first direction different from the second direction (for example, direction at right angles with the second direction). The cathode electrodes constituting the electron emitting portions 10A and 10B are connected to the branch wirings 31A and 31B.

In an electron emitting region defective in operation, for example, the first branch wiring 31A connecting the first electron emitting portion 10A and the main wiring 30 can be cut off. In an electron emitting region normal in operation, for example, the second branch wiring 31B connecting the second electron emitting portion 10B and the main wiring 30 can be cut off.

Figure 13:
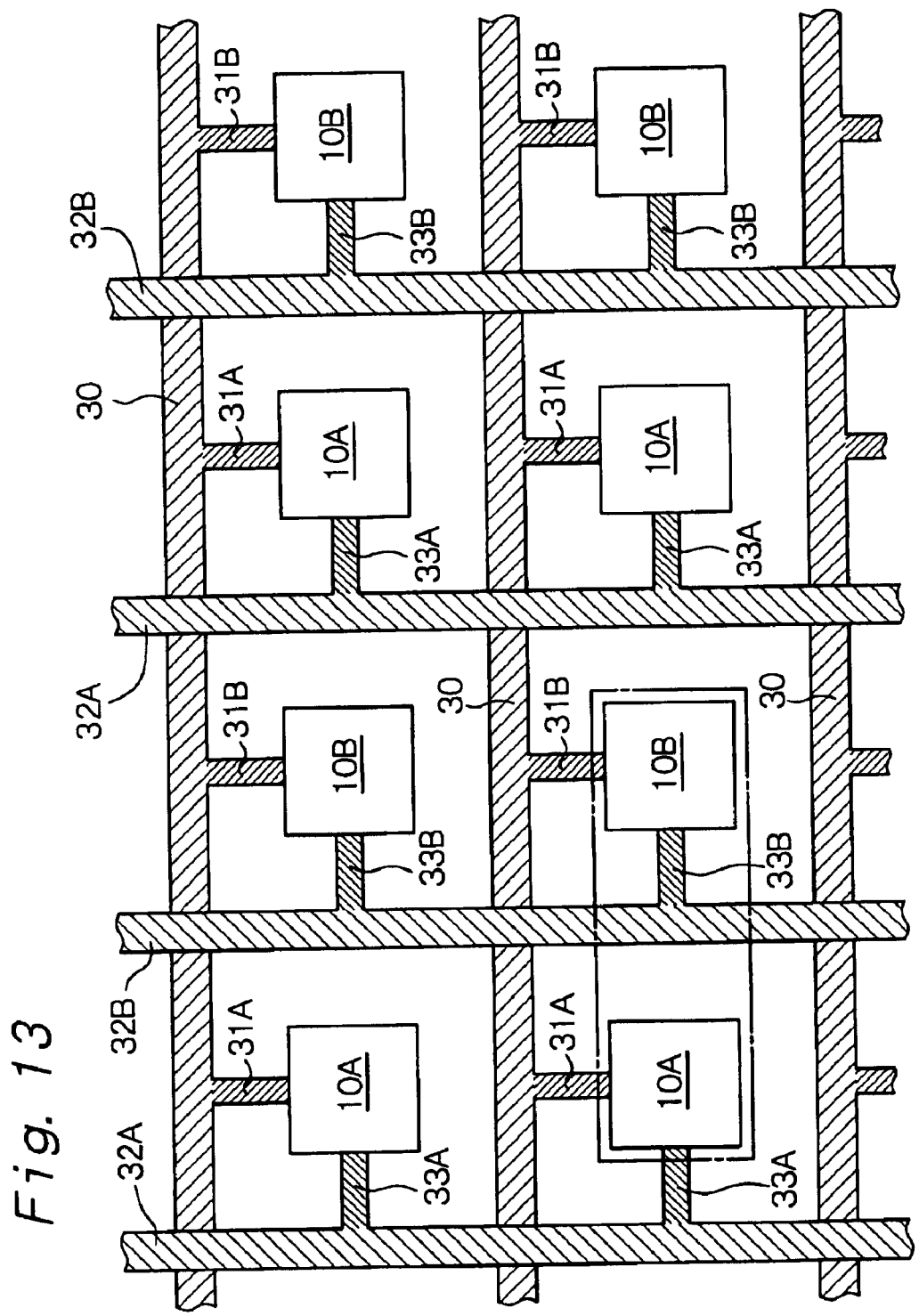
FIG. 13 shows a schematic plan layout of main wirings, branch wirings and cold cathode electron emitting portions in a variant of the cathode panel of Example 3.

In a constitution shown in FIG. 13, the main wirings extending in a second direction are constituted of pairs of main wirings 32A and 32B. The cathode electrodes constituting the first electron emitting portion 10A are connected to the main wiring 30 through the first branch wiring 31A, and the gate electrodes constituting the first electron emitting portion 10A are connected to the main wiring 32A through the first branch wiring 33A. The cathode electrode constituting the second electron emitting portion 10B are connected to the main wiring 30 through the second branch wiring 31B, and the gate electrodes constituting the second electron emitting portion 10B are connected to the main wiring 32B through the second branch wiring 33B. In the above constitution, the first electron emitting portion 10A and the second electron emitting portion 10B can be worked independently.

In an obtained cathode panel 50, a working test is carried out with regard to the first and second electron emitting portions 10A and 10B. The working test includes a wiring short-circuit test in which these electron emitting portions are measured for a resistance value or an anomalous heat generation to check whether or not they are short-circuited, and a display characteristic test in which electrons are actually emitted from the cathode panel 50. In the display characteristic test, the working test of the first electron emitting portions 10A is carried out by applying a voltage to the main wirings 30 and the main wirings 32A. Then, the working test of the second electron emitting portions 10B is carried out by applying a voltage to the main wirings 30 and the main wirings 32B.

In an electron emitting region defective in operation, the branch wiring 31A or the branch wiring 31B connecting the first or second electron emitting portion 10A or 10B defective in operation and the main wiring 30 is cut off. Otherwise, the branch wiring 33A or the branch wiring 33B connecting the first or second electron emitting portion 10A or 10B defective in operation and the main wiring 32A or 32B is cut off. In an electron emitting region normal in operation, one of the branch wirings 31A and 31B connecting the first and the second electron emitting portions 10A and 10B and the main wiring 30 is cut off. Otherwise, one of the branch wirings 33A and 33B connecting the first and the second electron emitting portions 10A and 10B and the main wiring 32A or 32B is cut off. That is, in any electron emitting region normal in operation, it is sufficient to bring one of the first electron emitting portion 10A and the second electron emitting portion 10B into a non-working state. Specifically, the same method as that in Example 1 can be carried out. In this manner, only one of the first electron emitting portion 10A and the second electron emitting portion 10B works, and as a result, the brightness of a display can be maintained at a constant level. In a pair of the main wirings 32A and 32B, when all the electron emitting portions 10A connected to the main wiring 32A normally work, and when all the electron emitting portions 10B connected to the main wiring 32B normally work, there may be employed a constitution in which one main wiring is not connected to a power source provided for actuating the electron emitting portions, or a constitution in which one main wiring is cut off. Further, when all the electron emitting portions 10A connected to the main wiring 32A normally work and when at least one of the electron emitting portions 10B connected to the main wiring 32B is defective in operation, there may be employed a constitution in which the main wiring 32B is not connected to a power source provided for actuating the electron emitting portions, or a constitution in which the main wiring 32B is cut off. When at least one of the electron emitting portions 10A connected to the main wiring 32A is defective in operation and when all the electron emitting portions 10B connected to the main wiring 32B normally work, there may be employed a constitution in which the main wiring 32A is not connected to a power source provided for actuating the electron emitting portions, or a constitution in which the main wiring 32A is cut off.

Figure 14:
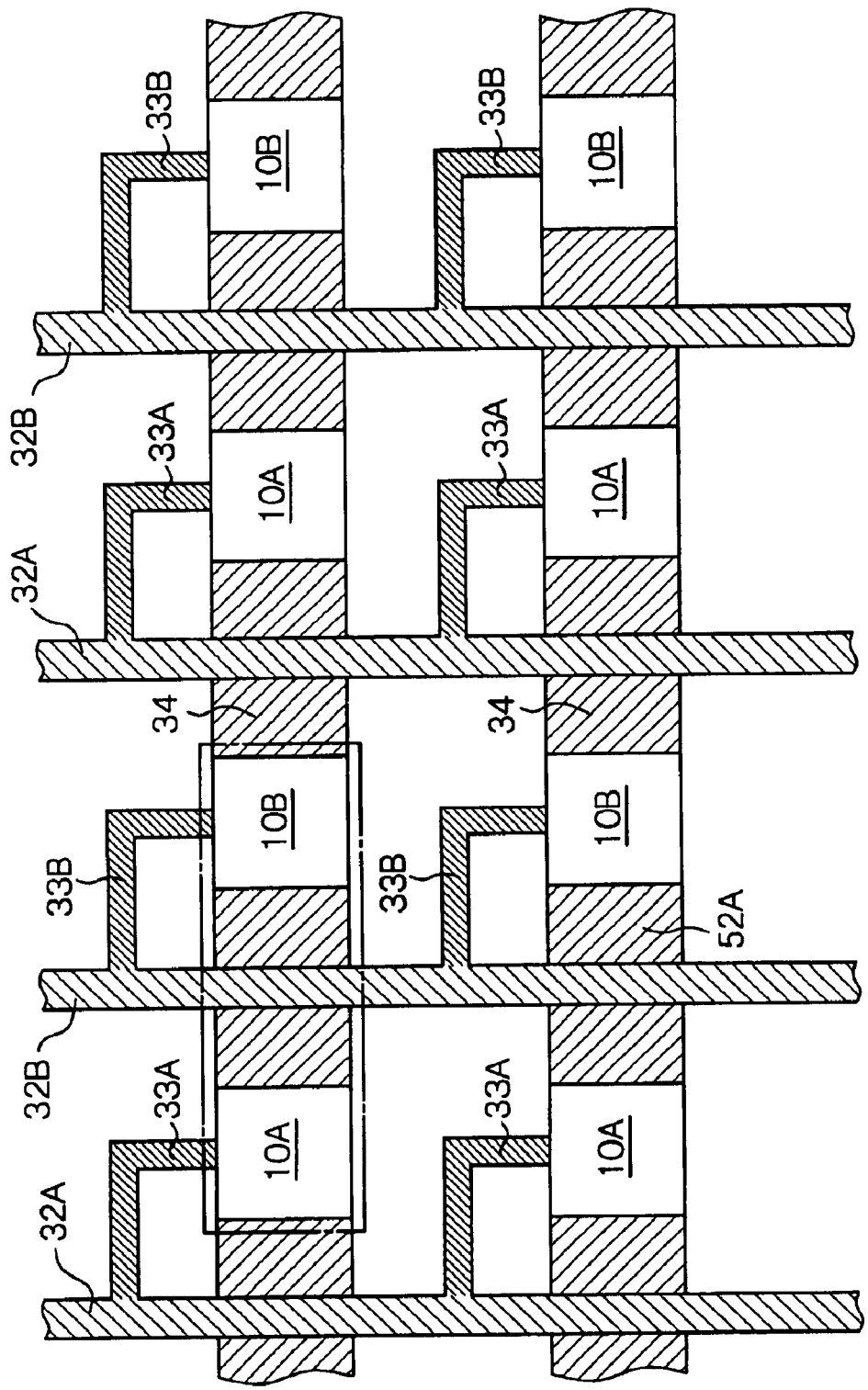
FIG. 14 shows a schematic plan layout of main wirings, branch wirings and cold cathode electron emitting portions in a variant of the cathode panel of Example 3.

A constitution shown in FIG. 14 is a combination of the constitutions shown FIGS. 13 and 11. That is, in the constitution shown in FIG. 14, a conductive material layer 52A for a cathode electrode is patterned in the form of a stripe unlike the form shown in FIG. 13, and part of the stripe-shaped conductive material layer 52A for a cathode electrode (region overlapping a patterned conductive material layer for a gate electrode) constitutes the cathode electrodes of electron emitting portions 10A and 10B. In other words, the cathode electrodes of the electron emitting portions 10A and 10B adjacent to each other in a first direction are connected through cathode electrode extending portions 34, and a plurality of the electron emitting portions 10A and 10B are one-dimensionally arranged in the first direction. The cathode panel shown in FIG. 14 omits main wirings 30 and branch wirings 31A and 31B unlike the cathode panel shown in FIG. 13, and the stripe-shaped conductive material layer 52A extending in the first direction works as these wirings. The main wirings 32A and 32B extend in a second direction different from the first direction (for example, direction at right angles with the first direction). The gate electrodes constituting the first electron emitting portion 10A are connected to the main wiring 32A through the branch wiring 33A. The gate electrodes constituting the second electron emitting portion 10B are connected to the main wiring 32B through the branch wiring 33B.

In an electron emitting region defective in operation, the branch wiring 33A or 33B connecting the first or second electron emitting portion 10A or 10B defective in operation and the main wiring 32A or 32B can be cut off. In an electron emitting region normal in operation, one of the branch wirings 33A and 33B connecting the first and second electron emitting portions 10A and 10B and the main wiring 32A or 32B can be cut off. That is, in any electron emitting region normal in operation, it is sufficient to bring one of the first electron emitting portion 10A and the second electron emitting portion 10B into a non-working state. In a pair of the main wirings 32A and 32B, when all the electron emitting portions 10A connected to the main wiring 32A normally work, and when all the electron emitting portions 10B connected to the main wiring 32B normally work, there may be employed a constitution in which one main wiring is not connected to a power source provided for actuating the electron emitting portions, or a constitution in which one main wiring is cut off. Further, when all the electron emitting portions 10A connected to the main wiring 32A normally work and when at least one of the electron emitting portions 10B connected to the main wiring 32B is defective in operation, there may be employed a constitution in which the main wiring 32B is not connected to a power source provided for actuating the electron emitting portions, or a constitution in which the main wiring 32B is cut off. When at least one of the electron emitting portions 10A connected to the main wiring 32A is defective in operation and when all the electron emitting portions 10B connected to the main wiring 32B normally work, there may be employed a constitution in which the main wiring 32A is not connected to a power source provided for actuating the electron emitting portions, or a constitution in which the main wiring 32A is cut off.

Figure 15:
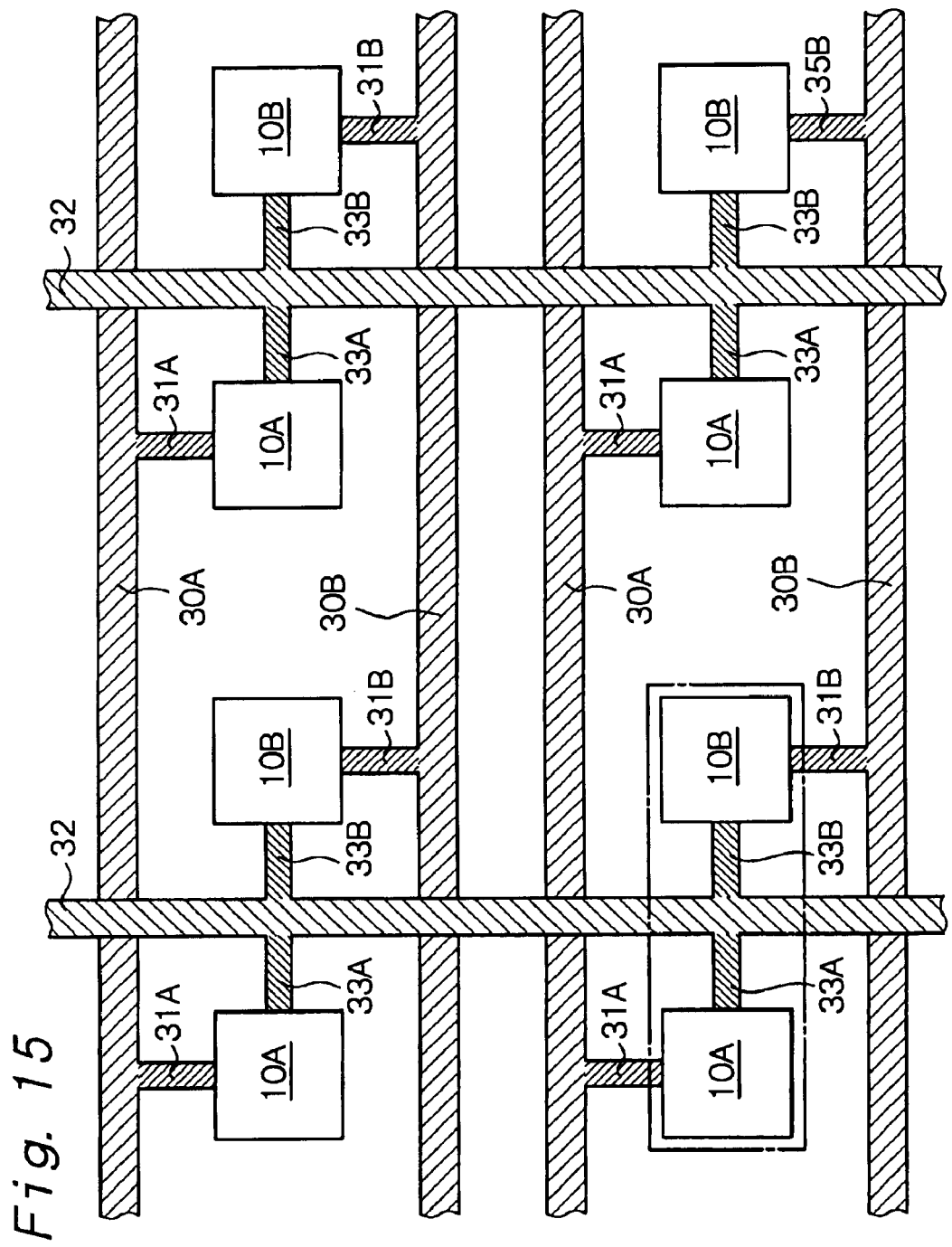
FIG. 15 shows a schematic plan layout of main wirings, branch wirings and cold cathode electron emitting portions in a variant of the cathode panel of Example 3.

In a constitution shown in FIG. 15, the main wirings extending in a first direction are constituted of pairs of main wirings 30A and 30B. The cathode electrodes constituting the first electron emitting portion 10A are connected to the main wiring 30A through the first branch wiring 31A, and the gate electrodes constituting the first electron emitting portion 10A are connected to the main wiring 32 through the first branch wiring 33A. The cathode electrodes constituting the second electron emitting portion 10B are connected to the main wiring 30B through the second branch wiring 31B, and the gate electrodes constituting the second electron emitting portion 10B are connected to the main wiring 32 through the second branch wiring 33B. In the above constitution, the first electron emitting portion 10A and the second electron emitting portion 10B can be worked independently.

In an obtained cathode panel 50, a working test is carried out with regard to the first and second electron emitting portions 10A and 10B. The working test includes a wiring short-circuit test in which these electron emitting portions are measured for a resistance value or an anomalous heat generation to check whether or not they are short-circuited, and a display characteristic test in which electrons are actually emitted from the cathode panel 50. In the display characteristic test, the working test of the first electron emitting portions 10A is carried out by applying a voltage to the main wirings 32 and the main wirings 30A. Then, the working test of the second electron emitting portions 10B is carried out by applying a voltage to the main wirings 32 and the main wirings 30B.

In an electron emitting region defective in operation, the branch wiring 31A or 31B connecting the first or second electron emitting portion 10A or 10B defective in operation and the main wiring 30A or 30B is cut off. Otherwise, the branch wiring 33A or 33B connecting the first or second electron emitting portion 10A or 10B defective in operation and the main wiring 32 is cut off. In an electron emitting region normal in operation, one of the branch wirings 31A and 31B connecting the first and second electron emitting portions 10A and 10B and the main wiring 30A or 30B is cut off. Otherwise, one of the branch wirings 33A and 33B connecting the first and second electron emitting portions 10A and 10B and the main wiring 32 is cut off. That is, in any electron emitting region normal in operation, it is sufficient to bring one of the first electron emitting portion 10A and the second electron emitting portion 10B into a non-working state. Specifically, the same method as that in Example 1 can be carried out. In a pair of the main wirings 30A and 30B, when all the electron emitting portions 10A connected to the main wiring 30A normally work and when all the electron emitting portions 10B connected to the main wiring 30B normally work, there may be employed a constitution in which one of the main wirings is not connected to a power source provided for actuating the electron emitting portions, or a constitution in which one main wiring is cut off. When all the electron emitting portions 10A connected to the main wiring 30A normally work and when at least one of the electron emitting portions 10B connected to the main wiring 30B is defective in operation, there may be employed a constitution in which the main wiring 30B is not connected to a power source provided for actuating the electron emitting portions, or a constitution in which the main wiring 30B is cut off. When at least one of the electron emitting portions 10A connected to the main wiring 30A is defective in operation and when all the electron emitting portions 10B connected to the main wiring 30B normally work, there may be employed a constitution in which the main wiring 30A is not connected to a power source provided for actuating the electron emitting portions, or a constitution in which the main wiring 30A is cut off.

Figure 16:
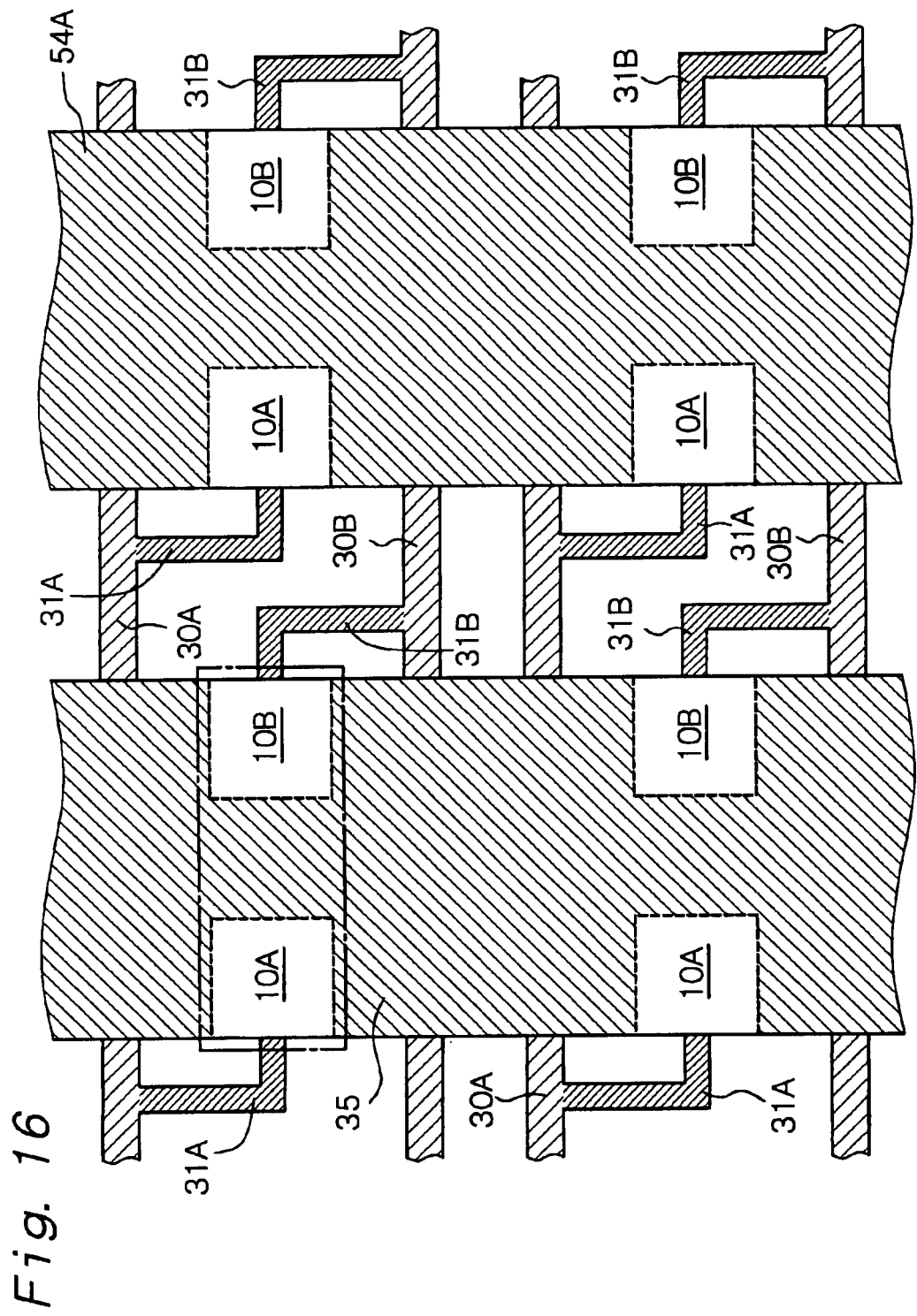
FIG. 16 shows a schematic plan layout of main wirings, branch wirings and cold cathode electron emitting portions in a variant of the cathode panel of Example 3.

A constitution shown in FIG. 16 is a combination of the constitutions shown in FIGS. 15 and 12. That is, in the constitution shown in FIG. 16, a conductive material layer 54A for a gate electrode is patterned in the form of a stripe unlike the form shown in FIG. 15, and part of the stripe-shaped conductive material layer 54A for a gate electrode (region overlapping a conductive material layer for a cathode electrode) constitutes the gate electrodes 54 of the electron emitting portions 10A and 10B. In other words, the gate electrodes of the electron emitting portions 10A and 10B adjacent to each other in a second direction are connected through gate electrode extending portions 35, and a plurality of the electron emitting portions 10A and 10B are one-dimensionally arranged in the second direction. In the cathode panel shown in FIG. 16, main wirings 32 and branch wirings 33A and 33B are omitted unlike the cathode panel shown in FIG. 15, and the stripe-shaped conductive material layer 54A for a gate electrode, extending in the second direction, works as these wirings. The main wirings 30A and 30B extend in a first direction different from the second direction (for example, direction at right angles with the second direction). The cathode electrodes constituting the first electron emitting portion 10A are connected to the main wiring 30A through the branch wiring 31A. The cathode electrodes constituting the second electron emitting portion 10B are connected to the main wiring 30B through the branch wiring 31B.

In an electron emitting region defective in operation, the branch wiring 31A or 31B connecting the first or second electron emitting portion 10A or 10B defective in operation and the main wiring 30A or 30B can be cut off. In any electron emitting region normal in operation, one of the branch wirings 31A and 31B connecting the first and second electron emitting portions 10A and 10B and the main wiring 30A or 30B can be cut off. That is, in any electron emitting region normal in operation, it is sufficient to bring one of the first electron emitting portion 10A and the second electron emitting portion 10B into a non-working state. In a pair of the main wirings 30A and 30B, when all the electron emitting portions 10A connected to the main wiring 30A normally work and when all the electron emitting portions 10B connected to the main wiring 30B normally work, there may be employed a constitution in which one of the main wirings is not connected to a power source provided for actuating the electron emitting portions, or a constitution in which one main wiring is cut off. When all the electron emitting portions 10A connected to the main wiring 30A normally work and when at least one of the electron emitting portions 10B connected to the main wiring 30B is defective in operation, there may be employed a constitution in which the main wiring 30B is not connected to a power source provided for actuating the electron emitting portions, or a constitution in which the main wiring 30B is cut off. When at least one of the electron emitting portions 10A connected to the main wiring 30A is defective in operation and when all the electron emitting portions 10B connected to the main wiring 30B normally work, there may be employed a constitution in which the main wiring 30A is not connected to a power source provided for actuating the electron emitting portions, or a constitution in which the main wiring 30A is cut off.

Figure 17:
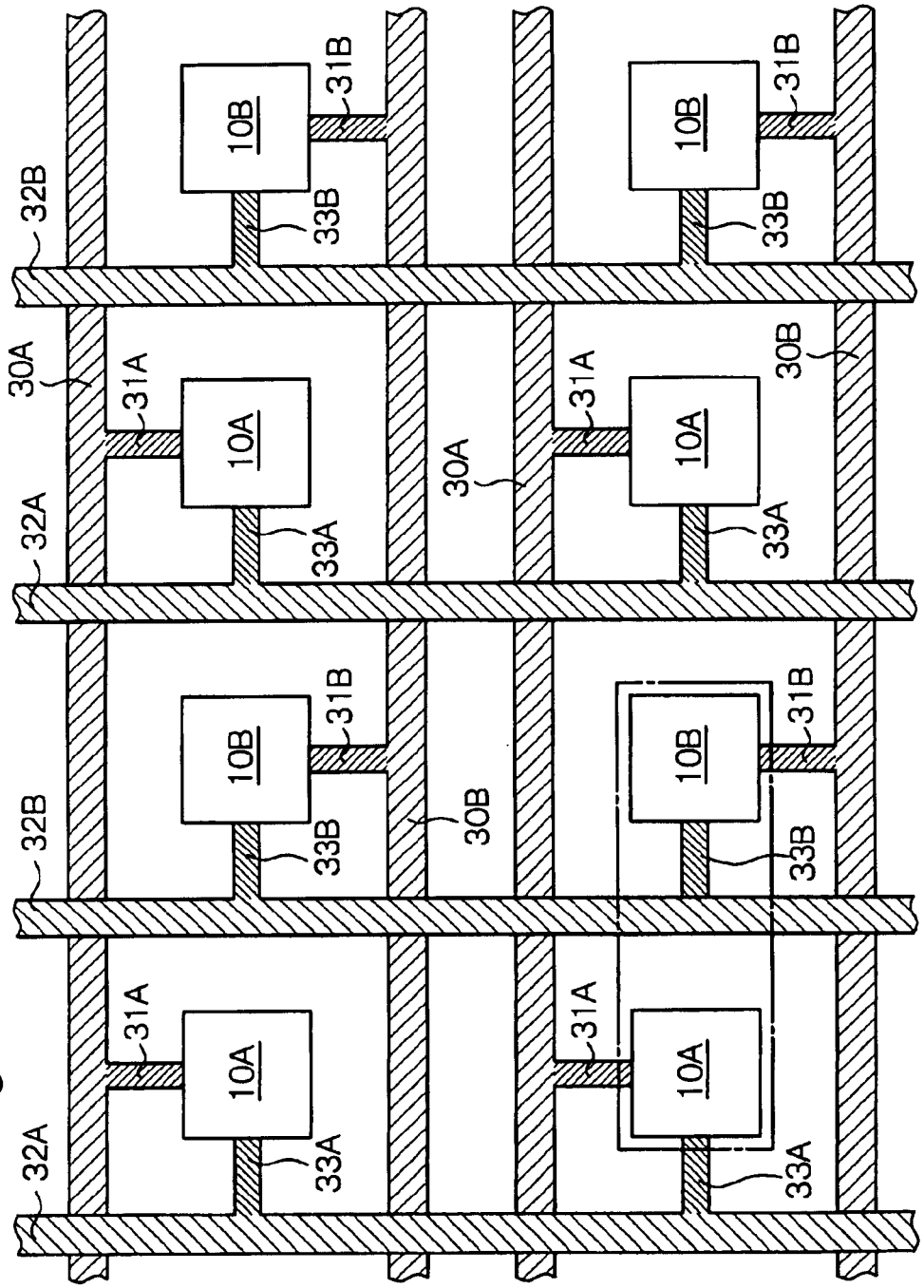
FIG. 17 shows a schematic plan layout of main wirings, branch wirings and cold cathode electron emitting portions in a variant of the cathode panel of Example 3.

In a constitution shown in FIG. 17, the main wiring extending in a first direction is constituted of a pair of the main wirings 30A and 30B, and the main wiring extending in a second direction is constituted of a pair of the main wirings 32A and 32B. The cathode electrodes constituting the first electron emitting portion 10A are connected to the main wiring 30A through the first branch wiring 31A, and the gate electrodes constituting the first electron emitting portion 10A are connected to the main wiring 32A through the first branch wiring 33A. The cathode electrodes constituting the second electron emitting portion 10B are connected to the main wiring 30B through the second branch wiring 31B, and the gate electrodes constituting the second electron emitting portion 10B are connected to the main wiring 32B through the second branch wiring 33B. In the above constitution, the first electron emitting portion 10A and the second electron emitting portion 10B can be worked independently.

In an obtained cathode panel 50, a working test is carried out with regard to the first and second electron emitting portions 10A and 10B. The working test includes a wiring short-circuit test in which these electron emitting portions are measured for a resistance value or an anomalous heat generation to check whether or not they are short-circuited, and a display characteristic test in which electrons are actually emitted from the cathode panel 50. In the display characteristic test, the working test of the first electron emitting portions 10A is carried out by applying a voltage to the main wirings 30A and the main wirings 32A. Then, the working test of the second electron emitting portions 10B is carried out by applying a voltage to the main wirings 30B and the main wirings 32B.

In an electron emitting region defective in operation, the branch wiring 31A or 31B connecting the first or second electron emitting portion 10A or 10B defective in operation and the main wiring 30A or 30B is cut off. Otherwise, the branch wiring 33A or 33B connecting the first or second electron emitting portion 10A or 10B defective in operation and the main wiring 32A or 32B is cut off. In any electron emitting region normal in operation, one of the branch wirings 31A and 31B connecting the first and second electron emitting portions 10A and 10B and the main wiring 30A or 30B is cut off. Otherwise, one of the branch wirings 33A and 33B connecting the first and second electron emitting portions 10A and 10B and the main wiring 32A or 32B is cut off. That is, in any electron emitting region normal in operation, it is sufficient to bring one of the first electron emitting portion 10A and the second electron emitting portion 10B into a non-working state. Specifically, the same method as that in Example 1 can be carried out. In a pair of the main wirings 30A and 30B and a pair of the main wirings 32A and 32B, when all the electron emitting portions 10A connected to the main wirings 30A and 32A normally work, and when all the electron emitting portions 10B connected to the main wirings 30B and 32B normally work, there may be employed a constitution in which one of the main wirings is not connected to a power source provided for actuating the electron emitting portions, or a constitution in which one of these main wirings is cut off. When all the electron emitting portions 10A connected to the main wirings 30A and 32A normally work and when at least one of the electron emitting portions 10B connected to the main wirings 30B and 32B is defective in operation, there may be employed a constitution in which at least one of the main wirings 30B and 32B is not connected to a power source provided for actuating the electron emitting portions, or a constitution in which at least one of the main wirings 30B and 32B is cut off. When at least one of the electron emitting portions 10A connected to the main wirings 30A and 32A is defective in operation and when all the electron emitting portions 10B connected to the main wirings 30B and 32B normally work, there may be employed a constitution in which at least one of the main wirings 30A and 32A is not connected to a power source provided for actuating the electron emitting portions, or a constitution in which at least one of the main wirings 30A and 32A is cut off.

When the constitutions shown in FIGS. 11, 12, 14 and 16 are applied to cathode panels having electron emitting portions having the edge type field emission devices of first structure, the edge type field emission devices of second structure or the flat type field emission devices, the constitutions of electrodes and electron emitting layers and the constitutions of main wirings and branch wirings are the same as those shown in Table 1.

EXAMPLE 4

Example 4 is concerned with the cathode panel, the display and the cathode panel production method according to the fourth aspect of the present invention.

Each of electron emitting portions can be constituted of a plurality (for example, tens to one thousand) of the Spindt type field emission devices, a plurality (approximately tens to hundreds) of the edge type field emission devices or one or a plurality of the flat type field emission device(s) which have been already explained. A cathode panel will be explained with reference to an embodiment in which each electron emitting portion is constituted of a plurality of the Spindt type field emission devices hereinafter, while the explanation can also apply to embodiments in which each electron emitting portion is constituted of field emission devices of any other type.

As FIG. 10 shows the schematic plan layout of main wirings, branch wirings and electron emitting portions, the cathode panel of Example 4 has a plurality of the main wirings 30 and 32, a plurality of the first branch wirings 31A and 33A and a plurality of the second branch wirings 31B and 33B extending from the main wirings 30 and 32 and a plurality of the electron emitting regions. A plurality of the first branch wirings 31A and the second branch wirings 31B extend from each main wiring 30, and a plurality of the first branch wirings 33A and the second branch wirings 33B extend from each main wiring 32. The main wirings 30 extend in a first direction, and the main wirings 32 extend in a second direction different from the first direction (for example, direction at right angles with the first direction).

Each electron emitting region is constituted of the first electron emitting portion 10A connected to the first branch wirings 31A and 33A extending from the main wirings 30 and 32 and the second electron emitting portion 10B connected to the second branch wirings 31B and 33B extending from the main wirings 30 and 32. Specifically, the cathode electrodes constituting the first electron emitting portion 10A are connected to the main wiring 30 through the first branch wiring 31A, and the gate electrodes constituting the first electron emitting portion 10A are connected to the main wiring 32 through the first branch wiring 33A. The cathode electrodes constituting the second electron emitting portion 10B are connected to the main wiring 30 through the second branch wiring 31B, and the gate electrodes constituting the second electron emitting portion 10B are connected to the main wiring 32 through the second branch wiring 33B. When one electron emitting portion (for example, a first electron emitting portion 10A) constituting an electron emitting region is defective in operation, a branch wiring (for example, the first branch wiring 31A or the first branch wiring 33A) connecting such an electron emitting portion (for example, the first electron emitting portion 10A) and a main wiring 30 or 32 is broken. When both of electron emitting portions (the first electron emitting portion 10A and the second electron emitting portion 10B) constituting an electron emitting region are normal in operation, one of branch wirings (for example, one of the second branch wirings 31B and 33B) connecting one (for example, the second electron emitting portion 10B) of the electron emitting portions constituting the electron emitting region and a main wiring 30 or 32 is cut off. The first electron emitting portions 10A and the second electron emitting portions 10B can be constituted so as to have the same constitutions as those, for example, in Example 1 or 2.

As described above, each electron emitting region is constituted of a pair of electron emitting portions 10A and 10B, and one of the first electron emitting portion 10A and the second electron emitting portion 10B is worked, whereby the brightness of a display can be maintained at a constant level.

The main wirings 30, the first branch wirings 31A and the second branch wirings 31B can be formed in the same manner as in the formation of the main wirings 20 and the branch wirings 21 in Example 2, and the main wirings 32, the first branch wirings 33A and the second branch wirings 33B can be formed in the same manner as in the formation of the main wirings 22 and the branch wirings 23 in Example 2. Detailed explanations thereof are therefore omitted.

In an obtained cathode panel 50, a working test is carried out with regard to the first and second electron emitting portions 10A and 10B in the same manner as in Example 2. In an electron emitting region defective in operation, the branch wiring connecting the electron emitting portion, which constitutes the electron emitting region and is in a short-circuited state, and the main wiring is broken by a current flowing in the branch wiring. In an electron emitting region which is not in a short-circuited state and is normal in operation, one of the branch wirings connecting the electron emitting portions and the main wiring is cut off by carrying out the same method as that in Example 1. After the short-circuit test, preferably, the display characteristic test is carried out in the same manner as in Example 3. In the display characteristic test, when a pair of the electron emitting portions 10A and 10B work normally, an image corresponding to a pixel is brighter than in a case where one of a pair of the electron emitting portions 10A and 10B is defective in operation. Therefore, one of the branch wirings connecting the electron emitting portions 10A and 10B and the main wiring can be cut off by carrying out the same method as that in Example 1.

The cathode panel 50 for which the above procedures are completed and an anode panel 60 are assembled, whereby a display shown in FIG. 27 can be constituted.

Constitutions of variants of the main wirings, the branch wirings and the electron emitting portions include those constitutions shown in the schematic plan layouts of FIGS. 11 to 17.

EXAMPLE 5

Example 5 is concerned with the cathode panel, the display and the cathode panel production method according to the fifth aspect of the present invention.

Each of electron emitting portions can be constituted of a plurality (for example, tens to one thousand) of the Spindt type field emission devices, a plurality (approximately tens to hundreds) of the edge type field emission devices or one or a plurality of the flat type field emission device(s) which have been already explained. A cathode panel will be explained with reference to an embodiment in which each electron emitting portion is constituted of a plurality of the Spindt type field emission devices hereinafter, while the explanation can substantially apply to embodiments in which each electron emitting portion is constituted of field emission devices of any other type.

Figure 18:
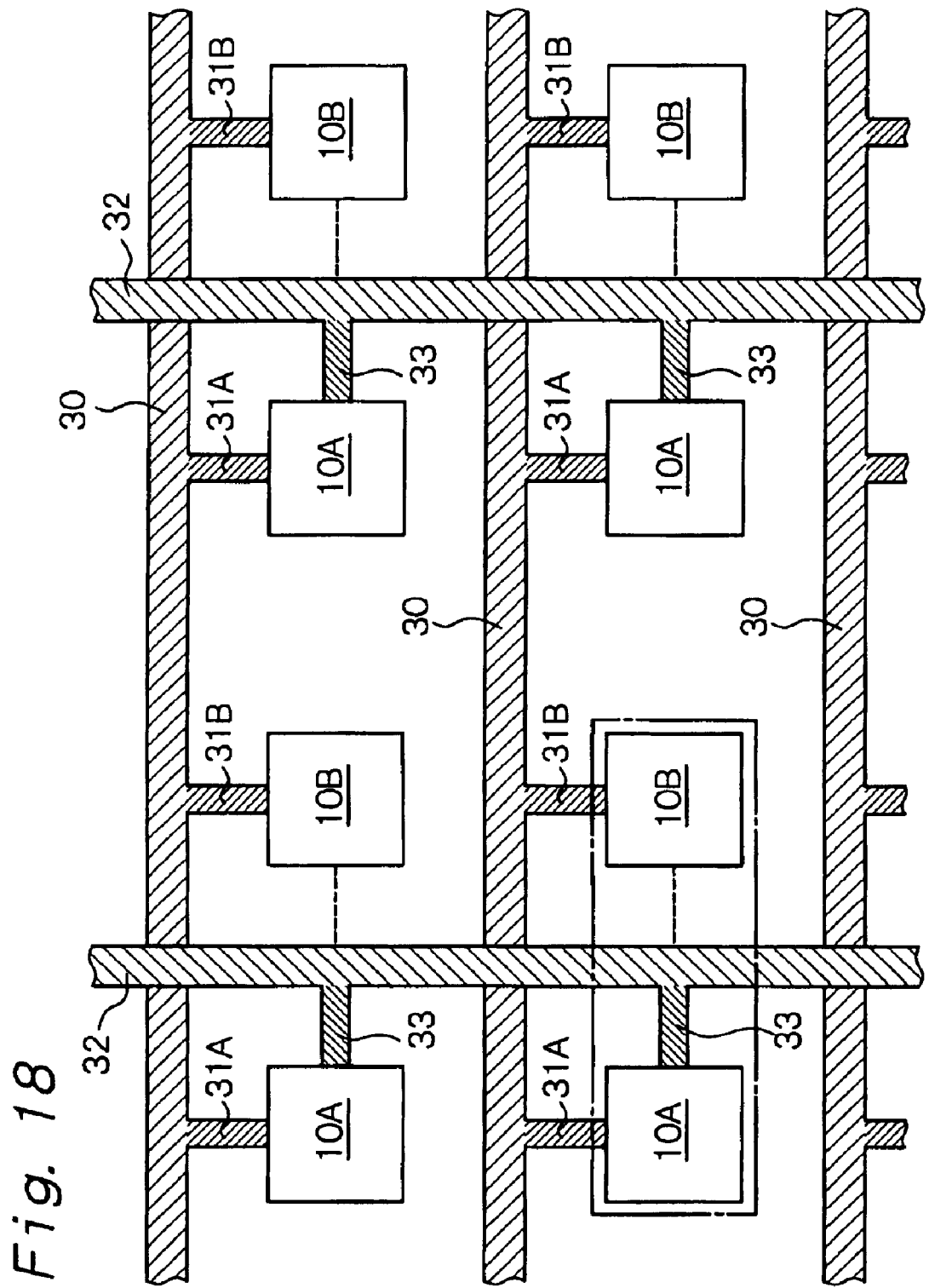
FIG. 18 shows a schematic plan layout of main wirings, branch wirings and cold cathode electron emitting portions in a cathode panel of Example 5.

As FIG. 18 shows a schematic plan layout of main wirings, branch wirings and electron emitting portions, the cathode panel of Example 5 has a plurality of main wirings 30 and 32, a plurality of branch wirings 31A, 31B and 33 extending from the main wirings 30 and 32 and a plurality of electron emitting regions. A plurality of the branch wirings 31A and 31B extend from each main wiring 30, and a plurality of the branch wirings 33 extend from each main wiring 32. The main wirings 30 extend in a first direction, and the main wirings 32 extend in a second direction different from the first direction (direction at right angles with the first direction). In FIG. 18 and FIGS. 19 to 23 to be referred to later, showing of a support and an insulating layer and detailed showing of field emission devices are omitted.

Each electron emitting region is constituted of a first electron emitting portion 10A connected to the branch wirings 31A and 33 extending from the main wirings 30 and 32, and a second electron emitting portion 10B. In Example 5, each second electron emitting portion 10B is connected to the main wiring 30 through the branch wiring 31B but is not connected to the main wiring 32. In the above state, the second electron emitting portions 10B does not function (work).

Specifically, the cathode electrodes constituting the first electron emitting portion 10A are connected to the main wiring 30 through the branch wiring 31A, and the gate electrodes constituting the first electron emitting portion 10A are connected to the main wiring 32 through the branch wiring 33. The cathode electrodes constituting the second electron emitting portion 10B are connected to the main wiring 30 through the branch wiring 31B, but the gate electrodes constituting the second electron emitting portion 10B are not connected to any main wiring 32. When a first electron emitting portion 10A is defective in operation, the branch wiring 31A connecting the first electron emitting portion 10A and the main wiring 30 or the branch wiring 33 is cut off, and the second electron emitting portion 10B constituting the electron emitting region including the above first electron emitting portion 10 is electrically connected to the main wiring 32. In Example 5, the above second electron emitting portion 10B constituting the electron emitting region is connected to the main wiring 30 through the branch wiring 31B and is electrically connected to the main wiring 32 through a new branch wiring (shown by a dotted line in FIG. 18) formed by an ion beam method.

As described above, each electron emitting region is constituted of a pair of electron emitting portions 10A and 10B, and one of the first electron emitting portion 10A and the second electron emitting portion 10B is worked, whereby the brightness of a display can be maintained at a constant level.

The main wirings 30, the branch wirings 31A and the branch wirings 31B can be formed in the same manner as in the formation of the main wirings 20 and the branch wirings 21 in Example 1. The main wirings 32 and the branch wirings 33 can be formed in the same manner as in the formation of the main wirings 22 and the branch wirings 23 in Example 1. Detailed explanations thereof are therefore omitted.

In an obtained cathode panel 50, a working test is carried out with regard to the first electron emitting portions 10A. The working test includes a wiring short-circuit test in which the first electron emitting portions 10A are measured for a resistance value or an anomalous heat generation to check whether or not they are short-circuited, and a display characteristic test in which electrons are actually emitted from the cathode panel 50.

In an electron emitting portion 10A which is found to be defective in operation, the branch wiring 31A connecting the first electron emitting portion 10A and the main wiring 30 is cut off. Otherwise, the branch wiring 33 connecting the first electron emitting portion 10A and the main wiring 32 is cut off. Specifically, the same method as that in Example 1 can be carried out. And, the second electron emitting portion 10B constituting the electron emitting region including the above first electron emitting portion 10A is electrically connected to the main wiring 32. Specifically, a new branch wiring can be formed by an ion beam method.

The cathode panel 50 for which the above procedures are completed and an anode panel 60 are assembled, whereby a display shown in FIG. 27 can be constituted.

FIGS. 19 to 23 show schematic plan layouts of variants of the main wirings, the branch wirings and the electron emitting portions.

Figure 19:
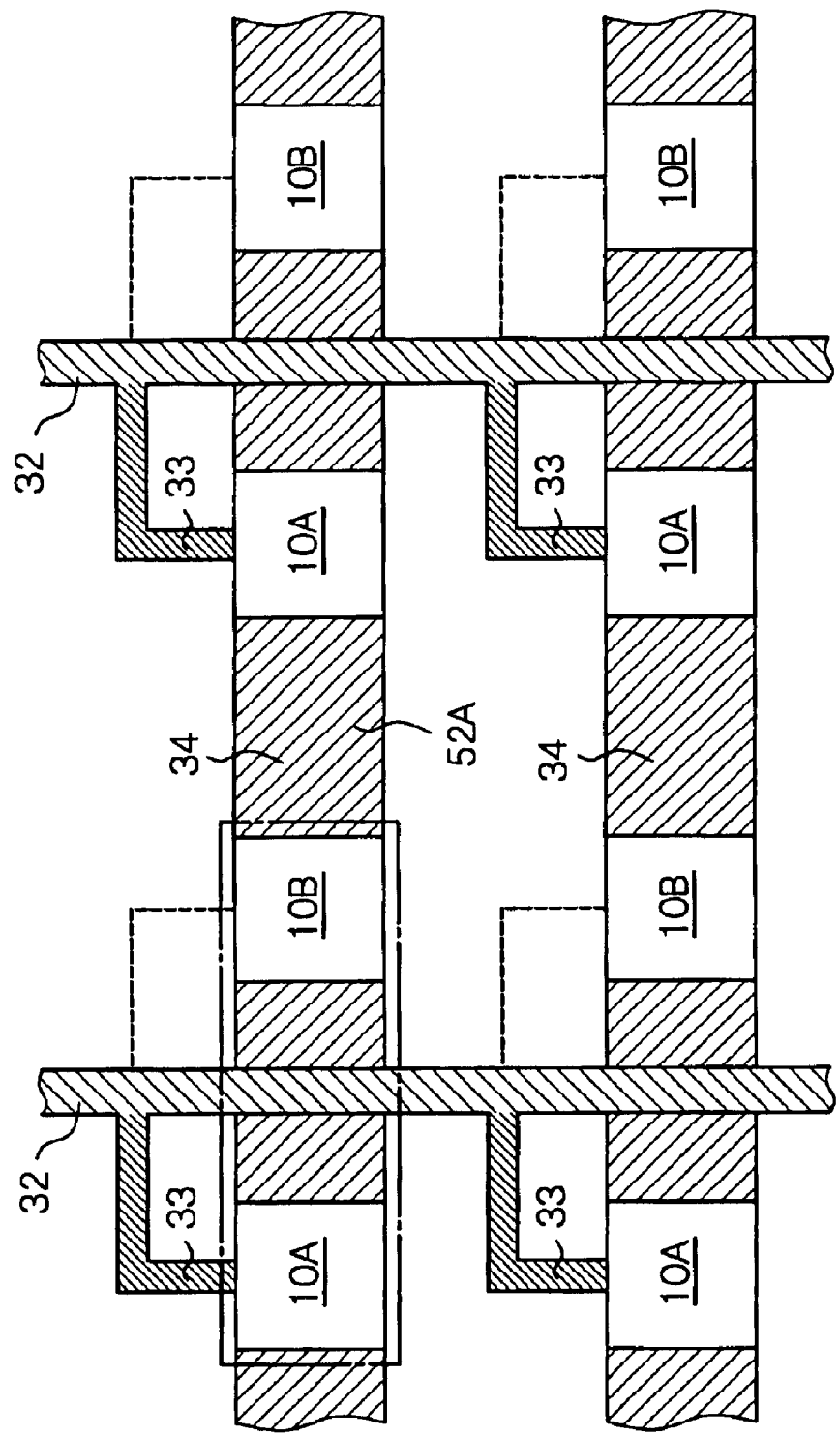
FIG. 19 shows a schematic plan layout of main wirings, branch wirings and cold cathode electron emitting portions in a variant of the cathode panel of Example 5.

In a constitution shown in FIG. 19, the conductive material layer 52A for a cathode electrode is patterned in the form of a stripe unlike the form shown in FIG. 18. Part of the stripe-shaped conductive material layer 52A for a cathode electrode (region overlapping a patterned conductive material layer for a gate electrode) constitutes the cathode electrodes 52 of the electron emitting portions 10A and 10B. In other words, the cathode electrodes of the electron emitting portions 10A and 10B adjacent to each other in a first direction are connected through cathode electrode extending portions 34, and a plurality of the electron emitting portions 10A and 10B are one-dimensionally arranged in the first direction. In the cathode panel shown in FIG. 19, main wirings 30 and branch wirings 31A and 31B are omitted unlike the cathode panel shown in FIG. 18, and the stripe-shaped conductive material layer 52A for a cathode electrode, extending in the first direction, works as these wirings. The main wirings 32 extend in a second direction different from the first direction (for example, direction at right angles with the first direction). The gate electrodes constituting the electron emitting portion 10A are connected to the branch wiring 33. The gate electrodes constituting the electron emitting portion 10B are not connected to the main wiring 32.

In a first electron emitting portion 10A defective in operation, the branch wiring 33 connecting the first electron emitting portion 10A and the main wiring 32 can be cut off. And, the second electron emitting portion 10B constituting the electron emitting region including the above first electron emitting portion 10 is electrically connected to the main wiring 32.

Figure 20:
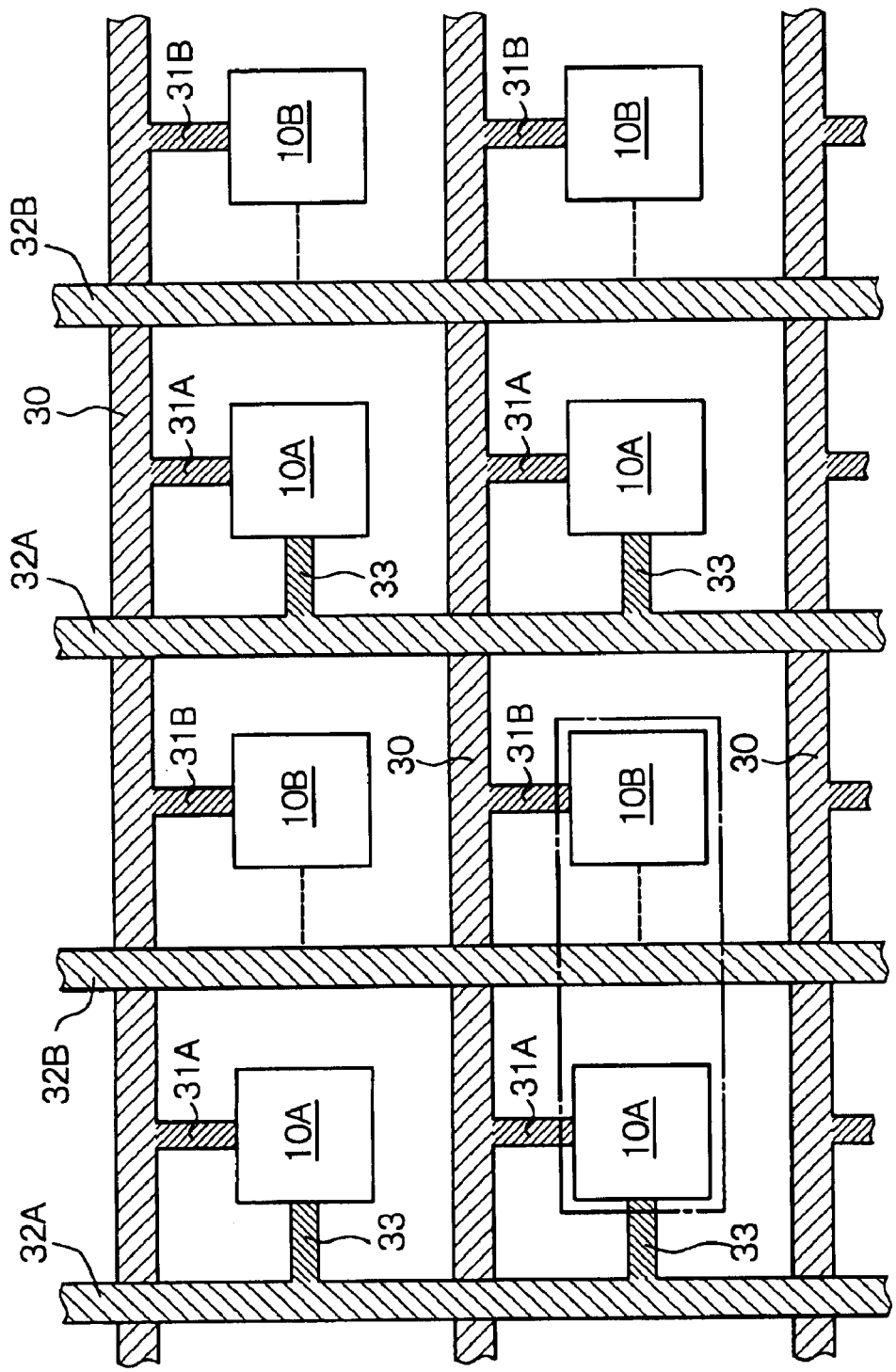
FIG. 20 shows a schematic plan layout of main wirings, branch wirings and cold cathode electron emitting portions in a variant of the cathode panel of Example 5.

In a constitution shown in FIG. 20, the main wiring extending in a second direction is constituted of a pair of the main wirings 32A and 32B. The cathode electrodes constituting the first electron emitting portion 10A are connected to the main wiring 30 through the branch wiring 31A, and the gate electrodes constituting the first electron emitting portion 10A are connected to the main wiring 32A through the branch wiring 33. The cathode electrodes constituting the second electron emitting portion 10B are connected to the main wiring 30 through the branch wiring 31B, but the gate electrodes constituting the second electron emitting portion 10B are not connected to the main wiring 32B. In the above constitution, the first electron emitting portion 10A and the second electron emitting portion 10B can be worked independently.

In an obtained cathode panel 50, a working test is carried out with regard to the first electron emitting portions 10A. The working test includes a wiring short-circuit test in which the first electron emitting portions 10A are measured for a resistance value or an anomalous heat generation to check whether or not they are short-circuited, and a display characteristic test in which electrons are actually emitted from the cathode panel 50. In the display characteristic test, the working test of the first electron emitting portions 10A is carried out by applying a voltage to the main wirings 30 and the main wirings 32A.

In an electron emitting portion 10A defective in operation, the branch wiring 31A connecting the first electron emitting portion 10A and the main wiring 30 is cut off. Otherwise, the branch wiring 33 connecting the first electron emitting portion 10A and the main wiring 32A is cut off. Specifically, the same method as that in Example 1 can be carried out. And, the second electron emitting portion 10B constituting the electron emitting region including the above first electron emitting portion 10A is electrically connected to the main wiring 32. Specifically, a new branch wiring can be formed by an ion beam method.

Figure 21:
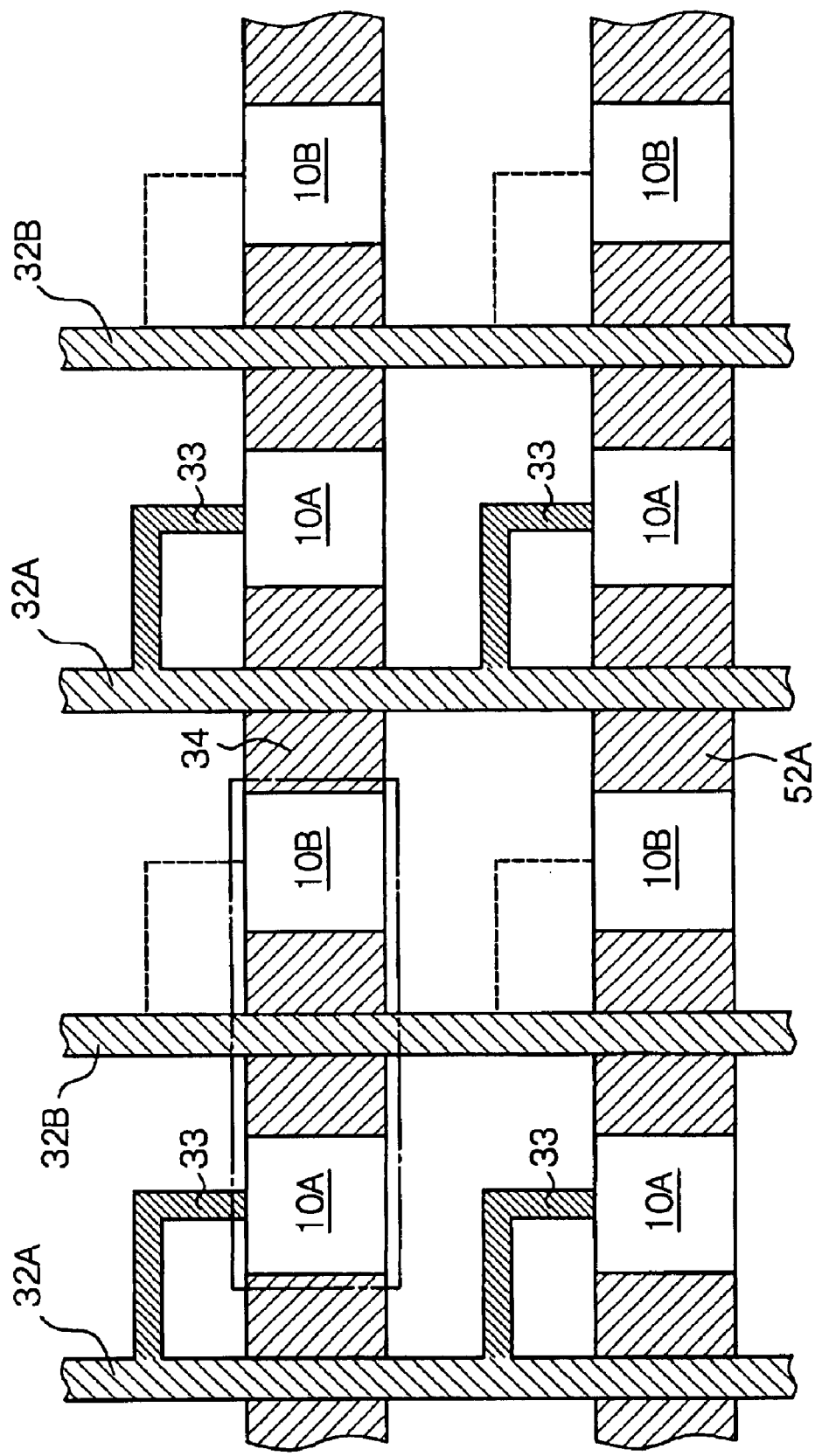
FIG. 21 shows a schematic plan layout of main wirings, branch wirings and cold cathode electron emitting portions in a variant of the cathode panel of Example 5.

In a constitution shown in FIG. 21, the conductive material layer 52A for a cathode electrode is patterned in the form of a stripe unlike the form shown in FIG. 20, and part of the stripe-shaped conductive material layer 52A for a cathode electrode (region overlapping a conductive material layer for a gate electrode) constitutes the cathode electrodes 52 of the electron emitting portions 10A and 10B. In other words, the cathode electrodes of the electron emitting portions 10A and 10B adjacent to each other in a first direction are connected through cathode electrode extending portions 34, and a plurality of the electron emitting portions 10A and 10B are one-dimensionally arranged in the first direction. In the cathode panel shown in FIG. 21, main wirings 30 and branch wirings 31A and 31B are omitted unlike the cathode panel shown in FIG. 20, and the stripe-shaped conductive material layer 52A for a cathode electrode, extending in the first direction, works as these wirings. The main wirings 32 extend in a second direction different from the second direction (for example, direction at right angles with the second direction). The gate electrodes constituting the first electron emitting portion 10A are connected to the main wirings 33. The gate electrodes constituting the second electron emitting portion 10B are not connected to the main wiring 32.

In a first electron emitting portion 10A defective in operation, the branch wiring 33 connecting the first electron emitting portion 10A and the main wiring 32A can be cut off. Specifically, the same method as that in Example 1 can be carried out. And, the second electron emitting portion 10B constituting the electron emitting region including the above first electron emitting portion 10A is electrically connected to the main wiring 32B. Specifically, a new branch wiring can be formed by an ion beam method.

Figure 22:
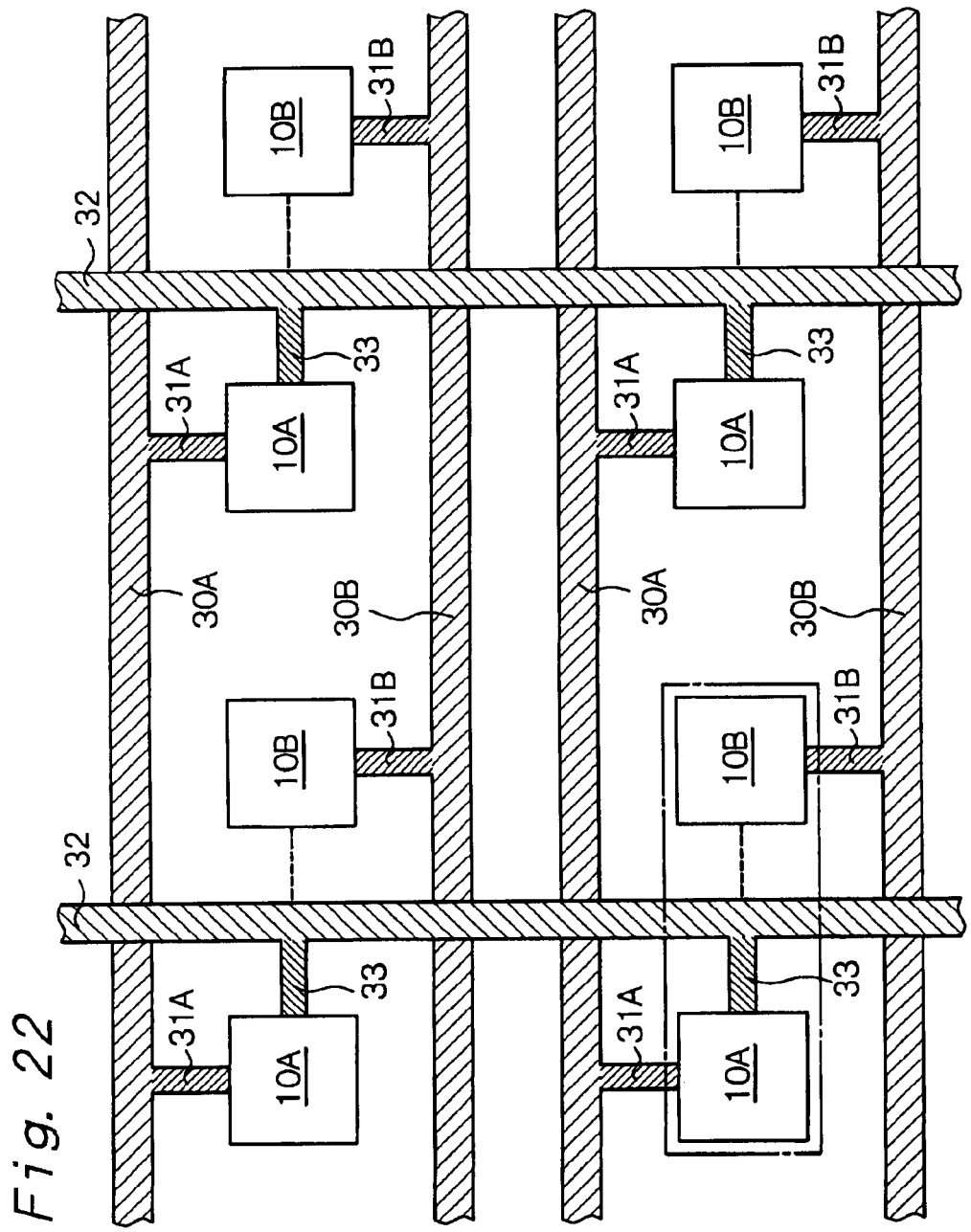
FIG. 22 shows a schematic plan layout of main wirings, branch wirings and cold cathode electron emitting portions in a variant of the cathode panel of Example 5.

In a constitution shown in FIG. 22, the main wiring extending in a first direction is constituted of a pair of the main wirings 30A and 30B. The cathode electrodes constituting the first electron emitting portion 10A are connected to the main wiring 30A through the branch wiring 31A, and the gate electrodes constituting the first electron emitting portion 10A are connected to the main wiring 32 through the branch wiring 33. The cathode electrodes constituting the second electron emitting portion 10B are connected to the main wiring 30B through branch wiring 31B, while the gate electrodes constituting the second electron emitting portion 10B are not connected to the main wiring 32. In the above constitution, the first electron emitting portion 10A and the second electron emitting portion 10B can be worked independently.

In an obtained cathode panel 50, a working test is carried out with regard to the first electron emitting portion 10A. The working test includes a wiring short-circuit test in which the first electron emitting portions 10A are measured for a resistance value or an anomalous heat generation to check whether or not they are short-circuited, and a display characteristic test in which electrons are actually emitted from the cathode panel 50. In the display characteristic test, the working test of the first electron emitting portions 10A is carried out by applying a voltage to the main wirings 30A and the main wirings 32.

In an electron emitting portion 10A defective in operation, the branch wiring 31A connecting the first electron emitting portion 10A and the main wiring 30A is cut off. Otherwise, the branch wiring 33 connecting the first electron emitting portion 10A defective in operation and the main wiring 32 is cut off. Specifically, the same method as that in Example 1 can be carried out. And, the second electron emitting portion 10B constituting the electron emitting region including the above first electron emitting portion 10A is electrically connected to the main wiring 32. Specifically, a new branch wiring can be formed by an ion beam method.

Figure 23:
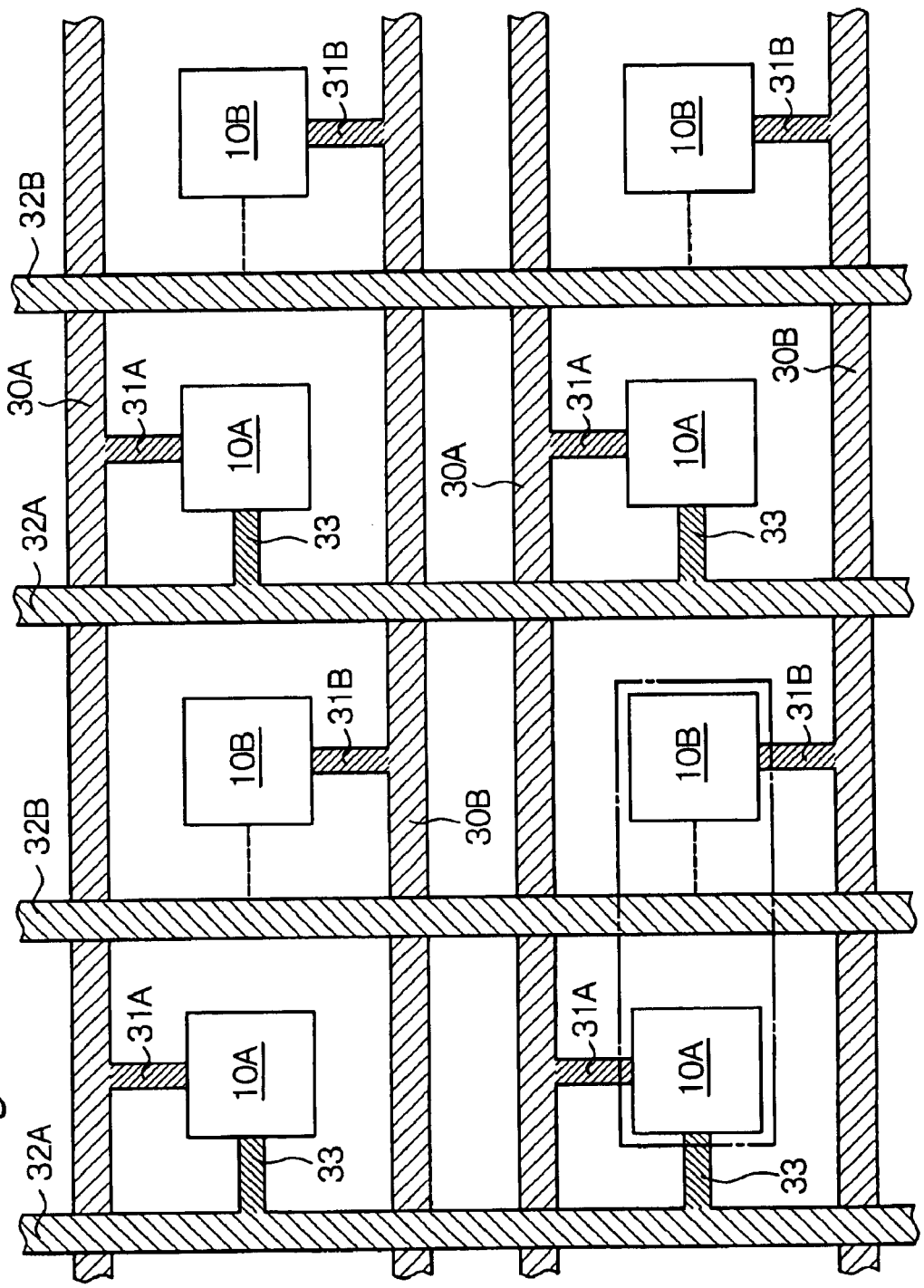
FIG. 23 shows a schematic plan layout of main wirings, branch wirings and cold cathode electron emitting portions in a variant of the cathode panel of Example 5.

In a constitution shown in FIG. 23, the main wiring extending in a first direction is constituted of a pair of the main wirings 30A and 30B, and the main wiring extending in a second direction is constituted of a pair of the main wirings 32A and 32B. The cathode electrodes constituting the first electron emitting portion 10A are connected to the main wiring 30A through the branch wiring 31A, and the gate electrodes constituting the first electron emitting portion 10A are connected to the main wiring 32A through the branch wiring 33. The cathode electrodes constituting the second electron emitting portion 10B are connected to the main wiring 30B through the branch wiring 31B, while the gate electrodes constituting the second electron emitting portion 10B are not connected to the main wiring 32B. In the above constitution, the first electron emitting portion 10A and the second electron emitting portion 10B can be worked independently.

In an obtained cathode panel 50, a working test is carried out with regard to the first electron emitting portion 10A. The working test includes a wiring short-circuit test in which the first electron emitting portions 10A are measured for a resistance value or an anomalous heat generation to check whether or not they are short-circuited, and a display characteristic test in which electrons are actually emitted from the cathode panel 50. In the display characteristic test, the working test of the first electron emitting portions 10A is carried out by applying a voltage to the main wirings 30A and the main wirings 32A.

In an electron emitting portion 10A defective in operation, the branch wiring 31A connecting the first electron emitting portion 10A and the main wiring 30A is cut off. Otherwise, the branch wiring 33 connecting the first electron emitting portion 10A defective in operation and the main wiring 32A is cut off. Specifically, the same method as that in Example 1 can be carried out. And, the second electron emitting portion 10B constituting the electron emitting region including the above first electron emitting portion 10A is electrically connected to the main wiring 32B. Specifically, a new branch wiring can be formed by an ion beam method.

Table 3 shows constitutions of electrodes and electron emitting layers and constitutions of main wirings and branch wirings when the constitutions shown in FIGS. 19 and 20 are applied to cathode panels having electron emitting portions having the edge type field emission devices of first structure, the edge type field emission devices of second structure or the flat type field emission devices. In these constitutions, any branch wiring connecting an electron emitting portion defective in operation and a main wiring can be cut off as required so that the electron emitting portion defective in operation does not work. In the edge type field emission device of second structure, further, for reliably ensuring the non-working of a second electron emitting portion 10B of which the working is not required when a display is operated, it is preferred to employ a constitution in which the branch wiring 31B connecting the electron emitting layer 74 and the main wiring 30 (or the main wiring 30B) is cut off, or a constitution in which a branch wiring (not shown) connecting a first gate electrode 72 and the main wiring 32 (or the main wiring 32B) is cut off.

TABLE 3

[Edge type field emission device of first structure]

| | Electron emitting layer | Gate electrode |
|---|---|---|
| (1) | H | H |
| (2) | S | H |

[Edge type field emission device of second structure]

| | First gate electrode | Electron emitting layer | Second gate electrode |
|---|---|---|---|
| (1) | H | H | H |
| (2) | S | H | H |
| (3) | H | S | H |
| (4) | S | S | H |

[Flat type field emission device]

| | Electron emitting layer | Gate electrode |
|---|---|---|
| (1) | H | H |
| (2) | S | H |

EXAMPLE 6

Example 6 is concerned with the cathode panel, the display and the cathode panel production method according to the sixth aspect of the present invention.

Each of electron emitting portions can be constituted of a plurality (for example, tens to one thousand) of the Spindt type field emission devices, a plurality (approximately tens to hundreds) of the edge type field emission devices or one or a plurality of the flat type field emission device(s) which have been already explained. A cathode panel will be explained with reference to an embodiment in which each electron emitting portion is constituted of a plurality of the Spindt type field emission devices hereinafter, while the explanation can substantially apply to embodiments in which each electron emitting portion is constituted of field emission devices of any other type.

As FIG. 18 shows a schematic plan layout of main wirings, branch wirings and electron emitting portions, the cathode panel of Example 6 has a plurality of the main wirings 30 and 32, a plurality of the branch wirings 31A, 31B and 33 extending from the main wirings 30 and 32 and a plurality of the electron emitting regions. A plurality of the branch wirings 31A and 31B extend from each main wiring 30, and a plurality of the branch wirings 33 extend from each main wiring 32. The main wirings 30 extend in a first direction, and the main wirings 32 extend in a second direction different from the first direction (for example, direction at right angles with the first direction).

Each electron emitting region is constituted of the first electron emitting portion 10A connected to branch wirings 31A and 33 extending from the main wirings 30 and 32, respectively, and the second electron emitting portion 10B. In Example 6, the second electron emitting portion 10B is connected to the main wiring 30 through the branch wiring 31B but is not connected to the main wiring 32B. In this state, therefore, the second electron emitting portion 10B does not function (work).

Specifically, the cathode electrodes constituting the first electron emitting portion 10A are connected to the main wiring 30 through the branch wiring 31A, and the gate electrodes constituting the first electron emitting portion 10A are connected to the main wiring 32 through the branch wiring 33. The cathode electrodes constituting the second electron emitting portion 10B are connected to the main wiring 30 through the branch wiring 31B, but the gate electrodes constituting the second electron emitting portion 10B are not connected to any main wiring 32. When a first electron emitting portion 10A is in a short-circuited state, the branch wiring connecting the first electron emitting portion 10A and the main wiring is broken, and the second electron emitting portion 10B constituting the electron emitting region including the above first electron emitting portion 10A is electrically connected to the main wiring 32. In Example 6, the above second electron emitting portion 10B constituting the electron emitting region is connected to the main wiring 30 through the branch wiring 31B and is electrically connected to the main wiring 32 through a new branch wiring (shown by a dotted line in FIG. 18) formed by an ion beam method. The first electron emitting portions 10A and the second electron emitting portions 10B can be constituted so as to have the same constitutions as those of the electron emitting portions in Example 1 or Example 2.

As described above, each electron emitting region is constituted of a pair of the electron emitting portions 10A and 10B, and one of the first electron emitting portion 10A and the second electron emitting portion 10B is worked, whereby the brightness of a display can be maintained at a constant level.

The main wirings 30, the branch wirings 31A and the branch wirings 31B can be formed in the same manner as in the formation of the main wirings 20 and the branch wirings 21 in Example 2, and the main wirings 32 and the branch wirings 33 can be formed in the same manner as in the formation of the main wirings 22 and the main wirings 23 in Example 2, so that detailed explanations thereof are omitted.

In an obtained cathode panel 50, the first electron emitting portions 10A are tested for a short circuit as explained in Example 2. That is, the short circuit test is carried out by applying a voltage to the first electron emitting portions 10A from the main wirings 30 through the branch wirings 31A. In a first electron emitting portion 10A in a short-circuited state, the branch wiring 31A connecting the first electron emitting portion 10A and the main wiring 30 is broken, or the branch wiring 33 connecting the first electron emitting portion 10A and the main wiring 32 is broken by means of a current flowing in the branch wiring 33. And, the second electron emitting portion 10B constituting the electron emitting region including the above first electron emitting portion 10A is electrically connected to the main wiring 32 in the same manner as in Example 5. Specifically, a new branch wiring can be formed by an ion beam method. After the short circuit test, preferably, the display characteristic test is carried out in the same manner as in Example 5. In the display characteristic test, an electron emitting portion 10A in a short-circuited state comes into a non-working state, so that an image corresponding to such a pixel causes a dark point. The electron emitting portion 10B corresponding to the pixel causing a dark point can be electrically connected to the main wiring 32 in the same manner as in Example 5.

The cathode panel 50 for which the above procedures are completed and an anode panel 60 are assembled, whereby a display shown in FIG. 27 can be constituted.

Constitutions of variants of the main wirings, the branch wirings and the electron emitting portions include those shown in the schematic plan layouts of FIGS. 19 to 23.

EXAMPLE 7

Example 7 is concerned with the cathode panel, the display and the cathode panel production method according to the seventh aspect of the present invention.

Each of electron emitting portions 10 can be constituted of a plurality (for example, tens to one thousand) of the Spindt type field emission devices, a plurality (approximately tens to hundreds) of the edge type field emission devices or one or a plurality of the flat type field emission device(s) which have been already explained. A cathode panel will be explained with reference to an embodiment in which each electron emitting portion 10 is constituted of a plurality of the Spindt type field emission devices hereinafter, while the explanation-can substantially apply to embodiments in which each electron emitting portion 10 is constituted of field emission devices of any other type.

Figure 24:
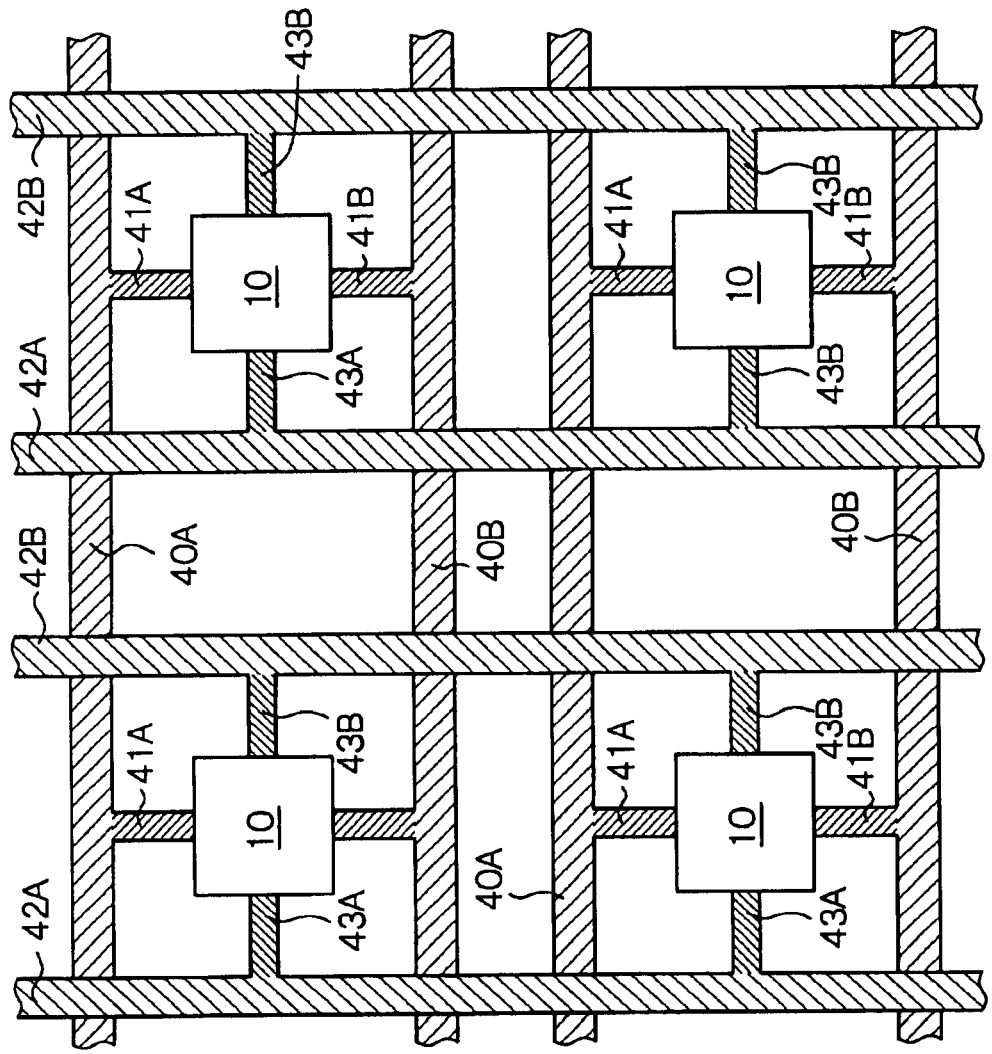
FIG. 24 shows a schematic plan layout of main wirings, branch wirings and cold cathode electron emitting portions in a cathode panel of Example 7.
Figure 25:
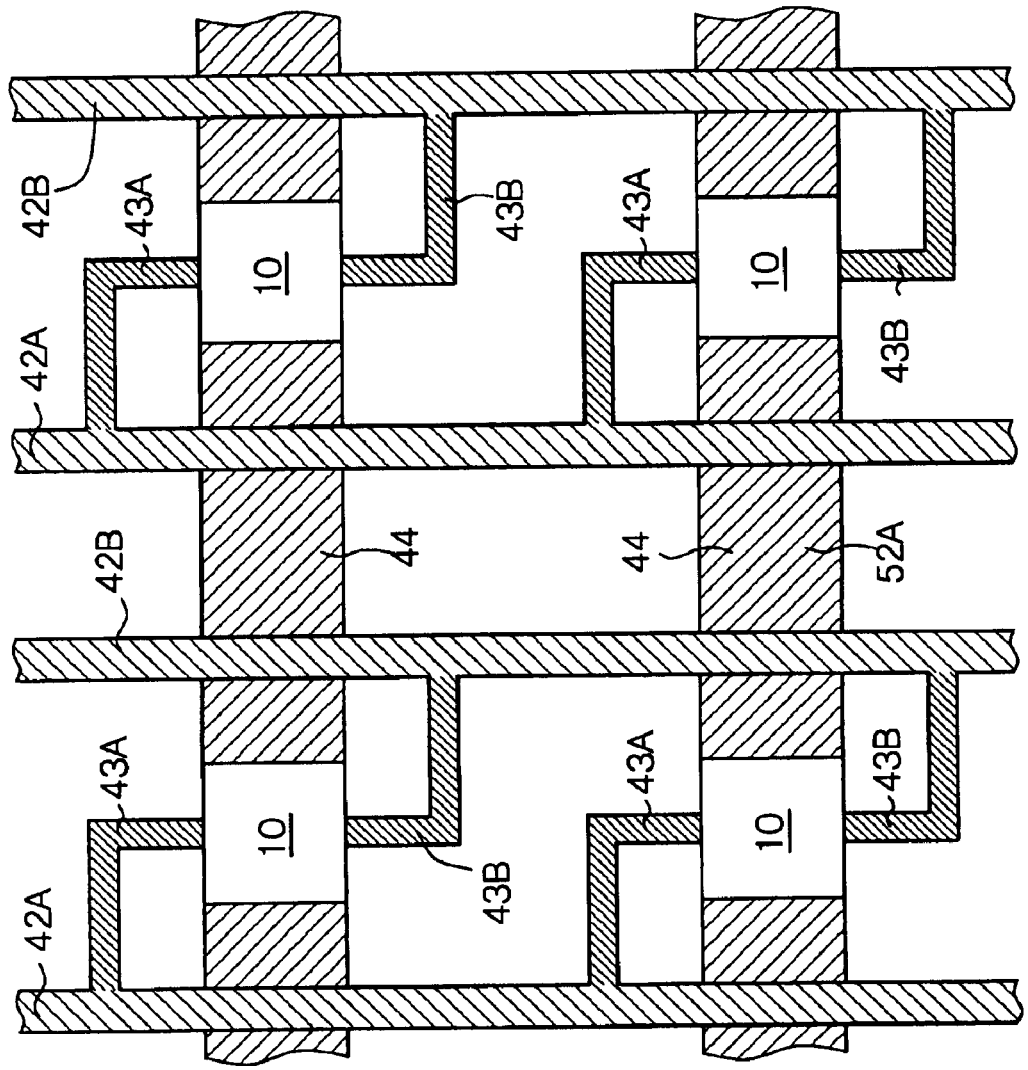
FIG. 25 shows a schematic plan layout of main wirings, branch wirings and cold cathode electron emitting portions in a variant of the cathode panel of Example 7.
Figure 26:
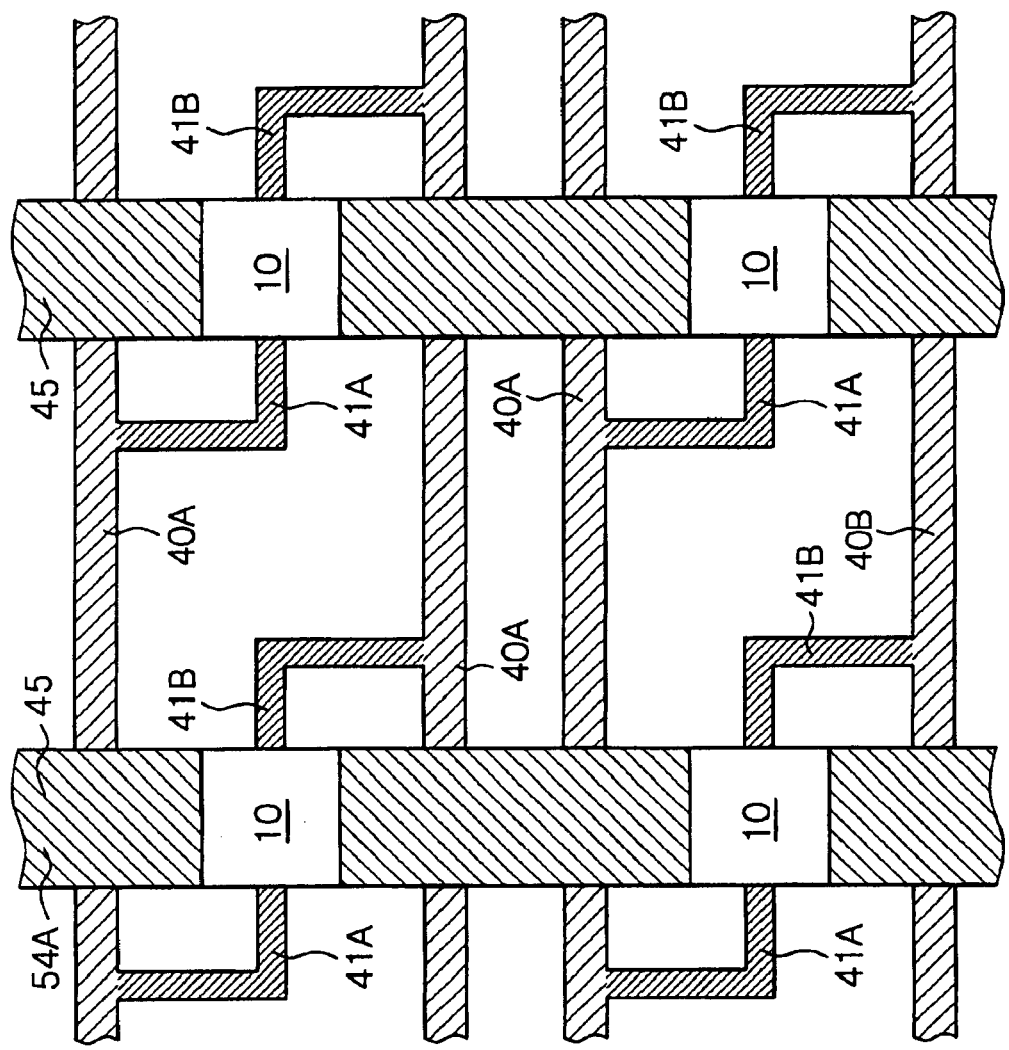
FIG. 26 shows a schematic plan layout of main wirings, branch wirings and cold cathode electron emitting portions in a variant of the cathode panel of Example 7.

As FIG. 24 shows a schematic plan layout of main wirings, branch wirings and electron emitting portions, the cathode panel of Example 7 has a plurality of main wirings 40A, 40B, 42A and 42B, a plurality of first branch wirings 41A and 43A extending from the first main wirings 40A and 42A, respectively, a plurality of second branch wirings 41B and 43B extending from the second main wirings 40B and 42B, respectively, and electron emitting portions 10 connected to the first and second branch wirings 41A, 43A, 41B and 43B. The main wiring is constituted of the first main wirings 40A and 42A, and the main wiring is constituted of the second main wirings 40B and 42B. Specifically, a plurality of the first branch wirings 41A extend from each first main wiring 40A, a plurality of the second branch wirings 41B extend from each second main wiring 40B, a plurality of the first branch wirings 43A extend from each first main wiring 42A, and a plurality of the second branch wirings 43B extend from each second main wiring 42B. Further, the main wirings 40A and 40B extend in a first direction, and the main wirings 42A and 42B extend in a second direction different from the first direction (for example, direction at right angles with the first direction). For example, in an embodiment of a cathode panel having the electron emitting portions 10 where the Spindt type field emission devices are formed, the cathode electrodes constituting the electron emitting portion 10 are connected to the branch wirings 41A and 41B, and the gate electrodes constituting the electron emitting portion 10 are connected to the branch wirings 43A and 43B. In FIG. 24 and FIGS. 25 and 26 to be referred to later, showing of a support and an insulating layer and detailed showing of field emission devices are omitted.

In an electron emitting portion 10 defective in operation, a branch wiring is cut off so that such an electron emitting portion 10 does not work. Table 4 shows combinations of states of the first branch wirings 41A and 43A and the second branch wirings 41B and 43B which are cut off so that the electron emitting portions defective in operation do not work. In Table 4, "on" means a state where a branch wiring is not cut off, and "off" means a state where a branch wiring is cut off.

TABLE 4

| First branch wiring 41A | Second branch wiring 41B | First branch wiring 43A | Second branch wiring 43B |
|---|---|---|---|
| off | off | on | on |
| off | off | off | on |
| off | off | on | off |
| off | off | off | off |
| on | on | off | off |
| off | on | off | off |
| on | off | off | off |

The main wirings 40A and 40B and the branch wirings 41A and 41B can be formed concurrently with the formation of the cathode electrodes 52 in the previously described [Step-100] in which a conductive material layer composed, for example, of polysilicon for a cathode electrode is formed on a support 51 made, for example, of a glass substrate by a plasma-enhanced CVD method and the conductive material layer is patterned by a lithographic method and a dry etching method. The patterned conductive material layer for a cathode electrode has the form, for example, of a rectangle.

The main wirings 42A and 42B and the branch wirings 43A and 43B can be formed concurrently with the formation of the gate electrodes 54 in the previously described [Step-100] in which a conductive material layer for a gate electrode is patterned by a lithographic method and a dry etching method. The patterned conductive material layer for a gate electrode has a rectangular form nearly similar to the form of the conductive material layer for a cathode electrode.

In an obtained cathode panel 50, a working test is carried out with regard to the electron emitting portions 10. The working test includes a wiring short-circuit test in which the electron emitting portions 10 are measured for a resistance value or an anomalous heat generation to check whether or not they are short-circuited, and a display characteristic test in which electrons are actually emitted from the cathode panel 50. In the display characteristic test, the working test of the electron emitting portions 10 is carried out by applying a voltage to the main wirings 40A and main wirings 42A, and then the working test of the electron emitting portion 10 is carried out by applying a voltage to the main wirings 40A and the main wirings 42B. Then, the working test of the electron emitting portions 10 is carried out by applying a voltage to the main wirings 40B and main wirings 42A, and then the working test of the electron emitting portion 10 is carried out by applying a voltage to the main wirings 40B and the main wirings 42B. In this manner, not only it can be detected whether or not the electron emitting portions 10 are defective in operation, but also it can be detected whether or not the main wirings 40A, 40B, 42A and 42B are defective, so that defects of the main wirings and branch wirings can be imparted with redundancy.

In an electron emitting portion 10 defective in operation, the first branch wiring and/or the second branch wiring are cut off as shown in Table 4 so that the electron emitting portion 10 defective in operation does not work.

The cathode panel 50 for which the above procedures are completed and an anode panel 60 are assembled, whereby a display shown in FIG. 27 can be constituted.

FIGS. 25 and 26 show schematic plan layouts of variants of the main wirings, the branch wirings and the electron emitting portions.

In a constitution shown in FIG. 25, a conductive material layer 52A for a cathode electrode is patterned in the form of a stripe unlike the form shown in FIG. 24, and part of the stripe-shaped conductive material layer 52A for a cathode electrode (region overlapping a patterned conductive material layer for a gate electrode) constitutes the cathode electrodes 52 of each electron emitting portion 10. In other words, the cathode electrodes of the electron emitting portions 10 adjacent to each other in a first direction are connected through cathode electrode extending portions 44, and a plurality of the electron emitting portions 10 are one-dimensionally arranged in the first direction. In the cathode panel shown in FIG. 25, main wirings 40A and 40B and branch wirings 41A and 41B are omitted unlike the cathode panel shown in FIG. 24, and the stripe-shaped conductive material layer 52A for a cathode electrode, extending in the first direction, works as these wirings. The main wirings 42A and 42B extend in a second direction different from the first direction (for example, direction at right angles with the first direction). The gate electrodes constituting the electron emitting portion 10 are connected to the branch wirings 43A and 43B.

In an electron emitting portion 10 defective in operation, for example, the first branch wiring 43A and the second branch wiring 43B are cut off so that the above electron emitting portion does not work.

In a constitution shown in FIG. 26, a conductive material layer 54A for a gate electrode is patterned in the form of a stripe unlike the form shown in FIG. 24, and part of the stripe-shaped conductive material layer 54A for a gate electrode (region overlapping a patterned conductive material layer for a cathode electrode) constitutes the gate electrodes 54 of each electron emitting portion 10. In other words, the gate electrodes of the electron emitting portions 10 adjacent to each other in a second direction are connected through gate electrode extending portions 45, and a plurality of the electron emitting portions 10 are one-dimensionally arranged in the second direction. In the cathode panel shown in FIG. 26, main wirings 42A and 42B and branch wirings 43A and 43B are omitted unlike the cathode panel shown in FIG. 24, and the stripe-shaped conductive material layer 54A for a gate electrode, extending in the second direction, works as these wirings. The main wirings 40A and 40B extend in a first direction different from the second direction (for example, direction at right angles with the second direction). The cathode electrodes constituting the electron emitting portion 10 are connected to the branch wirings 41A and 41B.

In an electron emitting portion 10 defective in operation, for example, the first branch wiring 41A and the second branch wiring 41B are cut off so that the above electron emitting portion does not work.

In Example 7, each pixel is constituted of one electron emitting portion 10, while each pixel may be constituted of an electron emitting region constituted of a first electron emitting portion and a second electron emitting portion. In this case, each of the first electron emitting portion and the second electron emitting portion can be constituted so as to have the constitution of one electron emitting portion 10.

EXAMPLE 8

Example 8 is concerned with the cathode panel and the display according to the eighth aspect of the present invention.

Figure 40:
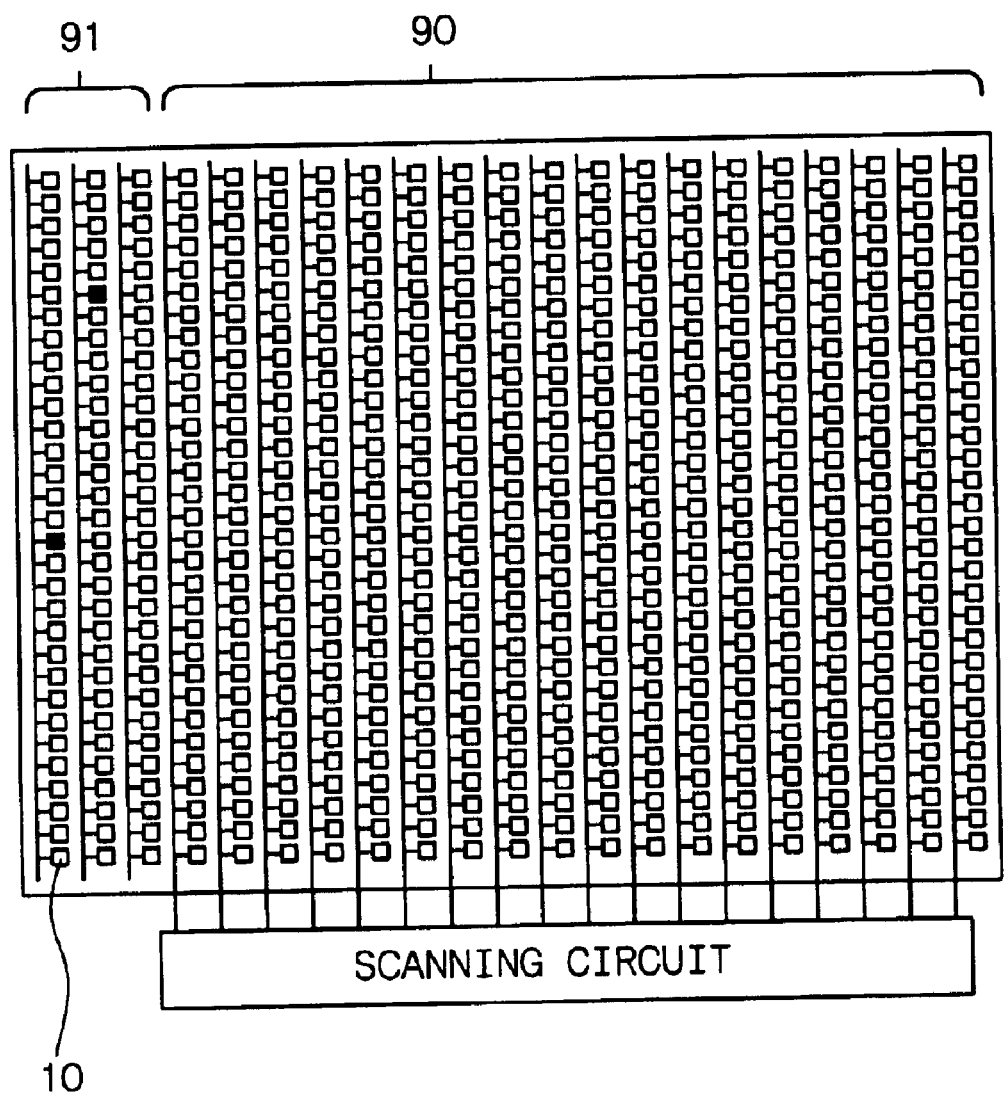
FIG. 40 schematically shows a cathode panel of Example 8.

As is shown in the schematic view of FIG. 40, the cathode panel of Example 8 has (i) an effective region 90 constituted of a plurality of electron emitting portions 10 formed in a two-dimensional matrix form, and (ii) an ineffective region 91 constituted of a plurality of electron emitting portions 10 arranged in a circumferential portion of the effective region and formed in a two-dimensional matrix form. And, the electron emitting portions 10 constituting the effective region 90 are connected to a power source for actuating the electron emitting portions 10, and the electron emitting portions 10 constituting the ineffective region 91 are not connected to the power source for actuating the electron emitting portions 10. As shown in FIG. 27, a control circuit and a scanning circuit correspond to the power source for actuating the electron emitting portions 10. For not connecting the electron emitting portions 10 constituting the ineffective region 91 to the power source provided for actuating the electron emitting portions 10, there can be employed a constitution in which the gate electrodes constituting the electron emitting portions 10 are not connected to the control circuit, a constitution in which the cathode electrodes constituting the electron emitting portions 10 are not connected to the scanning circuit as shown in FIG. 40, or a constitution in which the connections to these two circuits are not effected.

A position of the ineffective region 91 in the circumferential portion of the effective region 90 is dependent upon an area where malfunctioning electron emitting portions take place. When the cathode electrodes constituting electron emitting portions 10 of the ineffective region are not connected to the scanning circuit, the ineffective region 91 may be positioned on the left side of the effective region 90 as shown in FIG. 40, it may be positioned on the right side, or the ineffective regions 91 may be positioned on both the right and left sides. When the gate electrodes constituting the electron emitting portions 10 of the ineffective region are not connected to the control circuit, the ineffective region 91 may be positioned on the upper side of the effective region 90, it may be positioned on the lower side, or the ineffective regions 91 may be positioned on the upper and lower sides. When the cathode electrodes constituting the electron emitting portions 10 of the ineffective region are not connected to the scanning circuit, and when the gate electrodes constituting the electron emitting portions 10 of the ineffective region are not connected to the control circuit, the ineffective region 91 is positioned somewhere on the four sides of the effective region 90.

Each electron emitting portion 10 can be constituted of a plurality (for example, tens to one thousand) of the Spindt type field emission devices, a plurality (approximately tens to hundreds) of the edge type field emission devices or one or a plurality of the flat type field emission device(s) which have been already explained.

The schematic plan layout of the main wirings, the branch wirings and the electron emitting portions in the cathode panel can be as explained in any one of Examples 1 to 7. For simplifying the constitution, however, it is preferred to employ a constitution shown in FIG. 63. That is, the cathode panel is constituted of the stripe-shaped conductive material layers for a cathode electrode, extending in a first direction, and the stripe-shaped conductive material layers for a gate electrode, extending in a second direction (for example, direction at right angles with the first direction), and the electron emitting portions 10 are constituted of regions where the stripe-shaped conductive material layers for a cathode electrode and the stripe-shaped conductive material layers for a gate electrode overlap.

In a produced cathode panel 50, a working test is carried out with regard to the electron emitting portions 10. The working test includes a wiring short-circuit test in which the first electron emitting portions 10 are measured for a resistance value or an anomalous heat generation to check whether or not they are short-circuited, and a display characteristic test in which electrons are actually emitted from the cathode panel 50.

And, a region having no malfunctioning electron emitting portions is selected from a region constituted of a plurality of the electron emitting portions 10 formed in a two-dimensional matrix form and used as the effective region 90. When a malfunctioning electron emitting portion is present, for example, in a central area of the region constituted of a plurality of the electron emitting portions 10 formed in a two-dimensional matrix, it is inevitable to abandon such a cathode panel. In FIG. 40, malfunctioning electron emitting portions 10 are shown in black.

EXAMPLE 9

Example 9 is concerned with the cathode panel and the display according to the ninth aspect of the present invention, and the cathode panel production method according to the eighth aspect of the present invention.

Figure 41:
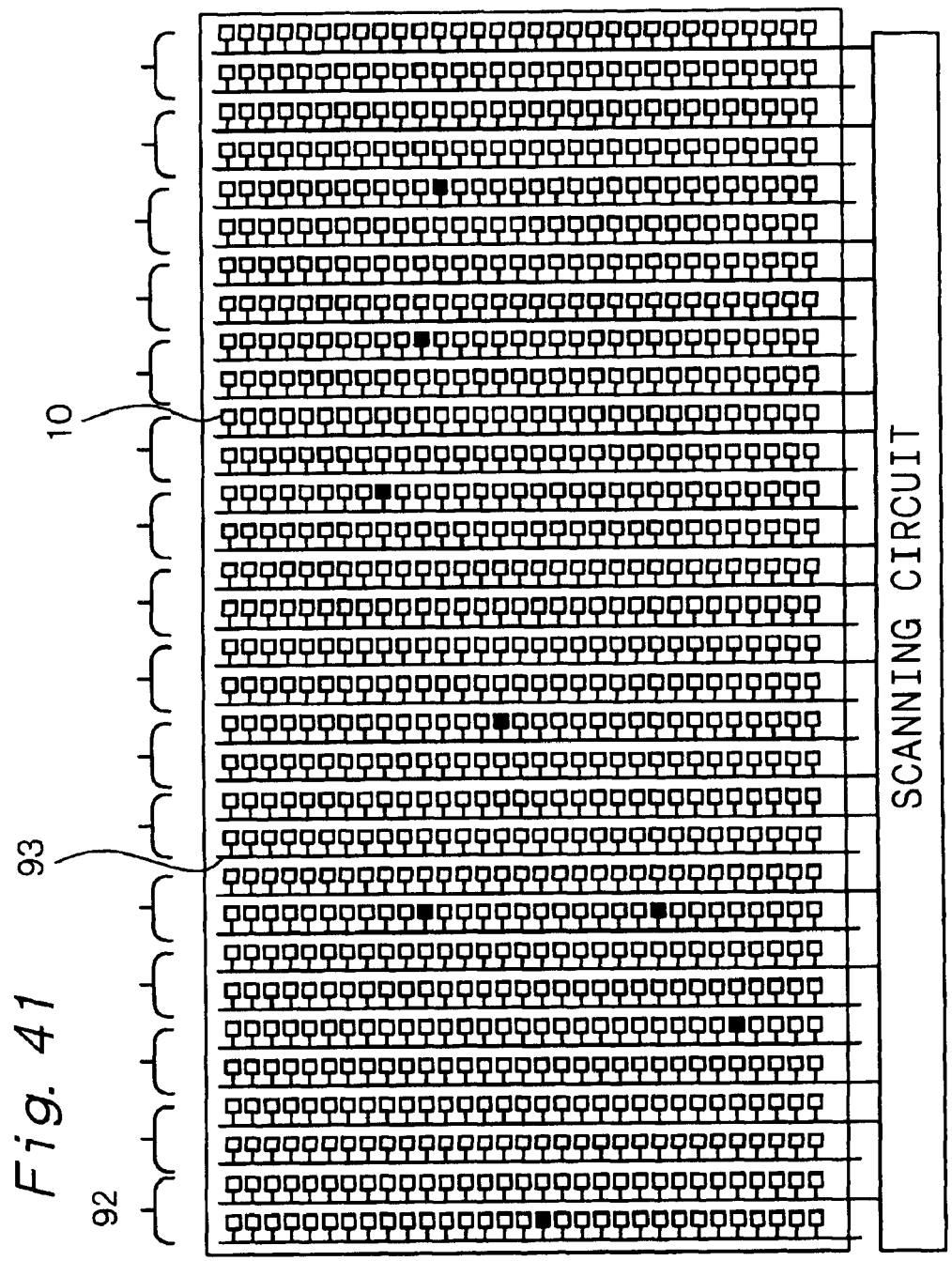
FIG. 41 schematically shows a cathode panel of Example 9.

As is schematically shown in FIG. 41, the cathode panel of Example 9 has a plurality of cold cathode field emitting portion groups 92 arranged side by side. For example, in a display of 1024×768 pixels, the number (M) of the cold cathode field emitting portion groups 92 can be at least 1024 or 768. Each of the cold cathode field emitting portion groups 92 is constituted of N (N is a natural number of 2 or more, and N=2 in the embodiment of FIG. 41) columns 93 of the cold cathode field emitting portions. Each column having a plurality of the cold cathode field emitting portions is arranged one-dimensionally and is formed side by side with another. In FIG. 41, these cold cathode field emitting portion groups extend in a first direction. The total number of the cold cathode field emitting portion columns 93 is M×N columns.

Each electron emitting portion 10 can be constituted of a plurality (for example, tens to one thousand) of the Spindt type field emission devices, a plurality (approximately tens to hundreds) of the edge type field emission devices or one or a plurality of the flat type field emission device(s) which have been already explained.

The schematic plan layout of the main wirings, the branch wirings and the electron emitting portions in the cathode panel can be as explained in any one of Examples 1 to 7. For simplifying the constitution, however, it is preferred to employ a constitution shown in FIG. 63. That is, the cathode panel is constituted of the stripe-shaped conductive material layers for a cathode electrode, extending in a first direction, and the stripe-shaped conductive material layers for a gate electrode, extending in a second direction (for example, direction at right angles with the first direction), and the electron emitting portions 10 are constituted of regions where the stripe-shaped conductive material layers for a cathode electrode and the stripe-shaped conductive material layers for a gate electrode overlap. In the cold cathode field emitting portion columns, for example, the stripe-shaped conductive material layer for a cathode electrode, extending in the first direction, is common, that is, one column of the cold cathode field emitting portions is constituted of one stripe-shaped conductive material layer for a cathode electrode.

In a produced cathode panel 50, a working test is carried out with regard to the electron emitting portions 10. The working test includes a wiring short-circuit test in which the first electron emitting portions 10 are measured for a resistance value or an anomalous heat generation to check whether or not they are short-circuited, and a display characteristic test in which electrons are actually emitted from the cathode panel 50.

On the basis of test results, a constant number (one in the embodiment shown in FIG. 41) of the cold cathode field emitting portion column(s) 93 is selected from each of the cold cathode field emitting portion groups 92. The constant number is (N−1) or less. Selected cold cathode field emitting portion columns have no malfunctioning electron emitting portion 10. Non-selected cold cathode field emitting portion column(s) has malfunctioning electron emitting portion(s) 10 in some cases or does not have any malfunctioning electron emitting portion 10 in some cases.

The selected cold cathode field emitting portion columns are connected to a power source (for example, the scanning circuit) provided for actuating the electron emitting portions 10. The non-selected cold cathode field emitting portion columns are not connected to the power source (for example, the scanning circuit) provided for actuating the electron emitting portions 10. For not connecting the non-selected cold cathode field emitting portion columns to the power source provided for actuating the electron emitting portions 10, there may be employed a constitution in which the gate electrodes constituting the electron emitting portions 10 are not connected to the control circuit (in this case, the stripe-shaped conductive material layer for a gate electrode is required to be constitutionally common, that is, one column of the cold cathode field emitting portions is constituted of one stripe-shaped conductive material layer for a gate electrode,.and the cold cathode field emitting portion columns constituting the cold cathode field emitting portion groups extend in a second direction at right angles with the direction in which the cold cathode field emitting portion columns shown in FIG. 41 extend), or a constitution in which the cathode electrodes constituting the electron emitting portions 10 are not connected to the scanning circuit as shown in FIG. 41, or a constitution in which the connections to these two circuits are not effected. In the constitution of the connection to none of the two circuits, it is required to combine the cold cathode field emitting portion groups constituted of the cold cathode field emitting portion columns extending in the first direction and the cold cathode field emitting portion groups constituted of the cold cathode field emitting portion columns extending in the second direction.

The number N shall not be limited to 2, and it may be, for example, 3. In this case, the above constant number can be 1 or 2. When cold cathode field emitting portion columns 93 are selected, and when N=2, cold cathode field emitting portion columns 93 positioned in odd-number places may be selected in some cases, or cold cathode field emitting portion columns 93 positioned in even-number places may be selected in some cases. The cathode panel of Example 9 can be also applied to the cathode panel of Example 8.

The present invention has been explained with reference to Examples hereinabove, while the present invention shall not be limited thereto. Those numerals and various materials explained in Examples are shown as examples and can be changed as required. Further, the methods of producing the field emission devices, described in Examples, are shown as examples, and can be changed as required.

Figure 42:
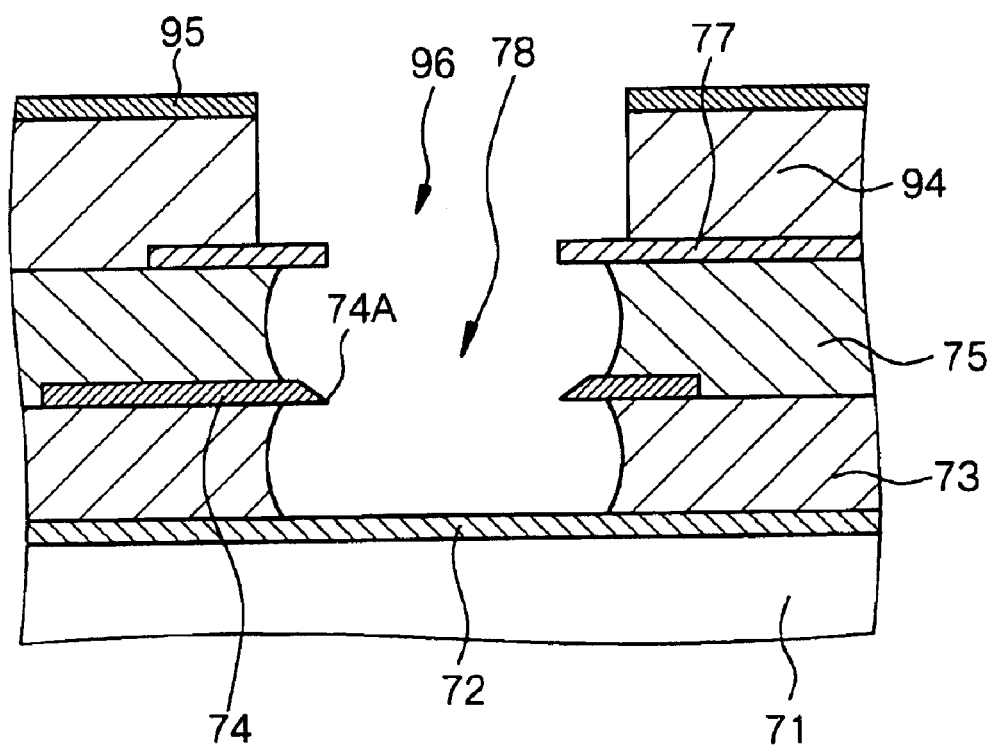
FIG. 42 is a schematic partial end view of a field emission device in which a focus electrode is incorporated into an edge type field emission device of second structure.

For example, FIG. 42 shows a schematic partial end view of an example in which a focus electrode is incorporated into the edge type field emission device of second structure. In the above field emission device, an insulating interlayer 94 is formed on the entire surface including the upper surface of the second gate electrode 77, and a focus electrode 95 is formed on the insulating interlayer 94. A second opening portion 96 communicating with the opening portion 78 is formed in the insulating interlayer 94. It is not necessarily required to form the focus electrode 95 for every field emission device. For example, the focus electrodes 95 are provided along a predetermined arrangement direction of the field emission devices, whereby a focusing effect can be produced commonly on a plurality of the field emission devices. The second opening portion 96 formed in the insulating interlayer 94 is not necessarily required in a material layer constituting the focus electrode 95. Further, the focus electrode 95 has a potential similar to, or equal to, the potential of an electron emitting layer 74. When the opening edge portion of the focus electrode 95 is projected toward an inside of the second opening portion 96, therefore, the focus electrode 95 may emit electrons toward the first gate electrode 72 or the second gate electrode 77. It is therefore preferred to form the focus electrode 95 so as not to be projected into the second opening portion 96. It is preferred to project an opening edge portion of the second gate electrode 77 ahead from the insulating interlayer 94, since the electric field in the vicinity of the edge portion 74A of the electron emitting layer 74 can be intensified. The second opening portion 96 viewed as a plan view may be congruent with, or similar to, or different from, the opening portion 78 viewed as a plan view, depending upon the constitution of the focus electrode 95.

Variants of the structure and the production method of the Spindt type field emission device will be explained hereinafter.

(Variant-1 of Spindt Type Field Emission Device and a Method of the Production thereof)

FIG. 44 shows a schematic partial end view of a variant of the spindt type field emission device. The variant is constitutionally the same as the already explained Spindt type field emission device except that an adhesive layer 200 is provided.

The production method of the Spindt type field emission device shown in FIG. 44 (to be referred to as "second production method of the Spindt type field emission device" hereinafter) will be explained with reference to FIGS. 45A to FIG. 47B showing schematic partial end views of a support and the like. Basically, the above Spindt type field emission device can be produced by the following steps. That is, the second production method of the Spindt type field emission device comprises the steps of;

(a) forming a cathode electrode 52 on a support 51, (b) a forming an insulating layer 53 on the support 51 and the cathode electrode 52, (c) forming a gate electrode 54 on the insulating layer 53, (d) forming an opening portion 55 which penetrates through at least the insulating layer 53 and has a bottom portion where the cathode electrode 52 is exposed, (e) forming a conductive material layer 201 for an electron emitting electrode on the entire surface including an inside of the opening portion 55, (f) forming a mask material layer 202 on the conductive material layer 201 so as to cover a region of the conductive material layer 201 which region is positioned in the central portion of the opening portion 55, and (g) etching the conductive material layer 201 and the mask material layer 202 under an anisotropic etching condition where an etchrate of the conductive material layer 201 in the direction perpendicular to the support 51 is higher than an etchrate of the mask material layer 202 in the direction perpendicular to the support 51, thereby to form an electron emitting electrode 56 which comprises the conductive material layer 201 and has a tip portion having a conical form, in the opening portion 55.

[Step-400]

First, a cathode electrode 52, a main wiring 20 and a branch wiring 21 composed of aluminum are formed on the support 51 obtained by forming an approximately 0.6 $\mu$m thick $SiO_2$ layer on a glass substrate. Specifically, a conductive material layer made of an aluminum layer for a cathode electrode is deposited on the support 51, for example, by a sputtering method, and the conductive material layer for a cathode electrode is patterned, whereby a plurality of the cathode electrodes 52, the branch wirings 21 extending from the cathode electrodes 52 and the main wirings 20 which are connected to the branch wirings 21 and extend in a first direction can be formed. Then an approximately 1 µm thick insulating layer 53 composed of SiO$_2$ is formed on the entire surface by a plasma-enhanced CVD method using TEOS (tetraethoxysilane) as a source gas. Then, a conductive material layer composed of aluminum for a gate electrode is formed on the entire surface of the insulating layer 53 by a sputtering method, and the conductive material layer for a gate electrode is patterned. In this manner, there can be obtained a plurality of the gate electrodes 54, the branch wirings 23 extending from the gate electrodes 54 and the main wiring 22 which are connected to the branch wirings 23 and extend in parallel with a second direction.

[Step-410]

Then, an opening portion 55 is formed in a region where the cathode electrode 52 and the gate electrode 54 overlap, i.e., in one pixel region. The opening portion 55 penetrates through the gate electrode 54 and the insulating layer 53. The opening portion 55 viewed as a plan view has the form, for example, of a circle having a diameter of 0.3 µm. Generally, hundreds to one thousand opening portions 55 are formed in one pixel region (every pixel region). When the opening portions 55 are formed, first, opening portions are formed in the conductive material layer for a gate electrode by an RIE method using, as a mask, a resist layer formed by a photolithographic method, and then, opening portions are formed in the insulating layer 53 by an RIE method. After the RIE, the resist layer is removed by ashing, whereby a structure shown in FIG. 45A can be obtained.

[Step-420]

Then, an adhesive layer 200 is formed on the entire surface by a sputtering method. The adhesive layer 200 is intended for improving an adhesiveness of a portion of the insulating layer 53, where the conductive material layer for a gate electrode is not formed, and a side wall of the opening portion 55, where the insulating layer 53 is exposed, to a conductive material layer 201 to be formed on the entire surface in a subsequent step. As the adhesive layer 200, a 0.07 µm thick layer composed of tungsten is formed by a DC sputtering method on the basis of a precondition that the conductive material layer 201 is to be formed of tungsten.

[Step-430]

Figure 46A:
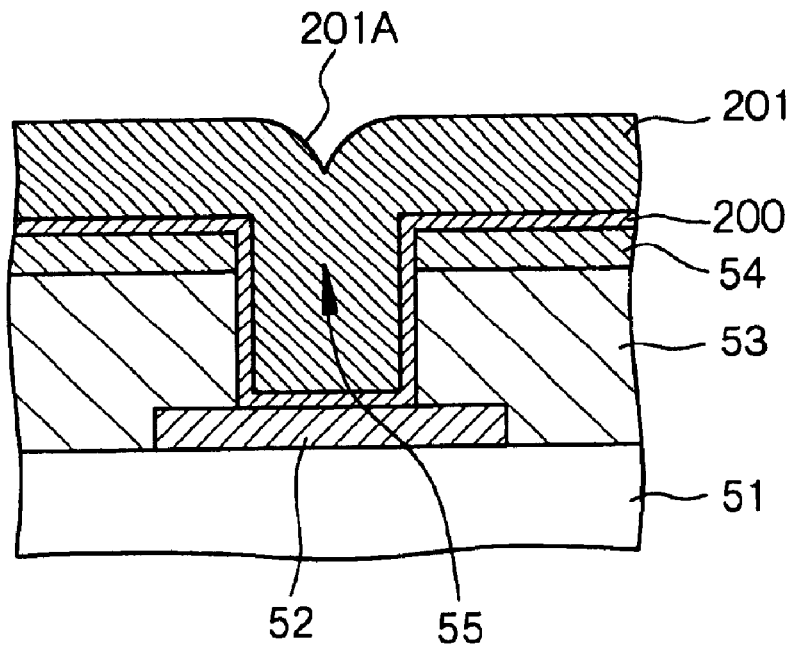
FIGS. 46A and 46B, following

Then, an approximately 0.6 µm thick conductive material layer 201 composed of tungsten for an electron emitting electrode is formed on the entire surface including an inside of the opening portion 55 by a hydrogen reduction low pressure CVD method (see FIG. 46A). A recess 201A is formed in a surface of the formed conductive material layer 201 due to a step between the upper end portion and the bottom portion of the opening portion 55.

[Step-440]

Figure 46B:
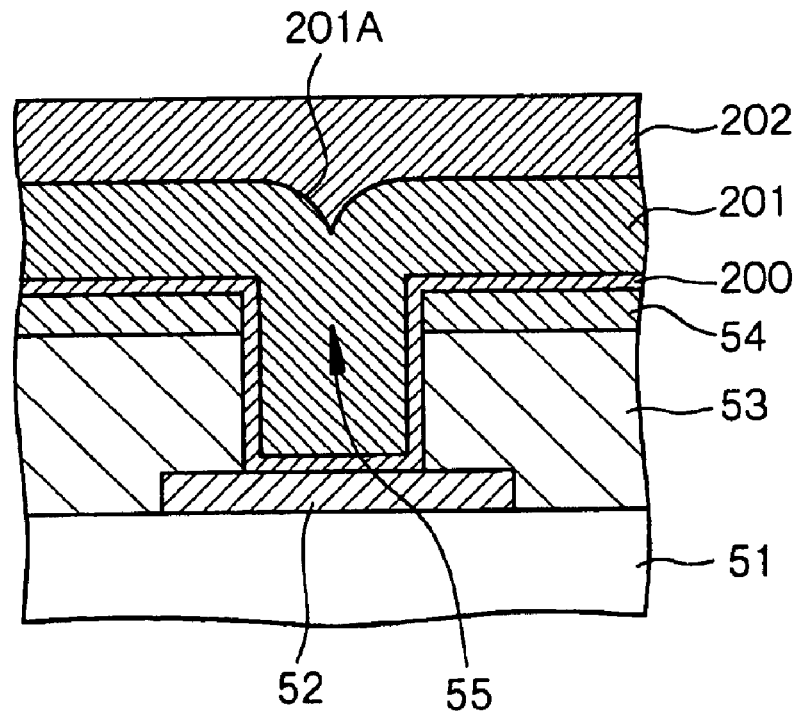

A mask material layer 202 is formed so as to cover a region of the conductive material layer 201 (specifically, the recess 201A) which region is positioned in the central portion of the opening portion specifically, first, a 0.35 µm thick resist layer as the mask material layer 202 is formed on the conductive material layer 201 by a spin coating method (see FIG. 46B). The mask material layer 202 absorbs the recess 201A of the conductive material layer 201 and forms a nearly flat surface. Then, the mask material layer 202 is etched by an RIE method using an oxygen gas. The etching is terminated when a flat plane of the conductive material layer 201 is exposed. In this manner, the mask material layer 202 is left so as to be filled in the recess 201A of the conductive material layer 201 while forming a flat surface (see FIG. 47A).

[Step-450]

Figure 47A:
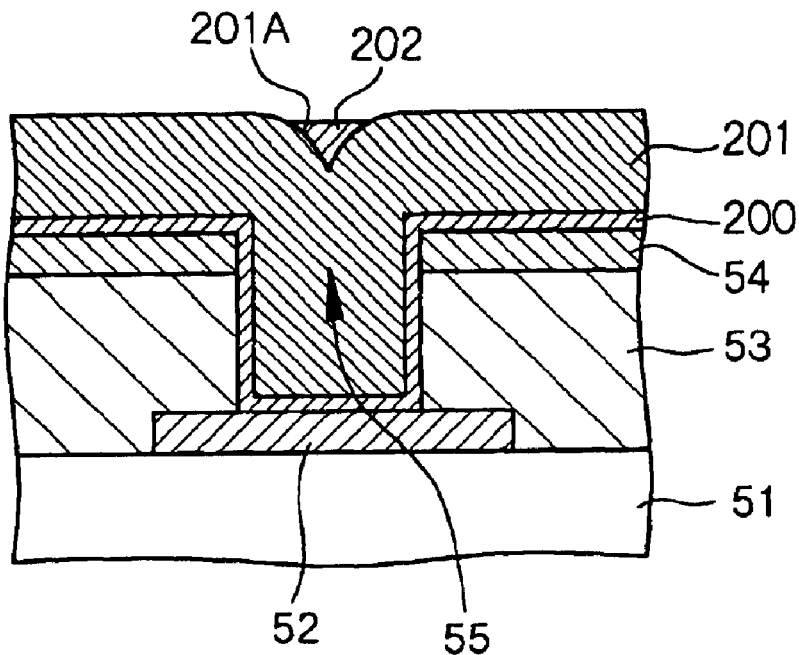
FIGS. 47A and 47B, following
Figure 47B:
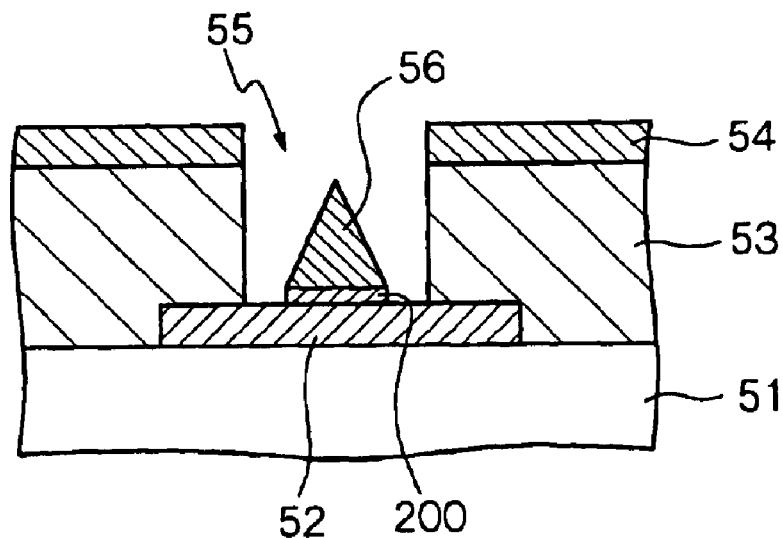

Then, the conductive material layer 201, the mask material layer 202 and the adhesive layer 200 are etched to form an electron emitting electrode 56 having the form of a circular cone (see FIG. 47B). These layers are etched under an anisotropic etching condition where the etchrate of the conductive material layer 201 is higher than the etchrate of the mask material layer 202. Table 5 shows the etching condition.

TABLE 5

| [Etching condition of conductive material layer 201, etc.] | |
|---|---|
| SF$_6$ flow rate | 150 sccm |
| O$_2$ flow rate | 30 sccm |
| Ar flow rate | 90 sccm |
| Pressure | 35 Pa |
| RF power | 0.7 kW (13.56 MHz) |

[Step-460]

Then, inside the opening portion 55, the side wall of the opening portion formed in the insulating layer 53 is allowed to stand back under an isotropic etching condition, whereby the field emission device shown in FIG. 44 can be obtained. The isotropic etching can be carried out by a dry etching method using a radical as main etching species such as chemical dry etching or a wet etching method using an etching solution. As an etching solution, for example, a mixture of a 49% hydrofluoric acid aqueous solution with pure water (a hydrofluoric acid aqueous solution/pure water volume ratio: 1/100) can be used.

Figure 48A:
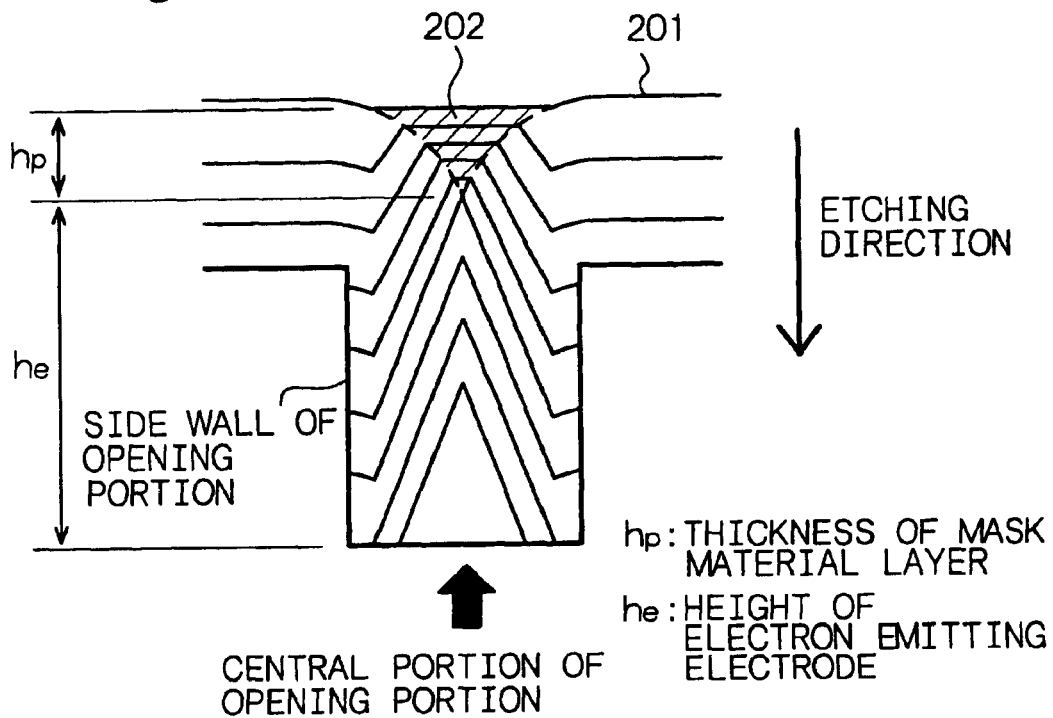
FIGS. 48A and 48B are drawings for explaining a mechanism of formation of an electron emitting electrode having the form of a circular cone.
Figure 48B:
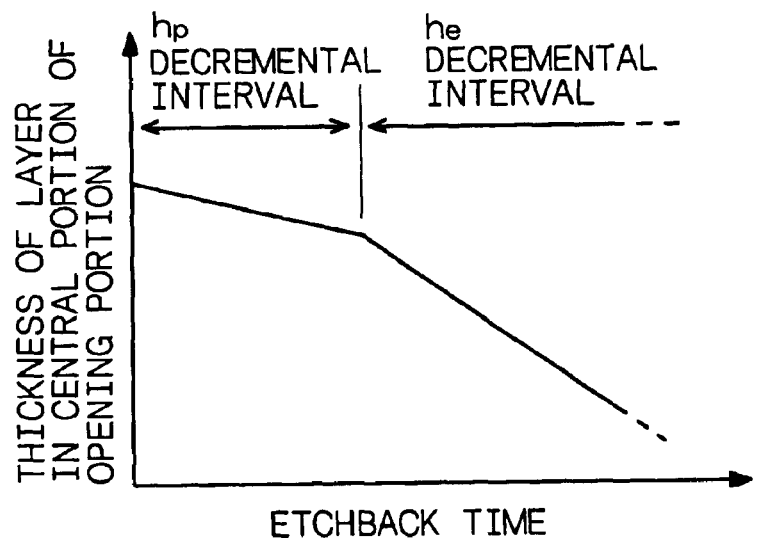

The mechanism of formation of the electron emitting electrode 56 in [Step-450] will be explained with reference to FIGS. 48A and 48B. FIG. 48A is a schematic view showing how the surface profile of a material being etched changes at constant time intervals as the etching proceeds, and FIG. 48B is a graph showing a relationship between an etching time and a thickness of the material being etched in the center of the opening portion. The mask material layer has a thickness h$_p$ in the center of the opening portion, and the electron emitting electrode 56 has a height h$_e$ in the center of the opening portion.

Under the etching condition shown in Table 5, the etchrate of the conductive material layer 201 is naturally higher than the etchrate of the mask material layer 202 composed of a resist material. In a region where no mask material layer 202 is present, the conductive material layer 201 immediately begins to be etched, and the surface of the material being etched readily goes down. In contrast, in a region where the mask material layer 202 is present, the conductive material layer 201 begins to be etched only after the mask material layer 202 is removed first. While the mask material layer 202 is etched, therefore, the decremental rate of thickness of the material being etched is low (h$_p$ decremental interval), and the decremental rate of thickness of the material being etched comes to be as high as the decremental rate of thickness of the material being etched in the region where no mask material layer 202 is present only when the mask material layer 202 disappears (h$_e$ decremental interval). The time at which the h$_p$ decremental interval begins comes the last in the center of the opening portion 55 where the mask material layer 202 has a largest thickness, and comes earlier in a region nearer to the circumference of the opening portion 55. In this manner, the electron emitting electrode 56 having the form of a circular cone can be formed.

The ratio of the etchrate of the conductive material layer 201 to the etchrate of the mask material layer 202 composed of a resist material will be referred to as "selection ratio to resist" as a matter of convenience. It will be explained with reference to FIGS. 49A to 49C that the above selection ratio to resist is an important factor that determines the height and form of the electron emitting electrode 56. FIG. 49A shows a form of the electron emitting electrode 56 when the selection ratio is relatively small, FIG. 49C shows a form of the electron emitting electrode 56 when the selection ratio to resist is large, and FIG. 49B shows a form of the electron emitting electrode 56 when the selection ratio to resist is intermediate. It is seen that, when the selection ratio to resist increases, the layer decrement of the conductive material layer 201 comes to be larger than the layer decrement of the mask material layer 202, so that the electron emitting electrode 56 comes to higher and sharper. The selection ratio to resist decreases as the ratio of the $O_2$ flow rate to the $SF_6$ flow rate increases. When there is used an etching system capable of changing the incidence energy of an ion by using a substrate bias in combination, the selection ratio to resist can be decreased by increasing an RF bias power or decreasing the frequency of an AC power source used for bias application. The selection ratio to resist is set at a value of at least 1.5, preferably at 2 or more, more preferably 3 or more.

In the above etching, it is naturally required to high selection ratios to the gate electrode 54 and the cathode electrode 52, and the etching can be carried out without any problem under the condition shown in Table 5. That is because aluminum constituting the gate electrodes 54 and the cathode electrodes 52 is hardly etched with fluorine-containing etching species.

(Variant-2 of Method of Production of Spindt Type Field Emission Device)

A variant of the second method of producing the Spindt type field emission device (to be referred to as "third production method of the Spindt type field emission device" hereinafter) will be explained with reference to FIGS. 50A to 52B which show schematic partial end views of a support and the like, hereinafter. In the third method of producing the Spindt type field emission device, the region of the conductive material layer region which region is covered with the mask material layer can be narrowed as compared with the second method of producing the Spindt type field emission device. That is, the third method of producing the Spindt type field emission device includes the step (e) in which a nearly funnel-like recess consisting of a columnar portion and a widened portion communicating with the upper end of the columnar portion is generated in the surface of the conductive material layer due to a step between the upper end portion and the bottom portion of the opening portion, and the step (f) in which the mask material layer is formed on the entire surface of the conductive material layer, and then the mask material layer and the conductive material layer are removed in a plane in parallel with the surface of the support, thereby to leave the mask material layer in the columnar portion.

[Step-500]

First, [step-400] is similarly carried out to form the cathode electrodes 52, the main wirings 20, the branch wirings 21, the gate electrodes 54, the main wirings 22 and the branch wirings 23.

[Step-510]

Further, a 0.2 $\mu$m thick etching-stop layer 203 composed, for example, of $SiO_2$ is formed on the entire surface. The etching-stop layer 203 is not an essential member for the function of the field emission devices, but it serves to protect the gate electrodes 54 when the conductive material layer 201 is etched in a step to be carried out later. When the gate electrodes 54 have sufficiently high durability against the etching condition of etching the conductive material layer 201, the etching-stop layer 203 may be omitted. Then, there is formed, by an RIE method, an opening portion 55 which penetrates through the etching-stop layer 203, the gate electrode 54 and the insulating layer 53 and which has a bottom portion where the cathode electrode 52 is exposed (see FIG. 50A).

[Step-520]

Figure 50A:
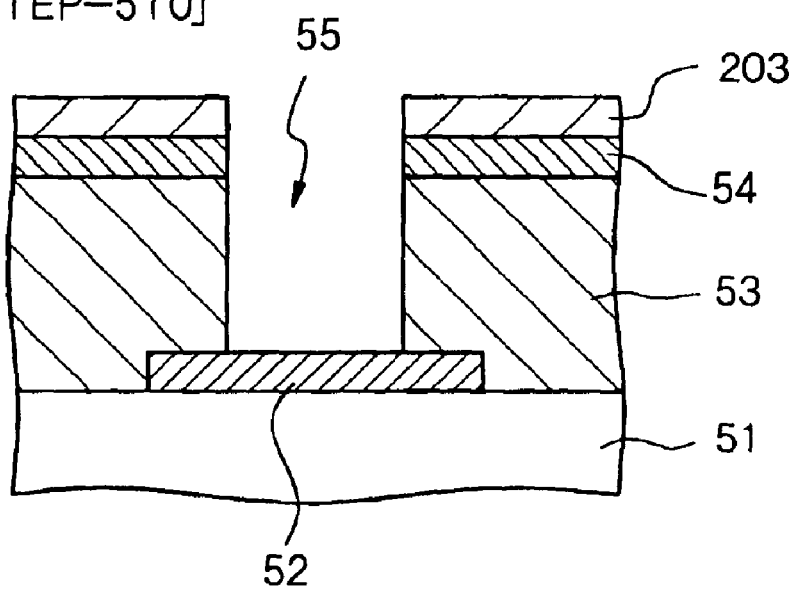
FIGS. 50A and 50B are schematic partial end views of a support, etc., for explaining the method of producing the Spindt type field emission device of Example 5.
Figure 50B:
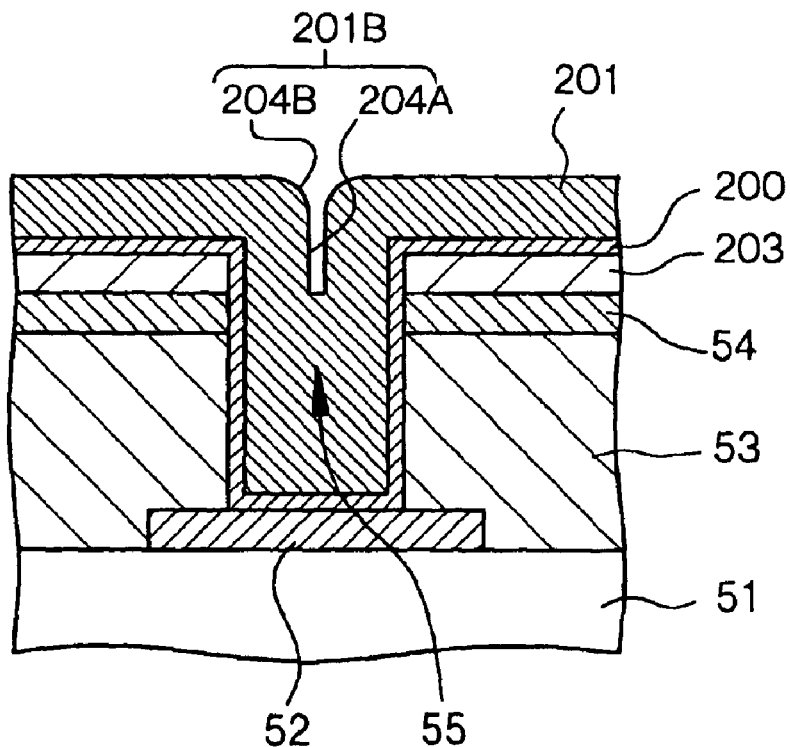

Then, an adhesive layer 200 which has a thickness, for example, of 0.03 $\mu$m and is composed, for example, of tungsten is formed on the entire surface including an inside of the opening portion 55 (see FIG. 50B). Then, a conductive material layer 201 for an electron emitting electrode is formed on the entire surface including an inside of the opening portion 55. The conductive material layer 201 has a thickness which is determined such that a recess 201B deeper than the recess 201A is formed. By properly determining the thickness of the conductive material layer 201, there can be generated a nearly funnel-like recess 201B consisting of a columnar portion 204A and a widened portion 204B communicating with the upper end of the columnar portion 204A in the surface of the conductive material layer 201 due to a step between the upper end portion and the bottom portion of the opening portion 55.

[Step-530]

Figure 51A:
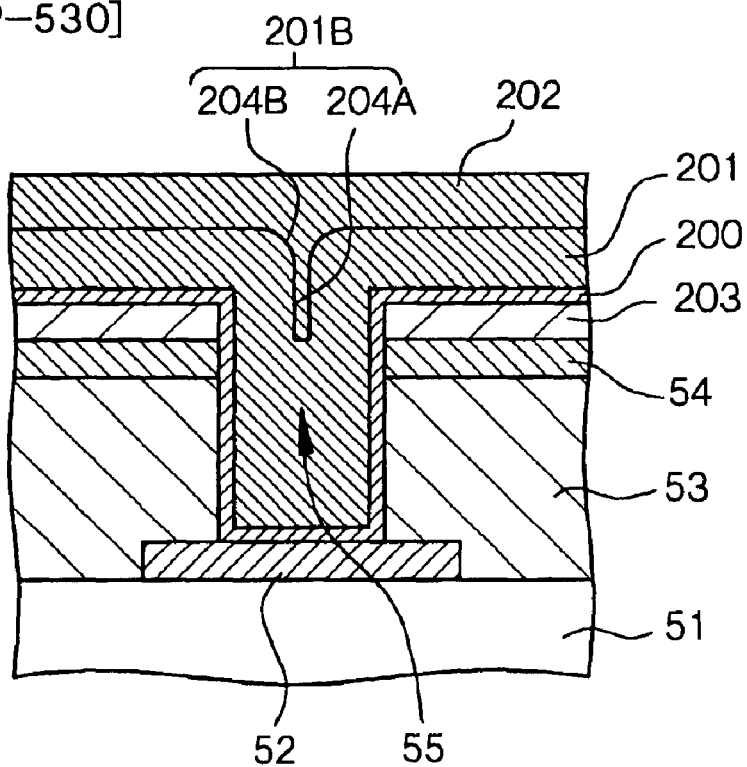
FIGS. 51A and 52B, following

Then, an approximately 0.5 $\mu$m thick mask material layer 202 composed of copper (Cu) is formed on the entire surface of the conductive material layer 201, for example, by an electroless plating method (see FIG. 51A). Table 6 shows a condition of the electroless plating.

TABLE 6

| Plating bath | Copper sulfate ($CuSO_4.5H_2O$) | 7 grams/liter |
|---|---|---|
| | Formalin (37% HCHO) | 20 ml/liter |
| | Sodium hydroxide (NaOH) | 10 grams/liter |
| | Potassium sodium tartrate | 20 grams/liter |
| Plating bath temperature | 50° C. | |

[Step-540]

Figure 51B:
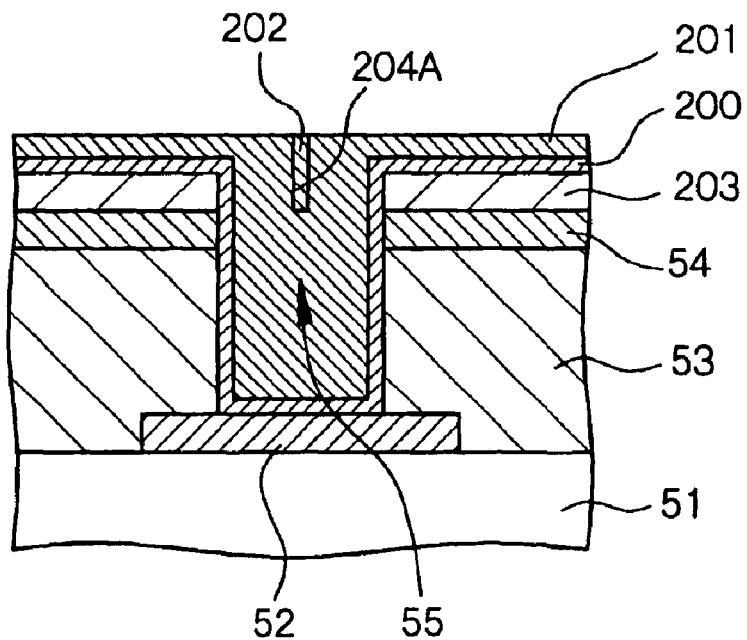
FIG. 51B, are schematic partial end views of a support, etc., for explaining the method of producing the Spindt type field emission device of Example 5.

Then, the mask material layer 202 and the conductive material layer 201 are removed in a plane which is in parallel with the surface of the support 51, to leave the mask material layer 202 in the columnar portion 204A (see FIG. 51B). The above removal can be carried out by a chemical/mechanical polishing method (CMP method).

[Step-550]

Then, the conductive material layer 201, the mask material layer 202 and the adhesive layer 200 are etched under an anisotropic etching condition where the etchrates of the conductive material layer 201 and the adhesive layer 200 are higher than the etchrate of the mask material layer 202. As a result, an electron emitting electrode 56 having a conical form is formed in the opening portion 55 (see FIG. 52A). When the mask material layer 202 remains on the tip portion of the electron emitting electrode 56, the mask material layer 202 can be removed by a wet etching method using a diluted hydrofluoric acid aqueous solution.

[Step-560]

Figure 52A:
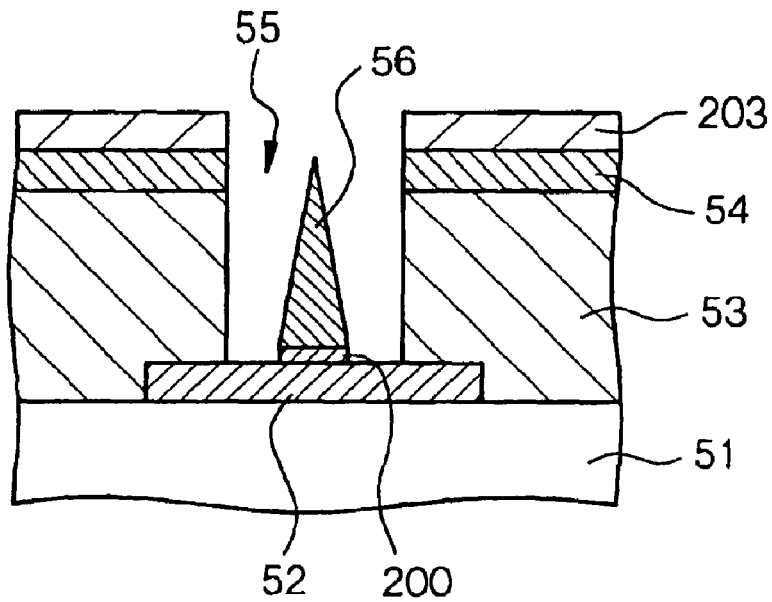
Figure 52B:
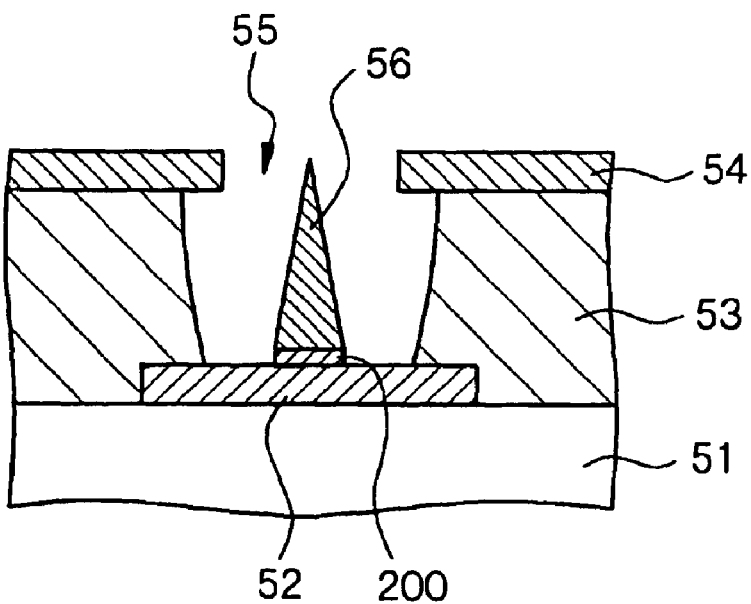

Then, in the opening portion 55, the side wall of the opening portion formed in the insulating layer 53 is allowed to stand back under an isotropic etching condition, whereby a field emission device shown in FIG. 52B is completed.

Figure 53A:
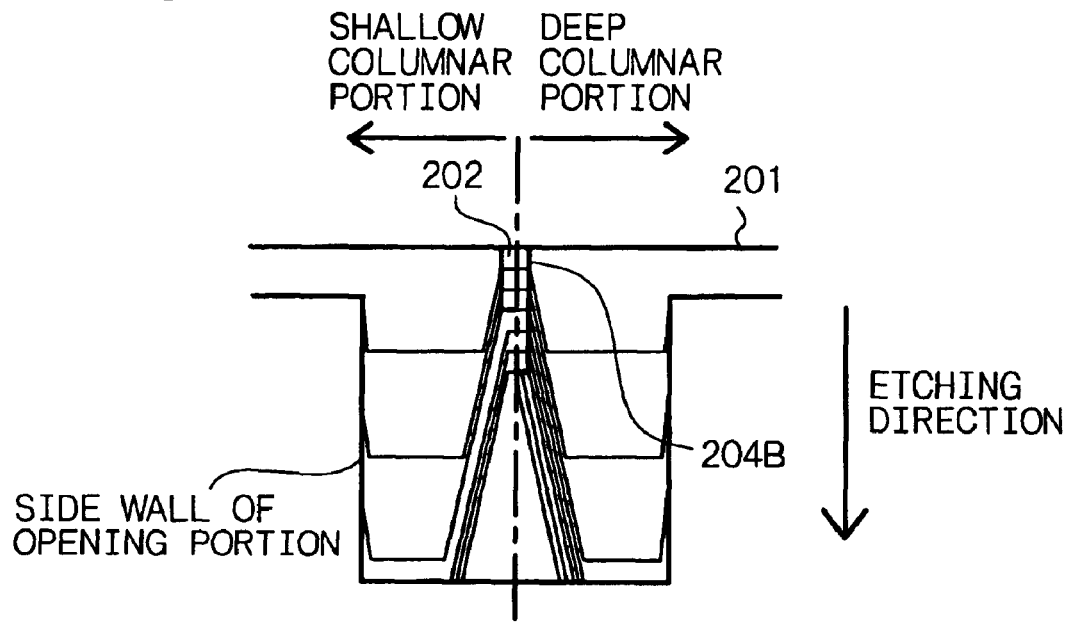
FIGS. 53A and 53B show changes of surface profiles of a material being etched at intervals of a constant time period.
Figure 53B:
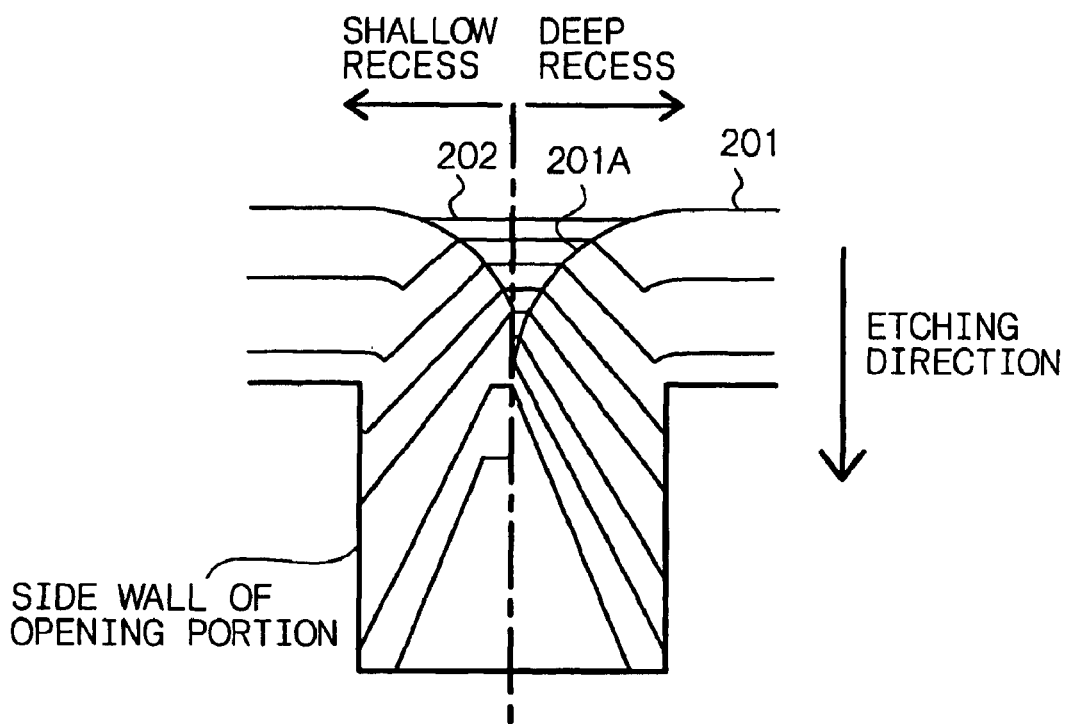

Meanwhile, in the electron emitting electrode 56 formed by the third method of producing the Spindt type field emission device, the formation of an acute conical form as compared with the electron emitting electrode obtained by the second method of producing the Spindt type field emission device is accomplished. This difference is brought by the form of the mask material layer 202 and a difference in ratio of the etchrate of the conductive material layer 201 to the etchrate of the mask material layer 202. The above difference will be explained with reference to FIGS. 53A and 53B. FIGS. 53A and 53B show how the surface profile of a material being etched changes at constant intervals of time. FIG. 53A shows a case using the mask material layer 202 composed of copper, and FIG. 53B shows a case using the mask material layer 202 composed of a resist material. For simplification, it is assumed that the etchrate of the conductive material layer 201 and the etchrate of the adhesive layer 200 are the same, and FIGS. 53A and 53B omit showing of the adhesive layer 200.

When the mask material layer 202 composed of copper is used (see FIG. 53A), the etchrate of the mask material layer 202 is sufficiently low as compared with the etchrate of the conductive material layer 201, so that the mask material layer 202 disappears in no case during the etching. The electron emitting electrode 56 having an acute tip portion can be therefore formed. In contrast, when the mask material layer 202 composed of a resist material is used (see FIG. 53B), the etchrate of the mask material layer 202 is not so low as the etchrate of the conductive material layer 201, so that the mask material layer 202 is liable to disappear during the etching. After the mask disappears, the conical form of the electron emitting electrode 56 therefore tends to become obtuse.

Further, the merit of the mask material layer 202 remaining in the columnar portion 204A is that the form of the electron emitting electrode 56 does not much change even if the depth of the columnar portion 204A changes to some extent. That is, the depth of the columnar portion 204A can vary depending upon the thickness of the conductive material layer 201 and the fluctuation of the step coverage. Since, however, the width of the columnar portion 204A is nearly constant regardless of the depth, the width of the mask material layer 202 comes to be nearly constant as well, so that there is not much difference caused in the form of the electron emitting electrode 56 finally formed. In contrast, in the mask material layer 202 retained in the recess 201A, the width of the mask material layer changes depending upon whether the recess 201A has a large depth or a small depth, so that the conical form of the electron emitting electrode 56 begins to become obtuse earlier when the recess 201A has a smaller depth and when the mask material layer 202 has a smaller thickness. The electron emission efficiency of the field emission device changes depending upon not only a potential difference between the gate electrode and the cathode electrode, a distance between the gate electrode and the cathode electrode and a work function of a material constituting the electron emitting electrode, but also the form of tip portion of the electron emitting electrode. It is therefore preferred to make the above selection of the form of the mask material layer and the etchrate thereof as required.

(Variant-3 of Method of Production of Spindt Type Field Emission Device)

Figure 54A:
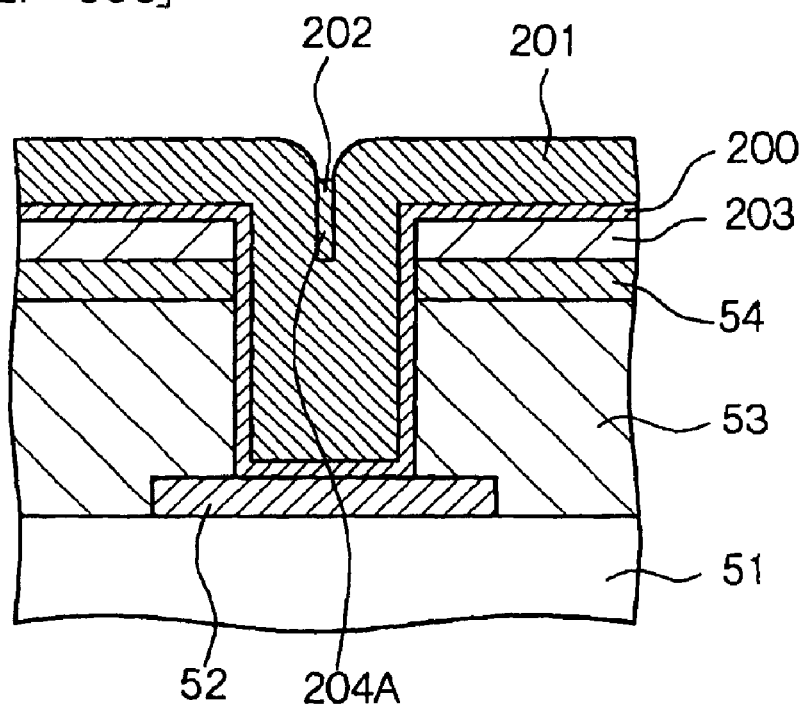
FIGS. 54A and 54B, following

A variant of the third method of producing the Spindt type field emission device (to be referred to as "fourth production method of the Spindt type field emission device" hereinafter) will be explained with reference to FIGS. 54A to 55 which show schematic partial end views of a support and the like, hereinafter. The fourth method of producing the Spindt type field emission device also includes the step (e) in which a nearly funnel-like recess consisting of a columnar portion and a widened portion communicating with the upper end of the columnar portion is generated in the surface of the conductive material layer due to a step between the upper end portion and the bottom portion of the opening portion, and the step (f) in which the mask material layer is formed on the entire surface of the conductive material layer, and then the mask material layer is removed in the widened portion and on the conductive material layer, thereby to leave the mask material layer in the columnar portion.

[Step-600]

First, procedures up to the formation of the mask material layer 202 shown in FIG. 51A are carried out in the same manner as in [Step-500] to [Step-530]. Then, unlike [Step-540], only the mask material layer 202 on the conductive material layer 201 and in the widened portion 204B is removed, thereby to leave the mask material layer 202 in the columnar portion 204A (see FIG. 54A). In this case, only the mask material layer 202 composed of copper can be selectively removed without removing the conductive material layer 201 composed of tungsten, for example, by carrying out wet-etching using a diluted hydrofluoric acid aqueous solution. The height of the mask material layer 202 left in the columnar portion 204A differs depending upon the etching time period. The etching time period is not critical so long as a portion of the mask material layer 202 which portion is filled in the widened portion 204B can be fully removed. The reason therefor is that a discussion on the height of the above mask material layer 202 is substantially the same as the discussion previously made on the depth of the columnar portion 204A with reference to FIG. 53A, and therefore that the height of the mask material layer 202 has almost no big influence on the form of the electron emitting electrode 56 to be finally formed.

[Step-610]

Figure 54B:
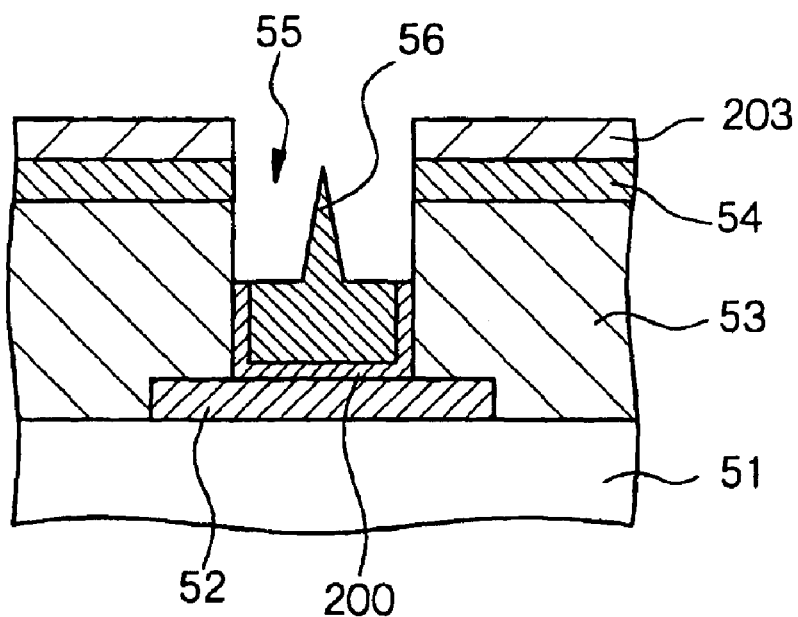

Then, the conductive material layer 201, the mask material layer 202 and the adhesive layer 200 are etched in the same manner as in [Step-550], to form the electron emitting electrode 56 as shown in FIG. 54B. The electron emitting electrode 56 as a whole can have a conical form as shown in FIG. 52A, while FIG. 54B shows a variant in which its tip portion alone has a conical form. Such a form can be generated when the mask material layer 202 filled in the columnar portion 204A has a small height, or when the etchrate of the mask material layer 202 is relatively high. However, such a difference in form causes no problem on the function of the electron emitting electrode 56.

[Step-620]

Figure 55:
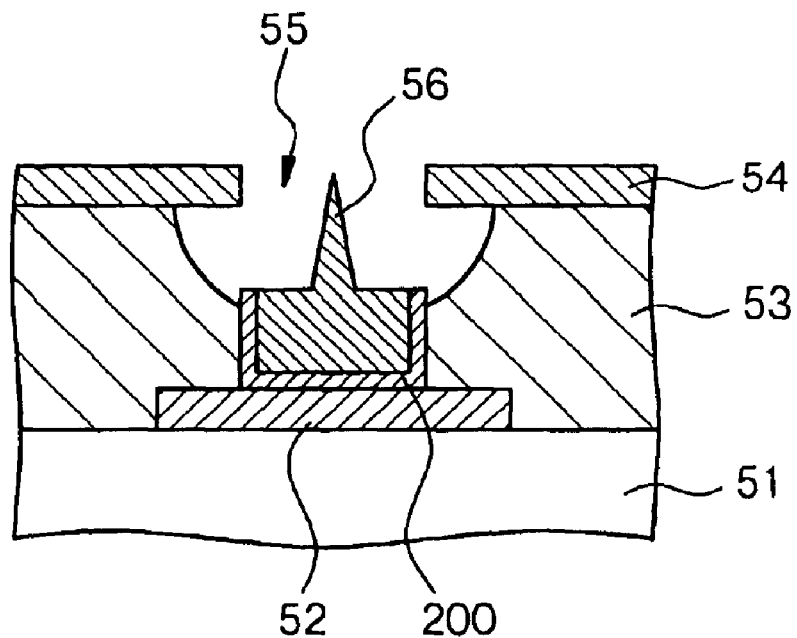
FIG. 55, following

Then, inside the opening portion 55, the side wall of the opening portion formed in the insulating layer 53 is allowed to stand back under an isotropic etching condition, whereby a field emission device shown in FIG. 55 can be completed.

(Variant-4 of Spindt Type Field Emission Device and Method of the Production thereof)

Figure 56:
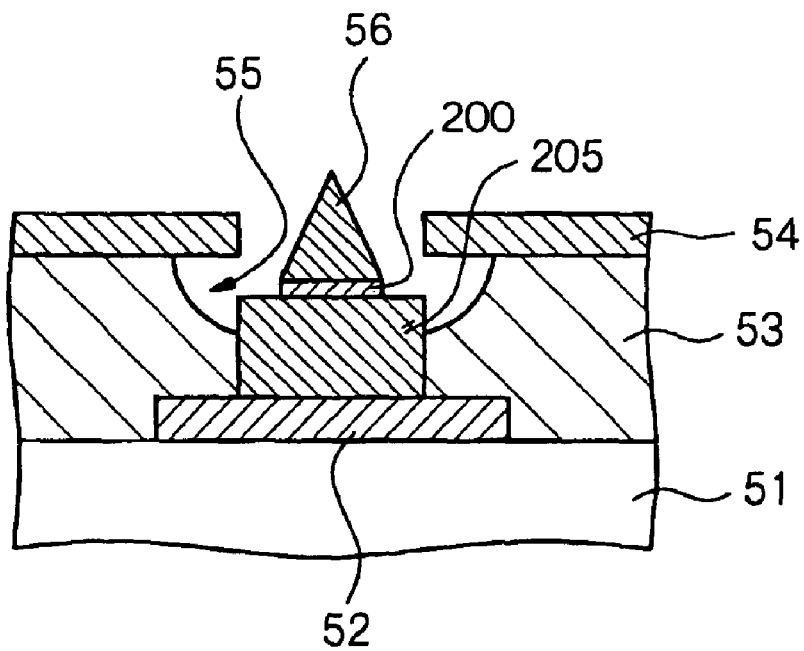
FIG. 56 is a schematic partial end view of a support, etc., for explaining the method of producing a Spindt type field emission device of Example 7.
Figure 57A:
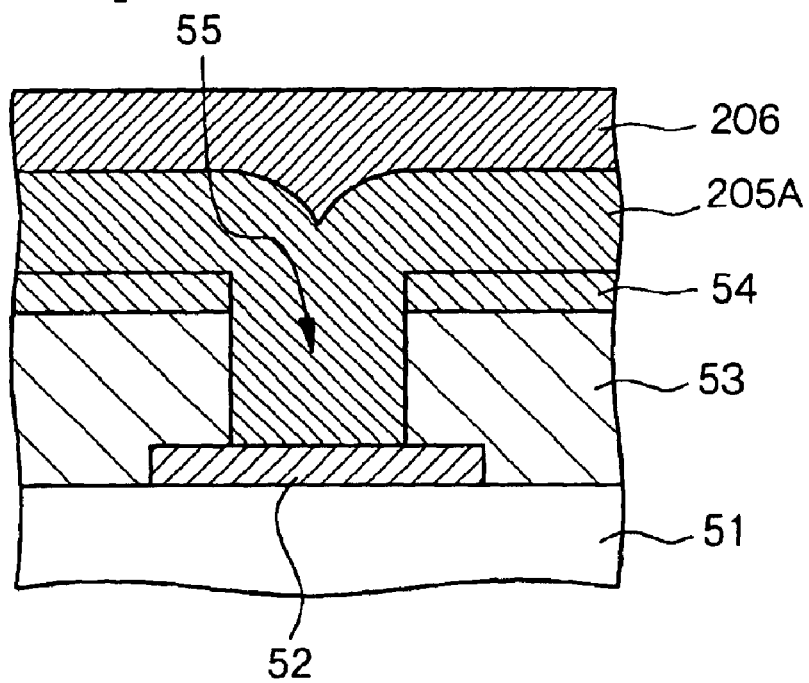
FIGS. 57A and 57B, following
Figure 57B:
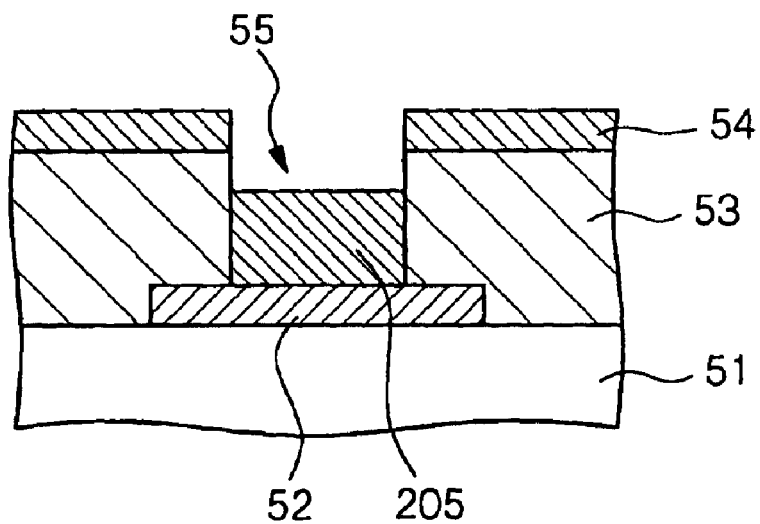

FIG. 56 shows a schematic partial end view of a variant of the Spindt type field emission device. The variant of the field emission device in FIG. 56 differs from the field emission device shown in FIG. 44 in that an electron emitting part is constituted of a base portion 205 and a conical electron emitting electrode 56 formed on the base portion 205. The above base portion 205 is composed of one electrically conductive material, and the above electron emitting electrode 56 is composed of another electrically conductive material. Specifically, the base portion 205 is a member which is provided for adjusting a distance between the electron emitting electrode 56 and the opening edge portion of the gate electrode 54 and constituted of a polysilicon layer containing an impurity. The electron emitting electrode 56 is composed of tungsten and has a conical form, more specifically, the form of a circular cone. An adhesive layer 200 composed of TiN is interposed between the base portion 205 and the electron emitting electrode 56. The adhesive layer 200 is formed not as an element essential for the function of electron emission, but it is formed for a production-related reason. The insulating layer 53 is hollowed from immediately below the gate electrode 54 toward the upper end portion of the base portion 205, to form the opening portion 55. A fifth method of producing the Spindt type field emission device, which is a variant of the second method of producing the Spindt type field emission device, will be explained with reference to FIGS. 57A to 59B showing schematic partial end views of a support and the like, hereinafter.

[Step-700]

First, procedures up to the formation of the opening portion 55 are carried out in the same manner as in [Step-400]. Then, a conductive material layer 205A for a base portion is formed on the entire surface including an inside of the opening portion 55. The conductive material layer 205A is constituted, for example, of a polysilicon layer containing, as an impurity, phosphorus (P) on the order of $10^{15}/cm^3$, and it can be formed by a plasma-enhanced CVD method. Then, a planarization layer 206 composed of a resist layer is formed on the entire surface by a spin coating method, to form a nearly flat surface (see FIG. 57A). Then, the planarization layer 206 and the conductive material layer 205A are etched under a condition where the etchrates of these two layers are nearly equal, to fill the bottom portion of the opening portion 55 with the base portion 205 having a flat upper surface (see FIG. 57B). The etching can be carried out by an RIE method using an etching gas containing a chlorine-containing gas and an oxygen-containing gas. Since the etching is carried out after the surface of the conductive material layer 205A is once flattened with the planarization layer 206, the base portion 205 comes to have a flat upper surface.

[Step-710]

Then, an adhesive layer 200 is formed on the entire surface including a residual portion of the opening portion 55. Further, a conductive material layer 201 for an electron emitting electrode is formed on the entire surface including the residual portion of the opening portion 55, to fill conductive material layer 201 in the residual portion of the opening portion 55 (see FIG. 58A). The adhesive layer 200 is a 0.07 μm thick TiN layer formed by a sputtering method, and the conductive material layer 201 is a 0.6 μm thick tungsten layer formed by a low pressure CVD method. In a surface of the conductive material layer 201 is formed a recess 201A due to a step between the upper end portion and the bottom portion of the opening portion 55.

[Step-720]

Figure 58A:
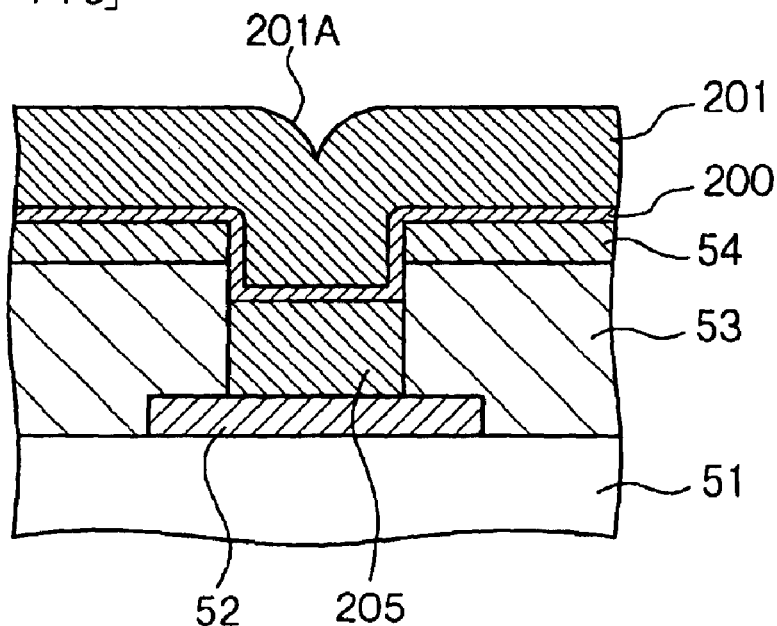
FIGS. 58A and 58B, following
Figure 58B:
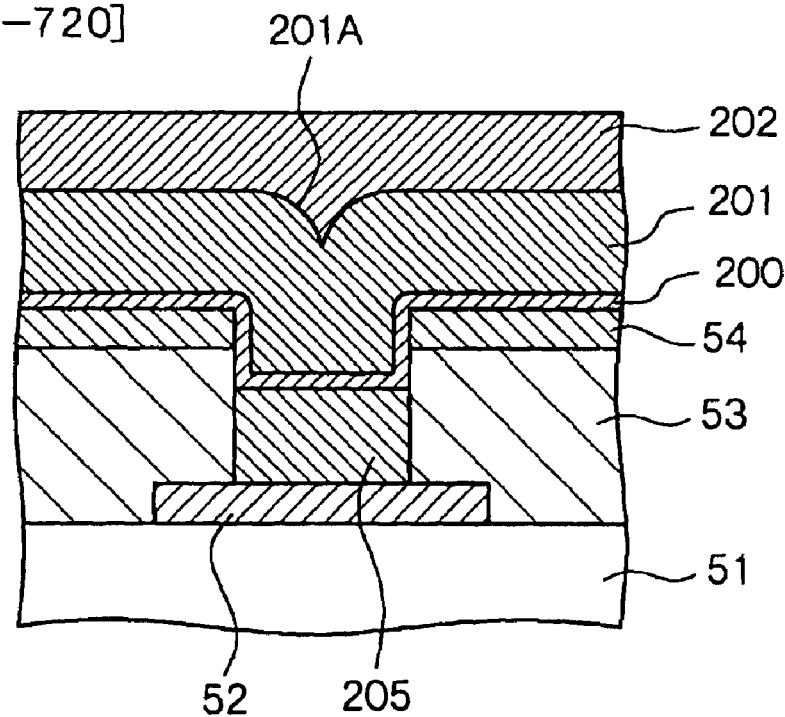

Then, a mask material layer 202 composed of a resist layer is formed on the entire surface of the conductive material layer 201 by a spin coating method, so as to form a nearly flat surface (see FIG. 58B). The mask material layer 202 absorbs the recess 201A of the surface of the conductive material layer 201 and forms a flat surface. Then, the mask material layer 202 is etched with an RIE method using an oxygen-containing gas (see FIG. 59A). The etching is terminated when a flat plane of the conductive material layer 201 is exposed. In this manner, the mask material layer 202 is left in the recess 201A of the conductive material layer 201, and the mask material layer 202 is formed so as to cover a region of the conductive material layer 201 which region is positioned in the central portion of the opening portion 55.

[Step-730]

Figure 59A:
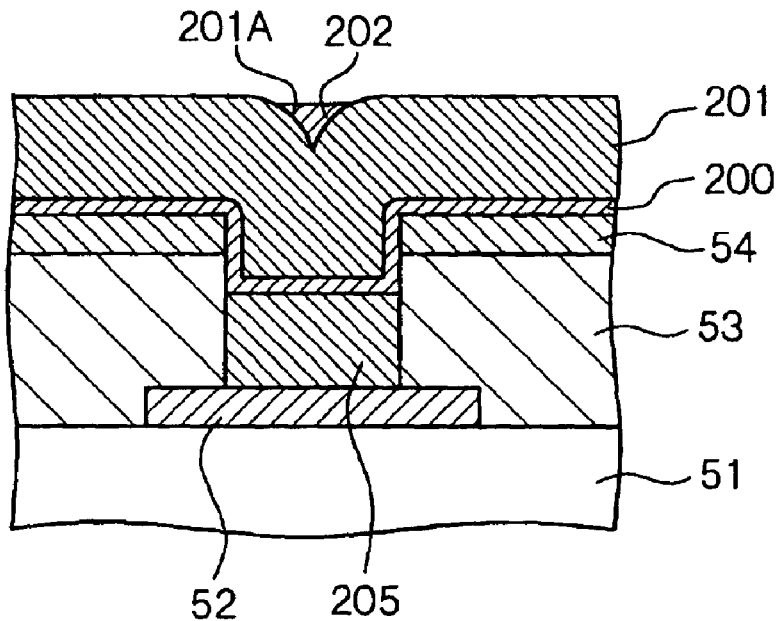
FIGS. 59A and 59B, following
Figure 59B:
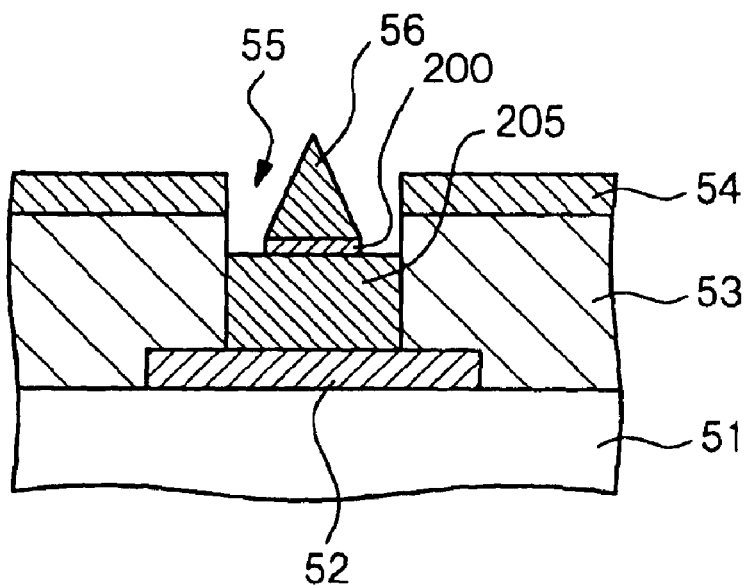

Then, the conductive material layer 201, the mask material layer 202 and the adhesive layer 200 are together etched in the same manner as in [Step-450], whereby an electron emitting electrode 56 having the form of a circular cone depending upon the selection ratio to resist according to the above-explained mechanism and an adhesive layer 200 are formed, and an electron emitting part is completed (see FIG. 59B). Then, inside the opening portion 55, the side wall of the opening portion formed in the insulating layer 53 is allowed to stand back, whereby the field emission device shown in FIG. 56 can be obtained.

(Vairant-5 of Spindt Type Field Emission Device and Method of Production thereof)

Figure 60A:
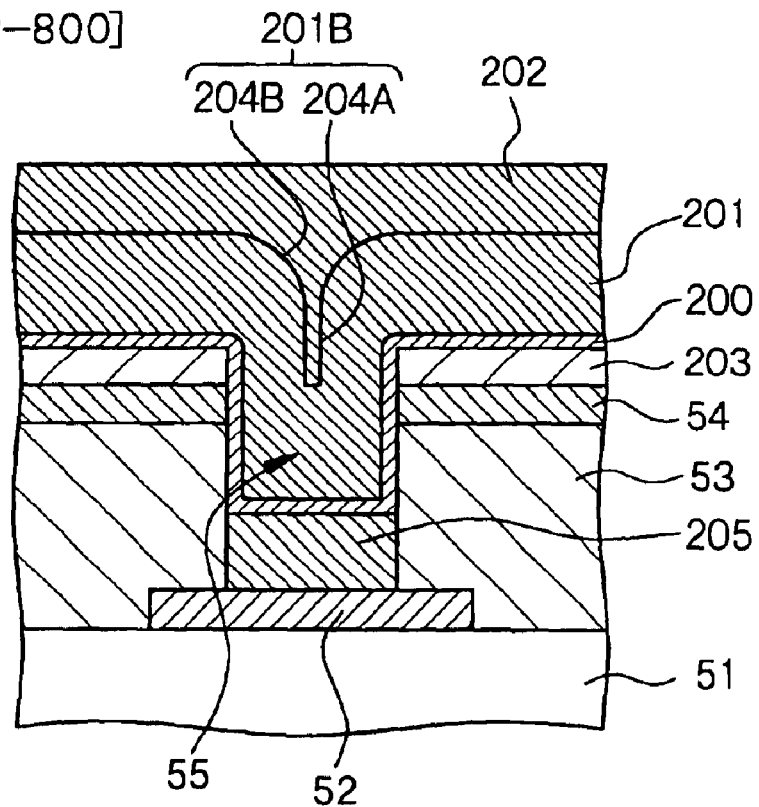
FIGS. 60A and 60B are schematic partial end views of a support, etc., for explaining the method of producing a Spindt type field emission device of Example 8.
Figure 60B:
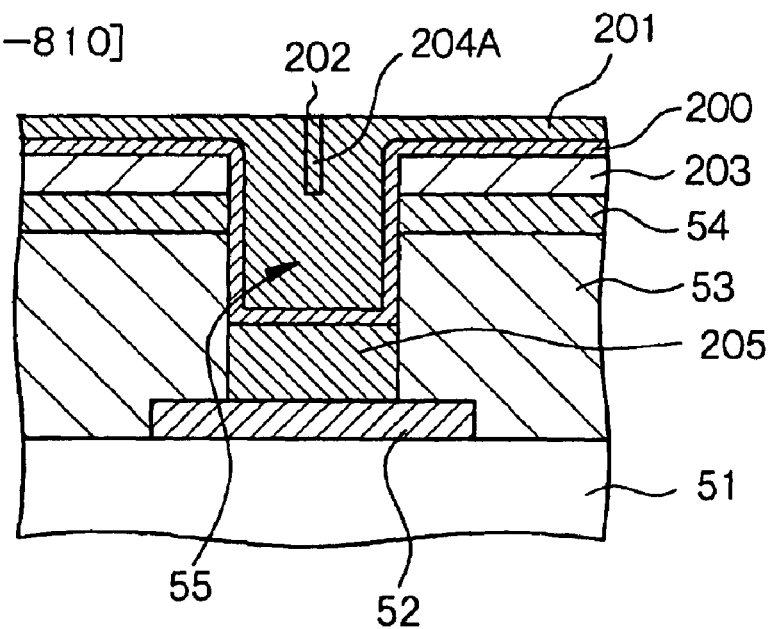
Figure 61A:
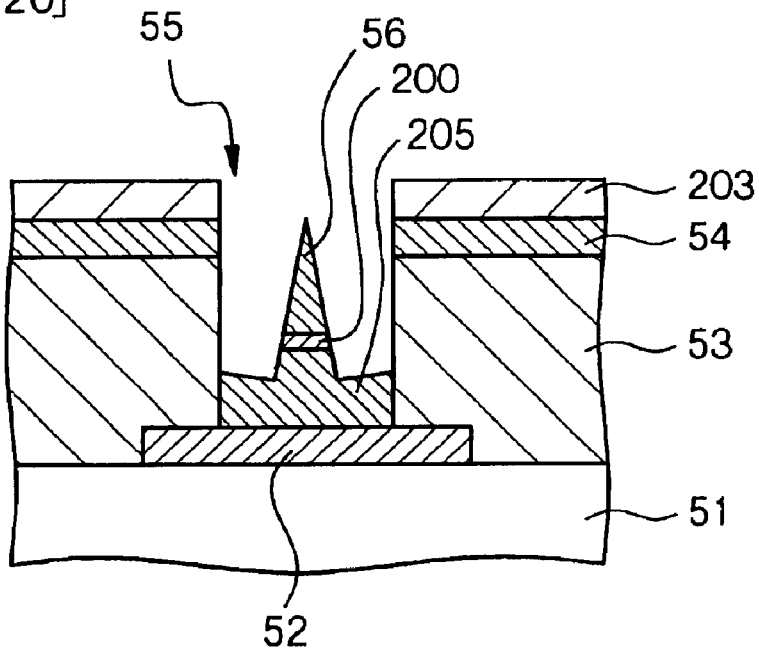
FIGS. 61A and 61B, following
Figure 61B:
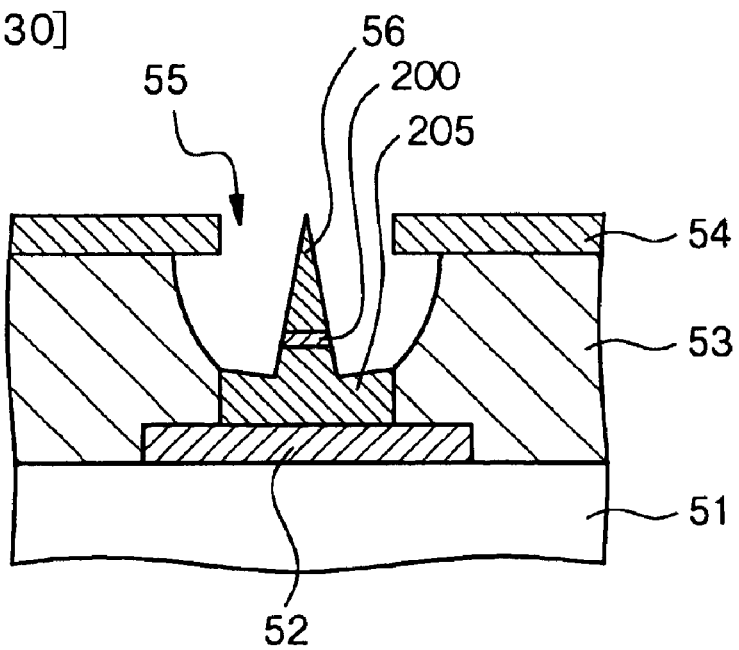

FIG. 61B shows a schematic partial end view of a variant of the Spindt type field emission device. The field emission device has substantially the same structure as that of the Spindt type field emission device shown in FIG. 56. In the field emission device, its electron emitting part is constituted of a base portion 205 and a conical electron emitting electrode 56 formed on the base portion 205. The above base portion 205 is composed of one electrically conductive material, and the above electron emitting electrode 56 is composed of another electrically conductive material. Specifically, the base portion 205 is a member which is provided for adjusting a distance between the electron emitting electrode 56 and the opening edge portion of the gate electrode 54 and constituted of a polysilicon layer containing an impurity. The electron emitting electrode 56 is composed of tungsten and has a conical form, more specifically, the form of a circular cone. An adhesive layer 200 composed of TiN is interposed between the base portion 205 and the electron emitting electrode 56. The adhesive layer 200 is formed not as an element essential for the function of electron emission, but it is formed for a production-related reason. The insulating layer 53 is hollowed from immediately below the gate electrode 54 toward the upper end portion of the base portion 205, to form the opening portion 55. A sixth method of producing the Spindt type field emission device, which is a variant of the third and fifth methods of producing the Spindt type field emission device, will be explained with reference to FIGS. 60A to 61B showing schematic partial end views of a support and the like, hereinafter.

[Step-800]

First, procedures up to the formation of the opening portion 55 are carried out in the same manner as in [Step-500] to [Step-510]. Then, a conductive material layer for a base portion is formed on the entire surface including an inside of the opening portion 55, and the conductive material layer is etched, whereby the base portion 205 filling in the bottom portion of the opening portion 55 can be formed. While the base portion 205 shown in Figures has a flattened surface, it may have a dented surface. The base portion 205 having a flattened surface can be formed according to the same process as that in [Step-700]. Further, an adhesive layer 200 and a conductive material layer 201 for an electron emitting electrode are consecutively formed on the entire surface including a residual portion of the opening portion 55. In this case, the thickness of the conductive material layer 201 is determined so as to form, in the surface of the conductive material layer 201, a nearly funnel-like recess 201B consisting of a columnar portion 204A and a widened portion 204B communicating with the upper end of the columnar portion 204A due to a step between the upper end portion and the bottom portion of the residual portion of the opening portion 55. Then, a mask material layer 202 is formed on the conductive material layer 201. The mask material layer is composed, for example, of copper. FIG. 60A shows a state where the above process is finished.
[Step-810]

Then, the mask material layer 202 and the conductive material layer 201 are removed in a plane which is in parallel with the surface of the support 51, thereby to leave the mask material layer 202 in the columnar portion 204A (see FIG. 60B). The above removal can be carried out by a chemical/mechanical polishing method (CMP method) in the same manner as in [Step-540].
[Step-820]

Then, the conductive material layer 201, the mask material layer 202 and the adhesive layer 200 are etched, whereby an electron emitting electrode 56 having the form of a circular cone depending upon the selection ratio to resist according to the above-explained mechanism is formed. The etching of the above layers can be carried out in the same manner as in [Step-550]. An electron emitting part is constituted of the electron emitting electrode 56, the base portion 205 and the adhesive layer 200 remaining between the electron emitting electrode 56 and the base portion 205. While the electron emitting part as a whole may naturally have a conical form, FIG. 61A shows a state where part of the base portion 205 remains filling in the bottom portion of the opening portion 55. The above form is formed when the mask material layer 202 filled in the columnar portion 204A has a small height or when the etchrate of the mask material layer 202 is relatively high, while it causes no problem on the function of electron emission.
[Step-830]

Then, inside the opening portion 55, the side wall of the insulating layer 53 is allowed to stand back under an isotropic condition, whereby the field emission device shown in FIG. 61B is completed.

(Variant-6 of Method of Production of Spindt Type Field Emission Device)

Figure 62:
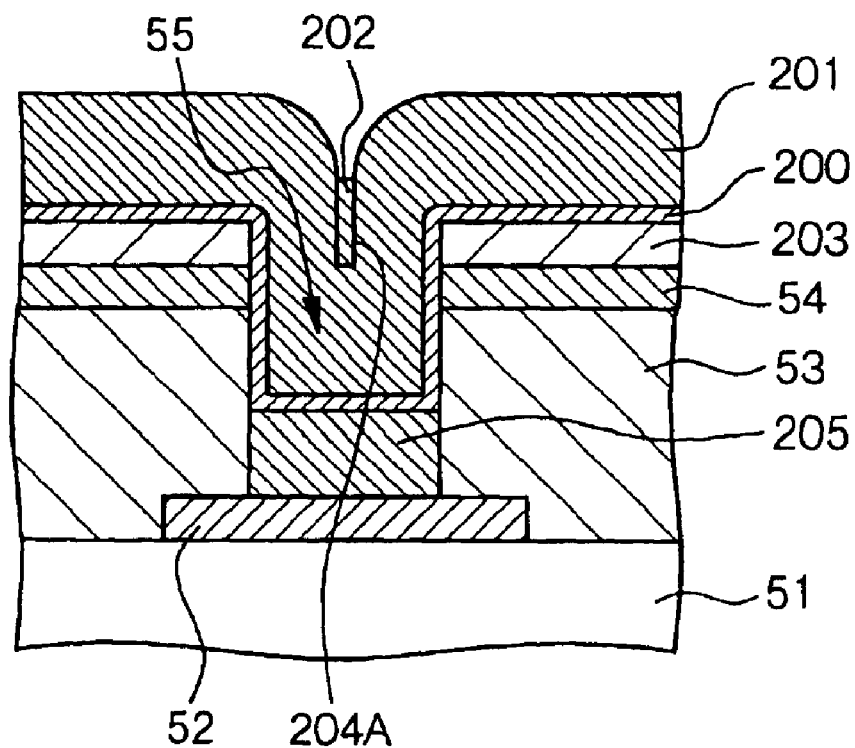
FIG. 62 is a schematic partial end view of a support, etc., for explaining the method of producing a Spindt type field emission device of Example 9.
Figure 64A:
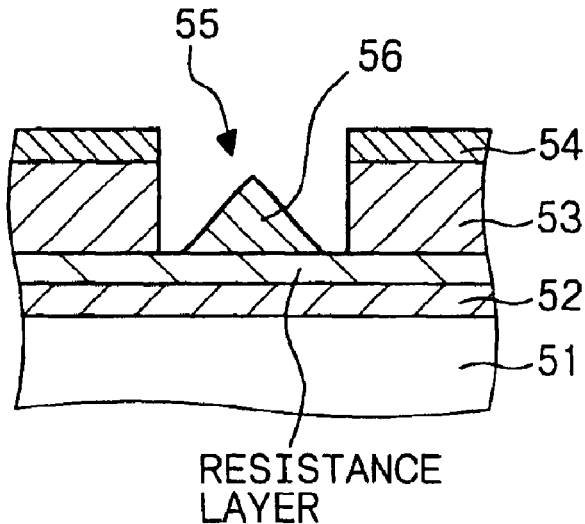
FIGS. 64A and 64B are a schematic partial end view of a Spindt type field emission device having a resistance layer and an equivalent circuit of an electron emitting portion provided with a resistance layer.
Figure 64B:
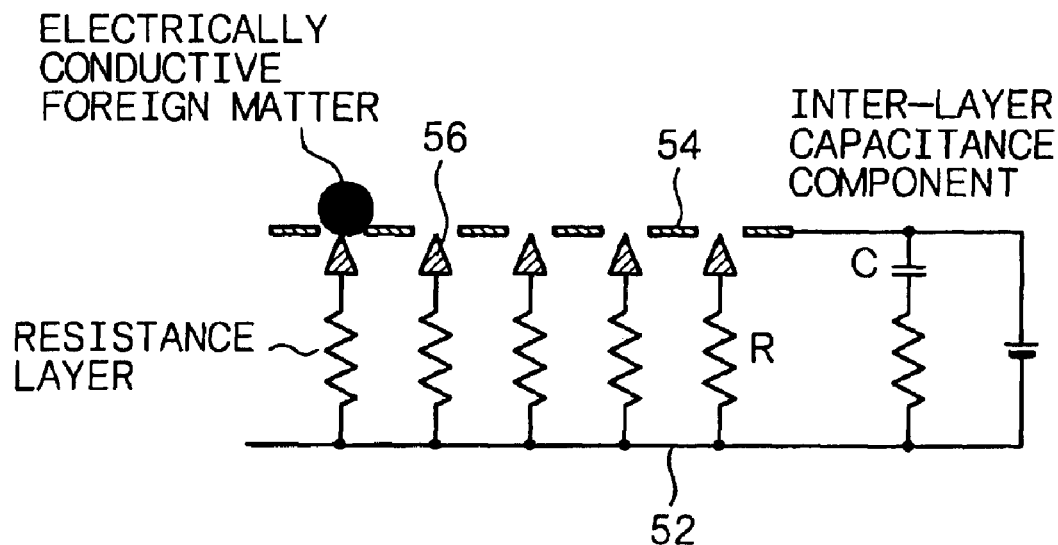

There will be further shown a variant of the sixth method of producing the Spindt type field emission device. A seventh method of producing the Spindt type field emission device will be explained with reference to FIG. 62 showing a schematic partial end view of a support and the like, hereinafter.

[step-900]

Procedures up to the formation of the mask material layer 202 are carried out in the same manner as in [Step-800]. Then, only the mask material layer 202 on the conductive material layer 201 and in the widened portion 204A is removed, thereby to leave the mask material layer 202 in the columnar portion 204B (see FIG. 62). For example, only the mask material layer 202 composed of copper can be selectively removed without removing the conductive material layer 201 composed of tungsten by carrying out wet etching using a diluted hydrofluoric acid aqueous solution. Any subsequent process such as etching of the conductive material layer 201 and the mask material layer 202 and isotropic etching of the insulating layer 53 can be carried out in the same manner as in [Step-820] to [step-830].

In the present invention, any malfunctioning electron emitting portion is electrically separated from a driving circuit, so that it does not at all work to emit electrons. Otherwise, an electron emitting region including a malfunctioning electron emitting portion is provided with an electron emitting portion normal in operation. Even if a field emission device is caused to be defective, therefore, an electron emitting portion including such a field emission device is precluded as far as working is concerned, or an electron emitting region substantially free from a defect can be obtained, so that there is incurred no decrease in production yields of displays. Therefore, the defect of large-sized cold cathode field emission displays whose defect-free production has been difficult due to the requirement of fine processing can be overcome by a less expensive method, so that the production cost of cathode panels and cold cathode field emission displays can be decreased and that their quality reproducibility can be improved. Further, the defects of cold cathode field emitting portions, such as a bright point and a dark point, can be reliably checked by performing a display characteristic test with the testing system shown in FIG. 43.

What is claimed is:

1. A cathode panel for a cold cathode field emission display, comprising;
    (a) an effective region constituted of a plurality of cold cathode electron emitting portions arranged in a two-dimensional matrix form, and
    (b) an ineffective region constituted of a plurality of cold cathode electron emitting portions arranged in a circumferential portion of the effective region and formed in a two-dimensional matrix form,
    wherein the cold cathode electron emitting portions constituting the effective region are connected to a power source for actuating the cold cathode electron emitting portions, and
    the cold cathode electron emitting portions constituting the ineffective region are not connected to said power source.

2. The cold cathode field emission display according to claim 1, in which the cold cathode electron emitting portions constituting the effective region and the cold cathode electron emitting portions constituting the ineffective region each have a plurality of electron emitting electrodes.

3. A cathode panel for a cold cathode field emission display, comprising a plurality of cold cathode electron emitting portion groups arranged side by side,
    wherein each cold cathode electron emitting portion group has N columns of cold cathode electron emitting portions side by side, N being a natural number of 2 or more, each column having a plurality of the cold cathode electron emitting portions arranged one-dimensionally,
    a constant number of column or columns are selected from said columns in each cold cathode electron emitting portion group, the constant number being (N−1) or less,
    the selected column or columns of the cold cathode electron emitting portions are connected to a power source for actuating the cold cathode electron emitting portions, and
    non-selected column or columns of the cold cathode electron emitting portions are not connected to said power source.

4. The cold cathode field emission display according to claim 3, in which each of said cold cathode electron emitting portions have a plurality of electron emitting electrodes.

5. A cold cathode field emission display comprising a plurality of pixels, each pixel being constituted of a cold cathode electron emitting portion formed in a cathode panel and an anode electrode and a fluorescence layer formed in an anode panel and opposed to the cold cathode electron emitting portion,
    the cathode panel comprising;
    (a) an effective region constituted of a plurality of the cold cathode electron emitting portions arranged in a two-dimensional matrix form, and (b) an ineffective region constituted of a plurality of the cold cathode electron emitting portions arranged in a circumferential portion of the effective region and formed in a two-dimensional matrix form, wherein the cold cathode electron emitting portions constituting the effective region are connected to a power source for actuating the cold cathode electron emitting portions, and the cold cathode electron emitting portions constituting the ineffective region are not connected to said power source.

6. The cold cathode field emission display according to claim 5, in which the cold cathode electron emitting portions constituting the effective region and the cold cathode electron emitting portions constituting the ineffective region each have a plurality of electron emitting electrodes.

7. A cold cathode field emission display comprising a plurality of pixels, each pixel being constituted of a cold cathode electron emitting portion formed in a cathode panel and an anode electrode and a fluorescence layer formed in an anode panel and opposed to the cold cathode electron emitting portion, the cathode panel comprising a plurality of cold cathode electron emitting portion groups arranged side by side, wherein each cold cathode electron emitting portion group has N columns of the cold cathode electron emitting portions side by side, N being a natural number of 2 or more, each column having a plurality of the cold cathode electron emitting portions arranged one-dimensionally, a constant number of column or columns are selected from said columns in each cold cathode electron emitting portion group, the constant number being (N−1) or less, the selected column or columns of the cold cathode electron emitting portions are connected to a power source for actuating the cold cathode electron emitting portions, and non-selected column or columns of the cold cathode electron emitting portions are not connected to said power source.

8. The cold cathode field emission display according to claim 7, in which each of said cold cathode electron emitting portions have a plurality of electron emitting electrodes.

* * * * *